United States Patent
Granger et al.

(10) Patent No.: US 12,019,412 B2
(45) Date of Patent: Jun. 25, 2024

(54) COMPUTER-IMPLEMENTED PERCEPTUAL APPARATUS

(71) Applicant: THE TRUSTEES OF DARTMOUTH COLLEGE, Hanover, NH (US)

(72) Inventors: Richard Granger, Hanover, NH (US); Elijah Floyd William Bowen, Hanover, NH (US); Antonio Rodriguez, Hanover, NH (US); Andrew Felch, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 18/214,303

(22) Filed: Jun. 26, 2023

(65) Prior Publication Data
US 2023/0350351 A1 Nov. 2, 2023

Related U.S. Application Data

(63) Continuation of application No. 16/632,702, filed as application No. PCT/US2018/043963 on Jul. 26, 2018, now Pat. No. 11,693,372.
(Continued)

(51) Int. Cl.
*G05B 13/02* (2006.01)
*G06F 7/50* (2006.01)
(Continued)

(52) U.S. Cl.
CPC .............. *G05B 13/027* (2013.01); *G06F 7/50* (2013.01); *G06F 7/523* (2013.01); *G06F 17/141* (2013.01);
(Continued)

(58) Field of Classification Search
CPC .... G06V 10/454; G06V 10/82; G06V 10/955; G06V 10/7635; G06V 10/764;
(Continued)

(56) References Cited

U.S. PATENT DOCUMENTS 5,918,189 A 6/1999 Kivela
6,121,969 A 9/2000 Jain et al.
(Continued)

OTHER PUBLICATIONS

Gilson et al. (2016) "Estimation of Directed Effective Connectivity from fMRI Functional Connectivity Hints at Asymmetries of Cortical Connectome." In: Research Article, Mar. 16, 2016, retrieved https://doi.org/10.1371/journal.pcbi.1004762, 22 pages.
(Continued)

*Primary Examiner* — Emily E Larocque
(74) *Attorney, Agent, or Firm* — Cozen O'Connor

(57) ABSTRACT

An autonomous module for processing stored data includes a multithreaded processor core (MPC) and a plurality of autonomous memories. Each of the plurality of autonomous memories has a memory bank, a data operator (DO) configured to implement a plurality of selectable memory behaviors, an autonomous memory operator (AMO) configured to implement a state machine to control the memory bank independently of the MPC, and at least one memory input/output (IO) port communicatively coupled with the memory bank, the AMO, and the DO. The at least one memory IO port is configured to receive a read instruction from the AMO, retrieve data from the memory bank, and send the data to the DO. The DO is configured to implement one of the plurality of selectable memory behaviors to update the data and send the updated data to the AMO via the at least one memory IO port.

13 Claims, 44 Drawing Sheets

Related U.S. Application Data

(60) Provisional application No. 62/537,261, filed on Jul. 26, 2017.

(51) Int. Cl.
| | |
|---|---|
| *G06F 7/523* | (2006.01) |
| *G06F 17/14* | (2006.01) |
| *G06F 17/16* | (2006.01) |
| *G06V 10/44* | (2022.01) |
| *G06V 10/762* | (2022.01) |
| *G06V 10/764* | (2022.01) |
| *G06V 10/82* | (2022.01) |
| *G06V 10/94* | (2022.01) |

(52) U.S. Cl.
CPC ............ *G06F 17/16* (2013.01); *G06V 10/454* (2022.01); *G06V 10/7635* (2022.01); *G06V 10/764* (2022.01); *G06V 10/82* (2022.01); *G06V 10/955* (2022.01)

(58) Field of Classification Search
CPC ......... G05B 13/027; G06F 7/50; G06F 7/523; G06F 17/10–141; G06F 17/13; G06F 17/156; G06F 17/16–175; G06N 3/00–006; G06N 3/02; G06N 3/04; G06N 3/0445; G06N 3/0463; G06N 3/049; G06N 3/06; G06N 3/063; G06N 3/08; G06N 3/086; G06N 3/10; G06N 3/105; G06N 3/12; G06N 3/126
See application file for complete search history.

(56) References Cited

U.S. PATENT DOCUMENTS

| | | |
|---|---|---|
| 2006/0282236 A1 | 12/2006 | Wistmuller |
| 2009/0097772 A1 | 4/2009 | Zhao et al. |
| 2013/0080426 A1 | 3/2013 | Chen et al. |
| 2013/0343643 A1 | 12/2013 | Perlmutter et al. |
| 2015/0178620 A1* | 6/2015 | Ascari .................... G06N 20/00 706/21 |
| 2016/0147201 A1 | 5/2016 | Crncich-DeWolf et al. |
| 2017/0255884 A1* | 9/2017 | Visvanathan .......... G06N 3/006 |

OTHER PUBLICATIONS

PCT/US2018/043963 International Search Report and Written Opinion dated Dec. 7, 2018, 10 pages.

D.A Patterson et al., "Computer Organization and Design, the Hardware/Software Interface", Elsevier, 2005, Ch 1, and Ch 3, 118 pages.

C.M. Bishop, "Magnification Factors for the SOM and GTM Algorithms", Proceedings 1997 Workshop on Self-Organizing Maps, 1997, 6 pages.

A.W. Toga et al., "Mapping the Human Connectome", Neurosurgery 71 (1), Jul. 2012, 8 pages.

J. Zhang et al., "Structure of visual perception", Proc. Natl. Acad. Sci. USA, vol. 87, Oct. 1990, pp. 7819-7823.

A.M. Rodriguez et al., "The differiential geometry of perceptual similarity", [arXiv:1708:00138v1], 2017, 23 pages.

* cited by examiner

Precomputation of ISDS Property

Use of ISDS Property

```
0.0   0.01  0.01  0.01  0.01  0.01  0.0   0.0
0.01  0.02  0.02  0.03  0.02  0.02  0.01  0.0
0.01  0.02  0.04  0.04  0.04  0.02  0.01  0.0
0.01  0.03  0.04  0.05  0.04  0.03  0.01  0.0
0.01  0.02  0.04  0.04  0.04  0.02  0.01  0.0
0.01  0.02  0.02  0.03  0.02  0.02  0.01  0.0
0.0   0.01  0.01  0.01  0.01  0.01  0.0   0.0
0.0   0.0   0.0   0.0   0.0   0.0   0.0   0.0
```

```
-0.0   -0.01  -0.01  -0.01  -0.01  -0.01  -0.0   -0.0
-0.01  -0.02  -0.02  -0.03  -0.02  -0.02  -0.01  -0.0
-0.01  -0.02  -0.04  -0.04  -0.04  -0.02  -0.01  -0.0
-0.01  -0.03  -0.04   0.95  -0.04  -0.03  -0.01  -0.0
-0.01  -0.02  -0.04  -0.04  -0.04  -0.02  -0.01  -0.0
-0.01  -0.02  -0.02  -0.03  -0.02  -0.02  -0.01  -0.0
-0.0   -0.01  -0.01  -0.01  -0.01  -0.01  -0.0   -0.0
-0.0   -0.0   -0.0   -0.0   -0.0   -0.0   -0.0   -0.0
```

| | | | | | | | |
|---|---|---|---|---|---|---|---|
| 0.01 | 0.01 | 0.02 | 0.03 | 0.02 | 0.01 | 0.01 | 0.0 |
| 0.01 | 0.02 | 0.02 | 0.03 | 0.02 | 0.02 | 0.01 | 0.0 |
| 0.01 | 0.02 | 0.03 | 0.03 | 0.03 | 0.02 | 0.01 | 0.0 |
| 0.01 | 0.02 | 0.03 | 0.03 | 0.03 | 0.02 | 0.01 | 0.0 |
| 0.01 | 0.02 | 0.03 | 0.03 | 0.03 | 0.02 | 0.01 | 0.0 |
| 0.01 | 0.02 | 0.02 | 0.03 | 0.02 | 0.02 | 0.01 | 0.0 |
| 0.01 | 0.01 | 0.02 | 0.03 | 0.02 | 0.01 | 0.01 | 0.0 |
| 0.01 | 0.01 | 0.02 | 0.02 | 0.02 | 0.01 | 0.01 | 0.0 |

| | | | | | | | |
|---|---|---|---|---|---|---|---|
| -0.01 | -0.01 | -0.02 | -0.03 | -0.02 | -0.01 | -0.01 | -0.0 |
| -0.01 | -0.02 | -0.02 | -0.03 | -0.02 | -0.02 | -0.01 | -0.0 |
| -0.01 | -0.02 | -0.03 | -0.03 | -0.03 | -0.02 | -0.01 | -0.0 |
| -0.01 | -0.02 | -0.03 | 0.97 | -0.03 | -0.02 | -0.01 | -0.0 |
| -0.01 | -0.02 | -0.03 | -0.03 | -0.03 | -0.02 | -0.01 | -0.0 |
| -0.01 | -0.02 | -0.02 | -0.03 | -0.02 | -0.02 | -0.01 | -0.0 |
| -0.01 | -0.01 | -0.02 | -0.03 | -0.02 | -0.01 | -0.01 | -0.0 |
| -0.01 | -0.01 | -0.02 | -0.02 | -0.02 | -0.01 | -0.01 | -0.0 |

| | | | | | | | |
|---|---|---|---|---|---|---|---|
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.01 | 0.02 | 0.03 | 0.04 | 0.03 | 0.02 | 0.01 | 0.0 |
| 0.04 | 0.08 | 0.13 | 0.15 | 0.13 | 0.08 | 0.04 | 0.01 |
| 0.01 | 0.02 | 0.03 | 0.04 | 0.03 | 0.02 | 0.01 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |

| | | | | | | | |
|---|---|---|---|---|---|---|---|
| -0.0 | -0.0 | -0.0 | -0.0 | -0.0 | -0.0 | -0.0 | -0.0 |
| -0.0 | -0.0 | -0.0 | -0.0 | -0.0 | -0.0 | -0.0 | -0.0 |
| -0.01 | -0.02 | -0.03 | -0.04 | -0.03 | -0.02 | -0.01 | -0.0 |
| -0.04 | -0.08 | -0.13 | 0.85 | -0.13 | -0.08 | -0.04 | -0.01 |
| -0.01 | -0.02 | -0.03 | -0.04 | -0.03 | -0.02 | -0.01 | -0.0 |
| -0.0 | -0.0 | -0.0 | -0.0 | -0.0 | -0.0 | -0.0 | -0.0 |
| -0.0 | -0.0 | -0.0 | -0.0 | -0.0 | -0.0 | -0.0 | -0.0 |
| -0.0 | -0.0 | -0.0 | -0.0 | -0.0 | -0.0 | -0.0 | -0.0 |

(A)
| $\mu_{F\to\Phi}$ | | |
|---|---|---|
| Feature space (F) | Physical space ($\Phi$) | |
| i | i=X | j=Y |
| 0 | 0 | 0 |
| 1 | 0 | 1 |
| 2 | 1 | 0 |
| 3 | 1 | 1 |
| ⋮ | ⋮ | ⋮ |
| n | n | n |
(B)
| $\mu_{\Psi\to\Phi}$ | | | |
|---|---|---|---|
| Perceptual space ($\Psi$) | | Physical space ($\Phi$) | |
| $\psi_0$ | $\psi_1$ | i=X | j=Y |
| $c_0$ | $d_0$ | 0 | 0 |
| $c_1$ | $d_1$ | 0 | 1 |
| $c_2$ | $d_2$ | 1 | 0 |
| $c_3$ | $d_3$ | 1 | 1 |
| ⋮ | ⋮ | ⋮ | ⋮ |
| $c_n$ | $d_n$ | n | n |
*FIG. 45*
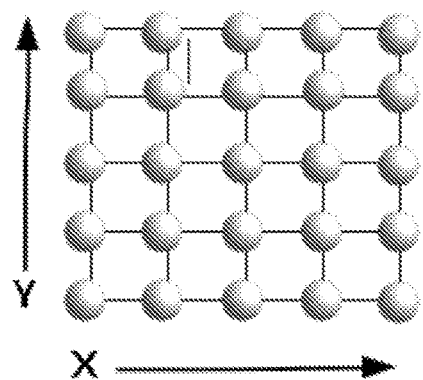
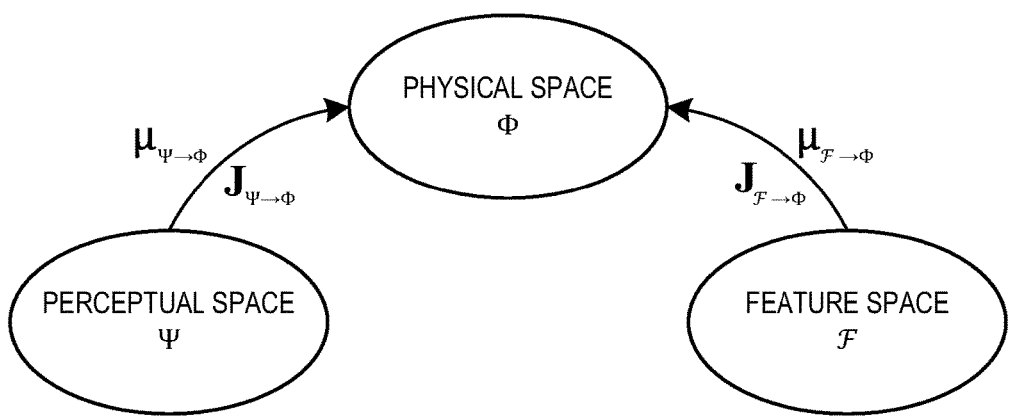
*FIG. 46*

FIG. 47

COMPUTER-IMPLEMENTED PERCEPTUAL APPARATUS

RELATED APPLICATIONS

This application is a continuation of U.S. patent application Ser. No. 16/632,702, filed on Jan. 21, 2020, which is a U.S.C. 371 filing of International Application No. PCT/US2018/043963, filed on Jul. 26, 2018, which claims priority to U.S. Provisional Patent Application No. 62/537,261, filed Jul. 26, 2017. Each of these applications is incorporated herein by reference in its entirety.

STATEMENT REGARDING FEDERALLY SPONSORED RESEARCH OR DEVELOPMENT

This invention was made with government support under Grant Number N000140-15-1-2823, awarded by DARPA, and Grant Number N00014-15-1-2132, awarded by ONR. The government has certain rights in the invention.

BACKGROUND

A perceptual apparatus is a system which converts sensory data to a new format using pre-specified transforms. In nature, brains have evolved, in part, to perform perception, that is, to perceive stimuli in a manner which has proven useful for survival. In the engineered devices of humans, perceptual apparatuses are often used to prepare stimuli for decision-making. For example, an electrical servo may convert a waveform frequency into an angle, an airplane navigation system may convert a signal from a pressure sensor into an altitude, and a self-driving vehicle may convert RGB pixels of an image into representations of paths and obstacles.

Data compression is used throughout computer and internet applications, for reducing the size of sound, video, and image files while retaining sufficient quality for recognition; in turn, this necessitates methods for ascertaining how to measure "sufficient quality for recognition" quantitatively.

A significant distinction exists between "lossless" and "lossy" compression; the former is fully reversible (i.e., an exact version of the original can be reproduced from the compressed version) whereas the latter (lossy) is not. Lossless compression only removes redundancies from data, and accordingly achieves only limited (typically modest) size reduction. Lossy compression attempts to identify and approximate regularities in the data that (it is hoped) will not be missed by human perceivers, when reduced or removed. Lossless compression includes formats such as PNG, TIFF, WAV, and ZIP; all those mentioned within the remainder of the present application are lossy.

Common lossy compression formats are JPEG (ISO-10918) and JPG2000 for images; MP3, Opus, and AAC for sound; and H.262 (MPEG-2), H.264 (MPEG-4), and H.265 (HEVC) for video. A distinction exists between these "codecs" (coder/decoder) and "containers" (e.g., MP4, Flash, WMV) which simply are standardized formats for transfer of files; the distinction sometimes becomes blurred as particular containers tend to be paired with particular codecs, though they need not be.

Intrinsic to any evaluation of lossy data compression is comparison between original and transformed data, i.e., measures of difference or distance. The new, smaller, encodings of data are compared against the original to measure two key factors: (1) how much smaller the reduced form is than the original, and (2) exactly how "different" the reduced version is from the original.

The former factor, size reduction, depends on the encoding that gets used to store a compressed stimulus. In general, the "reducibility" of a given encoding is a function of its entropy.

The latter factor, which can refer to stimulus "quality," or "fidelity," or comparison between stimuli, is elusive. When a musical piece is compressed, to what extent is it still recognizable as the original piece? To what extent does it sound "different" from the original (this typically is termed "reference based" quality assessment), or to what extent does it sound "good" or "acceptable" on its own, without reference to any prior original stimulus (typically referred to as "no-reference based" assessment). The only known means of correctly identifying whether a stimulus is perceived as having been diminished from its original form is via human evaluations; there is as yet no known method for ascertaining these evaluations other than empirically.

Subjective measures typically take the form either of successive pairwise comparisons (to achieve a partial ordering), or of evaluations on a rating scale (e.g., 1-5)). Standard measures are MOS (mean opinion scores), compiled from queries of "goodness" of stimuli to human subjects, and DMOS, (differential mean opinion scores), denoting the difference between scores for "reference" vs "processed" or "degraded" stimuli. Such scores are ultimately the key measures of usability of any proposed compression method. Much work has been done to try to construct systems for artificially estimating these human evaluations.

Important implications also exist for the problem of image quality analysis (IQA). This long-standing challenge of predicting the perceived degree of degradation of an image given a particular image and degradation function has been well studied. A common simple method of estimating image differences is measuring the root mean squared error (RMS) or peak signal to noise ratio (PSNR), which is readily derived as a variant. In RMS error, the error e at each given pixel location (x, y) in an image is simply the difference between the value at that location in the original f vs in the compressed version $\hat{f}$:

$$e(x,y) = \hat{f}(x,y) - f(x,y) \quad (1)$$

so the mean of all the pixel-wise errors between the two images errors is:

$$\frac{1}{MN}\sum_{x=1}^{M}\sum_{y=1}^{N}(\hat{f}(x,y) - f(x,y))^2 \quad (2)$$

and the RMS error is the square root of this quantity:

$$e_{RMS} = \sqrt{\frac{1}{MN}\sum_{x=1}^{M}\sum_{y=1}^{N}(\hat{f}(x,y) - f(x,y))^2} \quad (3)$$

RMS and PSNR measures have been shown to be, at best, only gross approximations of empirical human judgments. Said measures do not capture information fundamental to the human visual system, such as the interaction between the intensity of two adjacent pixels, and consequently tend to predict human degradation judgements poorly (e.g., 0.4691 Spearman correlation on our new dataset). Attempts to fashion algorithms to more closely match actual human data have led to the development of a plethora of measures (UQI, VSNR, VIF, SSIM, MS-SSIM, CW-SSIM, FSIM, etc.). One such is the SSIM (Structural SIMilarity) measure. Said method entails measures of image luminance (the pairwise difference between two images' pixels) and local contrast, variance normalization, and "structure" comparison via measures of correlation coefficients across normalized images. These are suggested to reflect one hand-designed aspect of human visual system (HVS) function; SSIM was presented as in part embodying consideration of what the HVS may likely be accomplishing as it evaluates stimuli. While this approach drastically improved predictive power (e.g., 0.6946 Spearman correlation on our new dataset), it clearly missed important variation in perceived distance. To close this predictive gap, the most recent approaches such as Google's Butteraugli dove further into the precise, predictable functions of the retina and other low-level systems.

SUMMARY

A novel system includes hardware that is able to accelerate both the mapping of inputs to a Riemannian space using a Jacobian matrix, as well as comparing distances between points of the Riemannian space to as to identify which points are nearest and which are furthest. By accelerating both parts of the system, the system is able to achieve real-time performance while not drawing so much power as to ruin the battery life of systems that need these computations, such as real-time robots and augmented reality visual systems.

Embodiments herein overcome disadvantages of the prior art by producing an efficient electronic perceptual apparatus which projects multivariate input data onto a perceptual manifold using Jacobian matrices, and a set of three methods (inner-workings-agnostic) for generating a function for producing such Jacobians which embodies particularly useful principles. Specifically:

Hardware for an efficient perceptual apparatus which applies Jacobian(s) to data.

Method (I) for generating Jacobian(s) as approximations of neural synaptic connectivity, for use replicating the behavior of those synapses.

Method (II) for generating Jacobian(s) as approximations of a brains behavior, for use replicating the behavior to study the brain or outperform existing algorithms.

Method (III) for creating Jacobian(s) which approximate the best perceptual apparatus for a particular task.

A novel electronic device ("hardware") for performing each of the above methods, as well as for using the generated Jacobian(s) on new inputs. This hardware is more efficient at these tasks than conventional hardware (e.g., based on a von Neumann architecture) and enables new capabilities which were otherwise not feasible with slow computation.

One or more aspects of the embodiments provide Method Ia (i.e., single Jacobian). Direct or functional connectivity of the natural perceptual apparatus is measured, then weights are placed in the Jacobian.

Method Ia, multiple hierarchical/deep Jacobians. Direct or functional connectivity of the multi-tier natural perceptual apparatus is measured, then weights are placed in one Jacobian per tier.

Method Ia, multiple Jacobians generated as a function of the input. Direct or functional connectivity of the (single- or multi-tier) natural perceptual apparatus is measured DURING perception of various input stimuli. A best-fit function, embodied as a lookup table with one entry per item or one entry per cluster of items, is derived which approximates the Jacobian representing said connectivity for each stimulus.

Method Ib, Jacobian(s) populated as approximations of true (possibly unmeasurable) connectivity based on aggregate human knowledge. This includes a single Jacobian, as well as a hierarchy of Jacobians or Jacobians which are a function of the input, depending on the level of detail aggregate human knowledge provides. For example, if input features are known to have implicit positional relations (e.g., auditory frequency or pixel coordinates), and input nodes of the perceptual apparatus have a known receptive field in this implicit coordinate space, and connectivity to output nodes is known to be Gaussian fan in/fan out in this implicit coordinate space, then the Jacobian is as described in FIG. 1.

Method IIa, single Jacobian or "deep" hierarchy of Jacobians populated by finding the perceptual embedding in which measured distances best match psychophysical distances, or best match the structure of psychophysical distances.

Method IIa, function for generating Jacobians populated by finding the perceptual embedding in which measured distances best match psychophysical distances, or best match the structure of psychophysical distances. This function may have any parameterization, such as a multilinear function of the input, or a function of the input first projected into a new space (e.g., via PCA).

Method IIb, single Jacobian or "deep" hierarchy of Jacobians populated by first utilizing knowledge of the source of individual input features and/or how these features are regarded by the perceptual apparatus to create a parameterized function to generate the Jacobian(s). Next, the parameterization is found which best matches psychophysical distances, or best match the structure of psychophysical distances.

Method IIb, function for generating Jacobians which accounts both for knowledge of the source of individual input features and/or how these features are regarded by the perceptual apparatus, and for stimulus-specific information.

Method IIIa, Jacobian or "deep" hierarchy of Jacobians which produces a perceptual embedding space in which "down-stream" receiving algorithms or functions produce optimal outputs.

Method IIIa, Jacobian, "deep" hierarchy of Jacobians, or function for generating Jacobians which produces a perceptual embedding space in which "down-stream" receiving algorithms or functions produce optimal outputs.

Method IIIb, Jacobian, "deep" hierarchy of Jacobians, or function for generating Jacobians which best approximates the natural curvature of the data.

Methods for curvy/non-affine/non-constant-curvature metrics which avoid the need for $\varepsilon(\vec{x})$, simply using the nearest neighbor or a smooth function to generate the Jacobian. Tensor models may be useful for explaining individual or group differences in animals.

"Optimal" metric tensor models may be compared to a natural perceptual apparatus to evaluate said apparatus (in terms of evolutionary pressures, genetic parameterizations, etc.).

Tensor models based on Jacobians fit to the data may contain latent information about the underlying neural representations. In other words, the shape of the manifold contains information about the perceptual apparatus which projects data onto the manifold. Additionally, a comparison of manifold shape between different conditions, perceptual apparatus, brain regions, etc., may yield information.

In a first aspect, a method performed by a computing device to process a stimulus includes: retrieving, from a memory of the computing device, a Jacobian that maps a feature space to a non-Euclidean perceptual space according to a perceptual system; and mapping, with the Jacobian, the stimulus from the feature space to a target point of the perceptual space using a processor of the computing device, the target point representing a perception of the stimulus by the perceptual system.

In certain embodiments of the first aspect: (1) the method further includes encoding the stimulus as a first input vector according to a coordinate representation of the feature space; and storing the first input vector in the memory; and (2) mapping the stimulus includes multiplying the Jacobian and the first input vector to generate an output vector encoding the target point in a coordinate representation of the non-Euclidean perceptual space.

In certain embodiments of the first aspect, the method further includes: generating a metric tensor of the perceptual space with the Jacobian; encoding a second stimulus as a second input vector according to the coordinate representation of the feature space; storing the second input vector in the memory; and using the metric tensor to compute a perceptual distance between the first and second input vectors when mapped into the non-Euclidean perceptual space.

In certain embodiments of the first aspect, the Jacobian represents a multilinear function between the feature and perceptual spaces, and using the metric tensor includes multiplying the metric tensor and a difference of the first and second input vectors.

In certain embodiments of the first aspect, the method further includes constructing the Jacobian according to the perceptual system.

In certain embodiments of the first aspect, constructing the Jacobian includes constructing the Jacobian according to a connectome of a perceiver forming the perceptual system.

In certain embodiments of the first aspect, constructing the Jacobian further includes: identifying at least one anatomical connection of the connectome; identifying a synaptic strength for each anatomical connection; and forming the Jacobian according to the at least one anatomical connection and the corresponding synaptic strength.

In certain embodiments of the first aspect, identifying the anatomical connection includes measuring the anatomical connection to form anatomical connection data, identifying the synaptic strength includes measuring the synaptic strength to form synaptic strength data, and forming the Jacobian includes populating the Jacobian according to the anatomical connection data and the synaptic strength data.

In certain embodiments of the first aspect, constructing the Jacobian includes inputting at least one test stimulus to the perceptual system to generate a corresponding test distance, and determining the Jacobian according to the at least one test stimulus and the corresponding test distance.

In certain embodiments of the first aspect, determining the Jacobian includes populating the Jacobian so as to match the test distance with a psychophysical distance.

In certain embodiments of the first aspect, determining the Jacobian includes assuming a function by which a plurality of input features of the stimulus are related in the feature space, generating the Jacobian from the function, and deriving a value of at least one parameter of the function so as to match the test distance with a psychophysical distance.

In certain embodiments of the first aspect, the method further includes receiving the stimulus at the computing device.

In a second aspect, a method performed by a computing device to compress a stimulus includes: storing a feature vector representative of the stimulus in a memory of the computing device; projecting the feature vector, using a processor of the computing device, into a first perceptual-space vector of a non-Euclidean perceptual space with an eigenvector basis obtained from a heat equation, the first perceptual-space vector having a first error and a first entropy; applying an update operator, using the processor, to move the first perceptual-space vector to a second perceptual-space vector such that a second entropy of the second perceptual-space vector is less than the first entropy, and a second error of the second perceptual-space vector is greater than the first error; and rounding the second perceptual-space vector.

In certain embodiments of the second aspect, applying the update operator includes forming the update operator according to a selected target entropy such that the second entropy equals the target entropy.

In certain embodiments of the second aspect, forming the update operator includes constructing a diagonal update matrix from a plurality of column vectors, each column vector being a solution of an entropy term of the heat equation.

In certain embodiments of the second aspect, the method further includes Fourier transforming, by the processor, the stimulus to generate the feature vector.

In certain embodiments of the second aspect, Fourier transforming includes applying a discrete cosine transformation to the stimulus.

In certain embodiments of the second aspect, the method further includes receiving the stimulus at the computing device.

In a third aspect, a system that processes a stimulus includes: memory storing the stimulus and a Jacobian that maps a feature space to a non-Euclidean perceptual space according to a perceptual system; a processor; and a non-Euclidean mapping engine, implemented as machine-readable instructions stored in the memory, and executable by the processor to use the Jacobian to map the stimulus from the feature space to a target point of the non-Euclidean perceptual space such that the target point represents a perception of the stimulus by the perceptual system.

In certain embodiments of the third aspect, the non-Euclidean mapping engine is further implemented with machine-readable code executable by the processor to encode the stimulus as a first input vector according to a coordinate representation of the feature space, and the machine-readable instructions to use the Jacobian include machine-readable instructions to multiply the Jacobian and the first input vector to generate an output vector encoding the target point in a coordinate representation of the non-Euclidean perceptual space.

In certain embodiments of the third aspect, the non-Euclidean mapping engine is further implemented with machine-readable instructions executable by the processor to: generate a metric tensor of the non-Euclidean perceptual space with the Jacobian; encode a second stimulus as a second input vector according to the coordinate representation of the feature space, the second input vector being stored in the memory; and use the metric tensor to compute a perceptual distance between the first and second input vectors when mapped into the non-Euclidean perceptual space.

In certain embodiments of the third aspect, the Jacobian represents a multilinear mapping between the feature and non-Euclidean perceptual spaces, and the machine-readable instructions to use the metric tensor include machine-readable instructions to multiply the metric tensor and a difference of the first and second input vectors.

In a fourth aspect, a system that compresses a stimulus includes: memory storing a feature vector representative of the stimulus in a feature space; a processor; and a lossy compression engine, implemented as machine-readable instructions stored in the memory, and executable by the processor to: (i) project the feature vector from the feature space to a first perceptual-space vector of a non-Euclidean perceptual space using an eigenvector basis obtained from a heat equation, (ii) apply an update operator that moves the first perceptual-space vector to a second perceptual-space vector such that a second entropy of the second perceptual-space vector is less than a first entropy of the first perceptual-space vector, and a second error of the second perceptual-space vector is greater than a first error of the first perceptual-space vector, and (iii) round the second perceptual-space vector.

In certain embodiments of the fourth aspect, the machine-readable instructions to apply the update operator include machine-readable instructions to form the update operator according to a selected target entropy such that the second entropy equals the target entropy.

In certain embodiments of the fourth aspect, the lossy compression engine is further implemented with machine-readable instructions executable by the processor to Fourier transform the stimulus to generate the feature vector.

In certain embodiments of the fourth aspect, the machine-readable instructions to Fourier transform the stimulus include machine-readable instructions to apply a discrete cosine transformation to the stimulus.

BRIEF DESCRIPTION OF THE FIGURES

FIG. 45, A-B, shows how an index of a feature dimension maps to a location in physical space, and how an element of a perceptual space maps to a node of a physical space.

FIG. 46 illustrates mapping between feature, perceptual, and physical spaces.

FIG. 47, A-B, shows two equivalent representations for the metric tensor for covering each grid point in the perceptual space.

DETAILED DESCRIPTION OF THE EMBODIMENTS

Non-Euclidean Geometric Curvature

Figure 1:
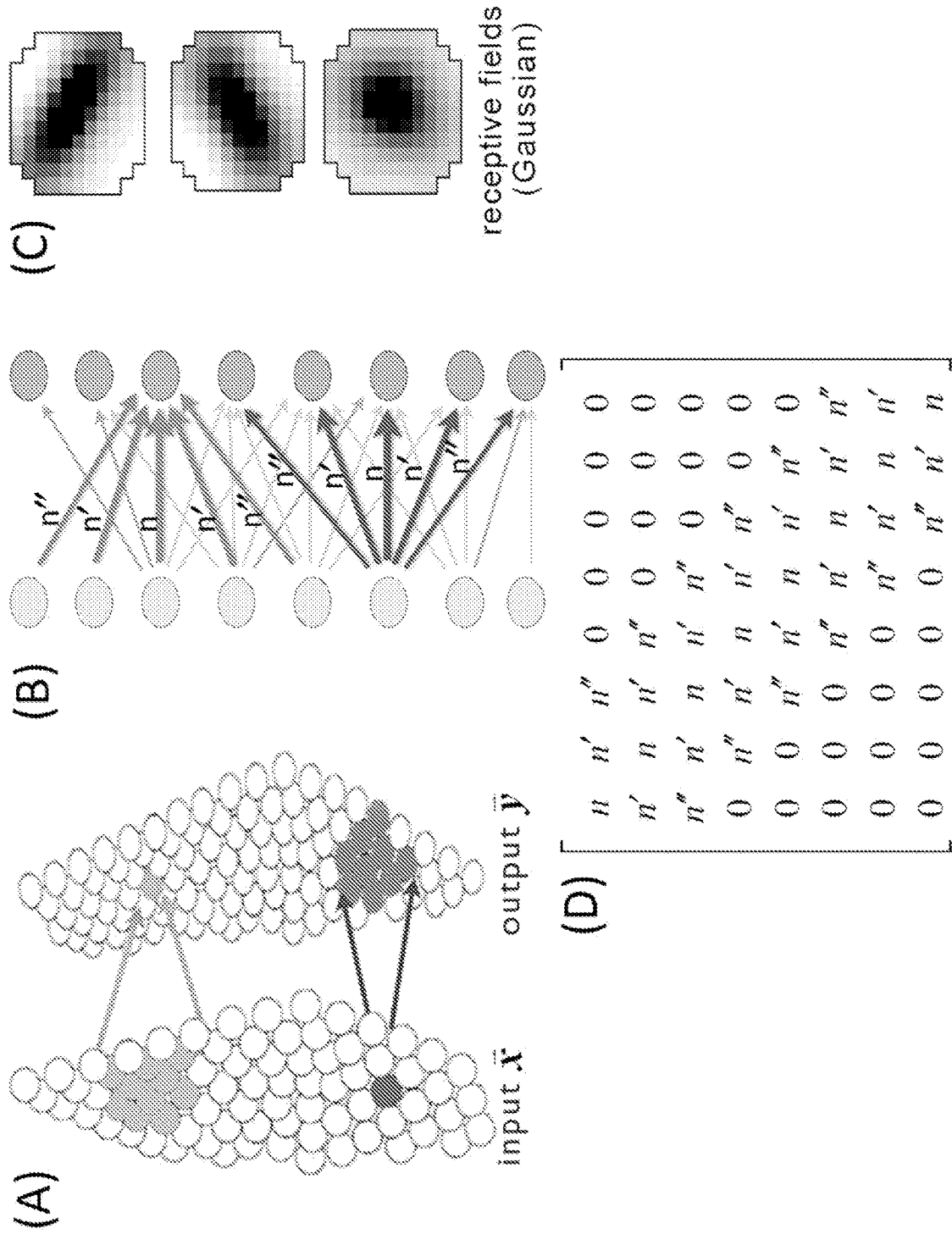
FIG. 1, A-D, illustrates non-Euclidean mapping of anatomical connectivity between brain regions, in embodiments.

A perceptual system is any system that perceives, that is, extracts from a stimulus information which is putatively relevant for its function. A stimulus is a detectable change in a physical environment, and a perceptual system responds to the stimulus by converting it into a computational form via sensory transduction. A perceptual system may be a natural perceptual system, such as the visual system, auditory system, or olfactory system of an organism (e.g., a human being), wherein sensory transduction is performed by at least one sensory organ. Alternatively, a perceptual system may be an artificial system engineered to perform functions based on information obtained by sensing a surrounding physical environment; an artificial neural network is one example of an engineered perceptual system. An artificial perceptual system uses at least one sensor to transduce (i.e., convert) a stimulus into a computational form. The transduced stimulus is then processed by the perceptual system, generating a perception.

An artificial perceptual system may be engineered to replicate a natural perceptual system. For example, a facial recognition system is designed to optically sense the physical environment in a manner similar to human sight, and identify human faces as a human being would when seeing; in this case, the facial recognition system is engineered to replicate aspects of the visual system of a human being. Other artificial perceptual systems do not replicate a natural perceptual system. For example, a carbon monoxide detector senses carbon monoxide gas, for which there is no human sensory organ responsive to the stimulus (i.e., carbon monoxide is tasteless, odorless, and invisible). As shown by the examples of the artificial neural network and carbon monoxide detector, a perceptual system need not have an underlying psychology.

In the following description, the term "stimulus" may refer to either the detectable change in the physical environment or the corresponding transduced form of the detectable change. For example, the stimulus may be a visual stimulus corresponding to light impinging on an image sensor. The term "stimulus" may also apply to the electronic signal(s) outputted by the image sensor in response to the impinging light, and may furthermore apply to digital representations of the image sensor output (i.e., image data or digital video data). Alternatively, the stimulus may be an audio stimulus (i.e., sound waves) detected by a microphone. In this case, the term "stimulus" may also apply to the electronic signal outputted by the microphone in response to the audio stimulus, and may furthermore apply to digital representations of the microphone output (i.e., digital audio). Another type of stimulus (e.g., balance, acceleration, orientation, pain, electroreception, magnetoception, time perception, temperature, social perception, speech, face recognition), and corresponding electronic signals and representations generated via transduction and/or signal processing, may be used with the embodiments herein without departing from the scope hereof.

Embodiments described herein provide a mathematical framework and corresponding hardware that process stimuli according to a perceptual system. More specifically, these embodiments replicate perception by a perceptual system operating in a non-Euclidean space. A perceptual system has the opportunity to consider the feature dimensions which make up its input space in a combinatorial fashion. In fact, it is rare to find circuits in the brains of animals which consider each dimension as unrelated to the rest. This rare perceptual mapping is Euclidean, in that the result of perception is related to a linear function of the position of a stimulus in the Euclidean (or, more generally Hilbert) space of orthogonal axes. In this space, perception is simple. A change in magnitude of one feature has no bearing on any other. It is the simplicity of this space which belies its effectiveness: in the real world, the features of stimuli are highly related to one another in a pattern which provides information about the stimulus not apparent in the sum of its parts. In the brain, nature has adopted a strikingly non-Euclidean perceptual mapping. A combination of other features dictates how a particular feature is perceived. Natural perceptual systems are non-Euclidean: they consider the ensemble of stimulus features in concert, using one feature to determine how to interpret another. Yet most engineered systems for the useful interpretation of stimuli (herein called perceptual apparatus), even those systems working to emulate natural perception which we know is non-Euclidean, still use Euclidean perceptual mappings. Certain embodiments presented herein include a mathematical framework and corresponding hardware for defining, manipulating, and using non-Euclidean perception. They can be applied towards approximating existing mappings or for creating new, superior mappings for arbitrary stimuli and numerous tasks.

An illustrative example of a non-Euclidean mapping is the fan-in/fan-out anatomical connectivity between brain regions depicted in FIG. 1A. FIG. 1B illustrates a simplified rendering of the connectivity pattern into vectors. In the case shown, the stimulus $\vec{x}$ in feature space F projects to target vector $\vec{\bar{x}}$ in perceptual space $\Psi$ via synaptic connections labeled n', n'', n''', etc. Each individual synaptic connection denotes a "weight," indicating the multiplicative factor by which the value of a given input vector component is multiplied before being added to the sum of values at a given target. FIG. 1C illustrates typical receptive fields exhibited physiologically by cells in some regions of visual cortex. It is known that patterns of exactly this form can be identified in the brain by taking derivatives of target cells with respect to their inputs, i.e., $\partial\vec{\bar{y}}/\partial\vec{\bar{x}}$ Eqn. 4 shows an example of a Jacobian matrix $J_{F\to\Psi}(\vec{x})$ that is formed in just this fashion: each element in the matrix is the partial derivative of an output element with respect to an input element, i.e., $\partial\Psi_j/\partial f_i$. The Jacobian has entries for every candidate pair of input and output. Each entry denotes the change in an element of $\vec{y}$ as consequence of a change in a particular element of $\vec{x}$. This dictates how the perceptual apparatus will treat the stimulus. A perceiver will process an input as though it contains the neighbor relations specified by the Jacobian. FIG. 1D shows the sample Jacobian that corresponds to the simplified diagram in FIG. 1B.

$$J_{F\to\Psi}(\vec{x}) = \begin{bmatrix} \frac{\partial \Psi_0}{\partial f_0} & \cdots & \frac{\partial \Psi_0}{\partial f_p} \\ \vdots & \ddots & \vdots \\ \frac{\partial \Psi_q}{\partial f_0} & \cdots & \frac{\partial \Psi_q}{\partial f_p} \end{bmatrix} \quad (4)$$

Whatever pattern of anatomical connections exist in a brain circuit projection pathway, the circuit's response to a particular stimulus can be fully characterized by a Jacobian (or by a linear combination of Jacobians, which in turn can be simplified to be a single Jacobian). The circuit's response to any number of stimuli can be represented as a set of Jacobians when the appropriate nonlinear function of $\vec{x}$ is used to produce one. Thus, $J_{F\to\Psi}(\vec{x})$, which is a function of the input $\vec{x} \in F$, can fully characterize the operation that is carried out by a brain circuit or succession of brain circuits in response to a given stimulus. This is because, at each point, some axes can be closer to or farther from other axes, causing attendant interactions among the values along those axes. In other words, the axes in these non-Euclidean spaces can be curved relative to each other. These interactions cannot occur in Euclidean spaces, the special case of orthogonal axes with uniform zero curvature, or in affine spaces (spaces with uniform curvature) of oblique axes where parallelism must be preserved. Such interactions only exist in the more general classes of Riemannian, pseudo-Riemannian, or non-Riemannian metric spaces in which, intuitively, any given axis may be considered to contain regions that are "closer" to some axes and farther from others. Non-Euclidean metric spaces define inner products which are smooth, bilinear, symmetric, and non-degenerate. Even more general are metric spaces which are not pseudo-Riemannian; they need not possess any of said properties. Throughout the present application, we consider the most general case. We will simply refer to modeled perceptual spaces as Riemannian when examples are pseudo-Riemannian, Riemannian, or affine. We define the input vector $\in F$ as encoding the set of stimulus features, such as components of an image or a sound, and the target vector $\in \Psi$ as encoding the perceptual representation of that stimulus.

Now we consider providing inputs vectors $\vec{a}$, $\vec{b}$, and $\vec{c} \in F$ to this simple structure, and ask two questions: (1) what are the distances among these stimuli, i.e., $d(\vec{a}, \vec{b})$, $d(\vec{a}, \vec{c})$, and $d(\vec{b}, \vec{c})$; and (2) what are the distances among their induced target vectors? We pose this as an initial simplified form of the perceptual distance question which embodiments herein leverage, that is, when two arbitrary input stimuli are presented to a brain circuit, we present a method for effectively computing the distances among the target vectors.

Because any vector in a Euclidean (or Hilbert) space is defined in terms of orthogonal axes, the distance from that vector to any other often does not depend on the order in which those axes appear in the vector; i.e., $$\vec{a} = \begin{bmatrix} 1 \\ 0 \\ 0 \end{bmatrix}$$

is equally distant from $$\vec{b} = \begin{bmatrix} 0 \\ 1 \\ 0 \end{bmatrix}$$

and from $$\vec{c} = \begin{bmatrix} 0 \\ 0 \\ 1 \end{bmatrix}.$$

It is notable that for many similarity measures, including Euclidean, correlation, Hamming, and Mahalanobis, this will be true. However, in a non-Euclidean space, vector axes can be non-orthogonal. Separate entries comprising the vector may no longer be independent of each other. In one intuitive example, the auditory pitch created by pressing a piano key is perceived as more similar to the pitch created by a nearby key than one more distant; the "closer" the entries within the vector of piano keys, the closer the non-Euclidean distances between the vectors themselves. In these non-Euclidean spaces, the distance from one vector to another is dependent on the order in which the axes appear in the vector. In this particular non-Euclidean space, the vectors $\vec{a}$ and $\vec{b}$ may be closer to each other than $\vec{a}$ and $\vec{c}$.

Brain Connectomes Define the Jacobian

Intuitively, a Jacobian encodes the interactions among stimulus components. If a vector contains purely independent entries (as in a purely Euclidean space), the Jacobian would be the identity matrix: ones along the diagonal and all other entries zeros. Each vector dimension then has no effect on other dimensions. In the specific case shown in FIG. 1 the only non-zero values in the Jacobian matrix correspond to existing synaptic connections. Any off-diagonal matrix entries reflect influences of one dimension on others, as in the neighbor effects of any stimuli that have topographic organization. For radially-extended topographic projections such as shown in FIG. 1, these will be in Toeplitz form, with the diagonal stripe of non-zero entries corresponding to the extent of radial axonal arborization in the projection from input to target.

Any perceptual system intrinsically expresses a "stance" on the relations that occur among the components of the stimuli it processes. If the Jacobian contains no off-diagonal entries, the system acts as though it assumes independence of components. If the Jacobian does contain off-diagonal entries, as in virtually any non-degenerate projection path among cortical regions, then the processing of the input is inherently assuming neighbor relations in the stimuli. This indeed is typically a correct assumption of visual or auditory stimuli; the "neighbor" relations among components of an image, or a melody, form a critical part of effective perception of those stimuli. In correspondence with this assumption, anatomical connectivity patterns in the brain (whether topographic or non-topographic) project input patterns into a distinct metric space that is determined by synaptic connections.

It is notable that any bank of neuronal elements with receptive fields consisting either of Gaussians or of first or second derivatives of Gaussians will compute the derivatives of their inputs in precisely the form that arises in the tensor computations just presented. Physiological neuron response patterns thus appear thoroughly suited to producing transforms into spaces with non-Euclidean metric curvatures.

This view also directly implies a formal interpretation of synaptic plasticity. Any synaptic change may be thought of as causing specific re-shaping of neurons' receptive fields (yielding different responses that still are Gaussian). The resulting target Riemannian space will have curvature that can precisely be specified by the corresponding synaptic modification. Plasticity of a particular synapse on a target cell acts by modifying the curvature of the Riemannian space in a particular cell of the Jacobian.

Metric Tensors

Pseudo-Riemannian metric tensors have been effectively used to project multidimensional inputs onto a surface, called a manifold, on which decisions or predictions can more easily be made. For example, in physics they are used to model space-time under principles of general relativity, allowing the distance between two points in space to be measured not in Euclidean coordinates but in terms of travel effort. Outside of physics, Pseudo-Riemannian metric tensors are used in computers for a number of purposes from spacecraft navigation to machine learning.

It has been understood for some time that structure in multidimensional data is very often not best detected in Euclidean space. Tensor network theory postulated that neural networks in the brain (especially those involving the cerebellum or touch sense) processed spatiotemporal information by projecting inputs into neural representational spaces by a series of metric tensors. Early work in human vision achieved partial success at mapping the 3D geometry of the visual world onto the retina and early visual areas using custom-designed Riemannian metric tensors. More recently, the correlational structure of patches in human brain region V1 has been represented as a particular Riemannian manifold. Riemannian manifolds have also been found to be superior spaces in which to perform computer vision. For example, describe the use of the Laplace-Beltrami operator, graph Laplacian, and the heat equation to embed high-dimensional visual stimuli on low-dimensional Riemannian manifolds. They apply this manifold embedding approach to a number of datasets from visual bar detectors to speech, and describe semisupervised learning methods for Riemannian manifolds which fuse manifold learning with supervised computer vision. This approach has been applied in variations to numerous problems in computer science and engineering. Certain prior art approaches review how deep artificial neural networks can operate on so-called "geometric data"—that is, data whose features have non-Euclidean relations. The authors visit the special non-Euclidean space of image pixel features (on which RGPEG is based) and extend convolutional neural networks to convolution on arbitrary manifolds.

Feature maps (also known as reproducing kernel Hilbert spaces), often used in machine learning and in neural architectures, represent each multivariate input as a collection of responses of linear functions on the input. While each of these functions is linear in nature, it can be tuned to represent differences in a particular part of the input space, thus acting as one component of a local tangent space on the manifold. A large number of these functions can, when well chosen, flatten the manifold. Because of practical challenges in selecting the right combination of these functions and because of residual nonlinearities in the data, the functions that make up feature maps are seldom independent, and researchers have created methods with which to interpret this feature space of generating Riemannian metric tensors. For example, the Fisher-Rao metric can be used to compute the Jacobian about a point in order to determine its posterior probability nonparametrically. However, their methods neither require nor attempt the learning of the entire manifold, instead focusing on task-driven parametric models.

The Nash embedding theorem states that any sufficiently smooth manifold can be represented in a Euclidean space of higher but non-infinite dimensionality. In cases where high dimensional (probably sparse) spaces are acceptable, a common approach is to approximate the manifold and then create a high dimensional Euclidean embedding. However, these high-dimensional sparse feature spaces do not explicitly represent the properties of the manifold, and are unlikely to compete with the present embodiments in computational performance. In the opposite operation, nonlinear dimensionality reduction can be performed on a Riemannian manifold to create a lower-dimensional space which preserves much of the nonlinear information from the original space. This is often called "manifold learning". However, this usually accepts a loss of information from the input which may be valuable in perception.

JPEG and related lossy image compression algorithms (as briefed above) assume that the discrete cosine coefficients are independent, when in most cases there is dependence. Certain prior art approaches have identified two sources of non-Euclidean relations in JPEG: feature redundancies, where discrete cosine coefficients are found to not be independent within a single image in practice, and perceptual redundancy, in which perceived degradation caused by degrading one discrete cosine coefficient feature should not, as it does in JPEG, depend on the values of other features. The authors note that JPEGs are sub-ideal because they try to account for perceived degradation only after committing to a feature space (DCT features). Accounting for feature and perceptual redundancies using nonlinear divisive normalization on a weighted DCT, the authors outperformed JPEG by a sizeable margin. They generate a Jacobian in their work, dubbing it the "perceptual metric matrix" and noting that Riemannian geometry applies to measurements using this matrix (without going into much detail). In contrast to RGPEG, their approach is limited to an affine tensor and doesn't use the heat equation, though it is unclear if it's needed.

In psychology, certain prior art approaches discussed the construction of "conceptual spaces" in which concepts exist as convex regions in an abstract perceptual space and in which features are considered to covary. Certain approaches formalize conceptual space theory using Euclidean metric spaces.

When a manifold is explicit to the data, such as a surface in 3D space, operations in computer vision such as feature alignment and action recognition can be performed on the shape of the manifold. Finally, methods for performing statistical analysis such as model comparison, regularization, and probability estimation on a Riemannian manifold or under the assumptions of non-Euclidean feature space have been described, and classification on carefully parameterized Riemannian manifolds has been performed.

There are many studies of, e.g., "neural network attractor" systems, though to our knowledge these have not incorporated the mathematics of Riemannian differential geometry described herein. Differential geometry has been applied to other, somewhat related concepts, such as use of the Fisher information metric to describe what has been termed "information geometry," and to developing supervised dimensionality reduction, and segmentation tasks.

Hardware Implementation

A common method for converting sensor input, such as imagery, into a feature space that may be operated upon by artificially intelligent learning algorithms involves converting the input data into a binary vector using a codebook or "bag of words". Each "word" is actually a separate input that has previously been seen, and when this input is identified in a new input the codebook representation has the bit representing that word as set to a Boolean true value (a "1" bit"). If that word does not have a match in the current image then the bit is set to false (a "0" bit). The input may be converted to a binary vector where each value in the vector represents the presence or absence of a particular code word from the codebook having been found or not found in the current input, respectively. The bag of words representation has deficiencies where the relative locations of the features to each other are of import. For example, if the codebook has an image of smiling lips, an eye and a nose, and a new input image contains these parts, then the bits will be set regardless of how the eye, lips, and nose are placed on the image. In some cases those parts may be located in places that suggest that the image contains a normal looking face, whereas when the lips are at the top of the image, nose at the bottom, and eye in the middle, the image will not look at all like a normal face and yet the codebook representation is the same.

While the previous example considered the presence of a visual word anywhere in the image as a "1-bit" in the feature vector, it is possible to divide the image into many separate parts and each part of the image gets its own vector. In this case a local feature vector will only have a "1-bit" if the region within the image that that vector is responsible for representing contains the feature. Systems may be built on top of such local feature vector systems such as convolutional neural networks. Convolutional neural networks take into account the relative positions of the different words so that only properly oriented face components (e.g., eye, nose, lips) will be recognized as a proper face. Other methods using local feature vectors work as well.

While the feature vectors were described above as identifying the presence or absence of a particular image component such as eye, lips, or nose, in fact the pixels representing an eye in a previous image, having been entered into the codebook as such, will not exactly match the pixels representing an eye in a new image. For this reason, codebooks have traditionally required some sort of adaptation to be useful on new images. One such adaptation trains a neuron in a simulated neural network such that it recognizes a particular feature. The training process proceeds by feeding input to the neuron comprising multiple representations of the feature that it is to learn (e.g., different views of the feature from different images, such as image segments containing an "eye"). It is also useful to train the neuron with inputs of other image segments that it is not to learn, along with requisite signal to the neuron that it is to attempt not to recognize that type of input (e.g., negative reinforcement). The neuron is trained by moving the weight vector (virtual synapses of the neuron) toward the inputs it is to recognize, and generally away from inputs that it is not to recognize. This process is time consuming and requires that the lowest levels of a visual system learn before any downstream vision processing systems are of much use. Because many instances of the same feature (e.g., eye, nose) must be fed into the system along with other features, learning can be slow and require significant amounts of data before the system can do anything useful.

The traditional bag-of-words method of exactly matching the input has the limitation that the pixels would have to exactly match. This method can be improved, however, if a "1-bit" is assigned not to features (words) that exactly match the input, but to those features that most closely match the input, relative to the other features. Similarly, those features that are furthest from the input are marked as a "0-bit". The number of 1-bits is controlled with a parameter "k", and the "k-nearest" features are set to "1" whereas the n-k ("n minus k") furthest are set to 0 (where n is the number of word features).

Until now, the combination of the above methods has not been practical because (1) no method was capable of adapting a codebook to new imagery circumstances such as low lighting, bright lighting, shadows, and lens artifacts, and (2) no hardware was capable of implementing the multiple requisite algorithms with real-time performance and low power consumption. The absence of optimized hardware left many useful embedded applications impossible, such as augmented reality applications that must recognize where objects are in the real world, or mobile robotic applications. These applications are made practical with the approach to measuring the distance between codewords described above, in conjunction with the computer hardware optimized to enable real-time operation of these applications (which is required) within the power budgets of reasonably-sized batteries. By measuring "nearest" in Riemannian space instead of Euclidean space, the code words that are truly nearest (and most likely present) in the input image can be identified. By changing the Jacobian matrix the distance of an input to all the previously learned code words can be changed according to the present context such as lighting, exposure time under camera motion, etc. Because the codebook has not changed (only distances to codewords relative to the input), downstream systems that have previously learned to recognize objects based on the code books will not have to learn anything new to be able to use this adaptive technique and benefit from context-sensitive distance measurement at the lowest level of the vision system (the input-codebook matching step).

Computations on data in memory are ordinarily performed by standard processor cores that read the memory, operate upon it, and then write the result back to memory. These multithreaded processor cores (MPCs) have instruction pointers and are generally similar to standard processor cores although they support many more threads simultaneously at the expense of the speed of any individual thread (thereby greatly improving power efficiency). When they perform operations that modify data in the context of an input value, the MPC must go through a process of reading, modifying, and writing the data back to memory. Although caches are used to increase memory throughput and reduce latency, the principle remains that modification of data is kept under software control and must be brought in and out of the MPC. This process is inefficient when a performance bottleneck occurs wherein the processor can only update one value at a time and all of the data must be routed through the memory access port of the processor core. Graphics Processing Units (GPUs) and Single-Instruction-Multiple-Data (SIMD) Central Processor Units (CPUs) operate on multiple data simultaneously however the memory that is operated on by GPUs must generally be adjacent in memory before operations can be performed on the data in parallel. Gather and Scatter algorithms are known to reduce performance on GPUs and standard processors relative to operations that can be processed in parallel once the data is organized in memory to be adjacent and in order. The algorithms that carry out the sensor processing system (e.g., vision system) described herein often do not organize memory in this manner and when they do not they perform very poorly on GPU and SIMD-style computer processors.

Autonomous modules (AMs), in contrast, allow memory banks to be updated independent of processor core operation. A memory value may be updated in the context of an input by sending the input to an AM's autonomous memory operator (AMO). The AMO may then fetch the relevant data from the memory bank, update it in the context of the input value, and send the result back to the memory bank. In addition, it may perform an update to other data held in the memory in response to the result of the calculation. In spiking neural networks, identifiers of synapses receiving input may be sent directly to the autonomous memory module and the resulting impact on the behavior of a given AM's simulated neurons may be updated by the AMO without interaction with the multithreaded processor core (MPC). If the MPC's operations were required to perform the update, then the number of synapses receiving input that can be processed per second would be decreased due to the overhead of involving the multithreaded processor core. In other words, by allowing neuron contexts to update in parallel without involvement of the MPC, many more updates (i.e., synapses receiving input) can be processed given the same amount of silicon resources, power and time. This applies to simulations above and below the abstraction level of neurons as well.

AMs implemented on a field-programmable gate array (FPGA) can be programmed to carry out myriad different tasks and, unlike graphics processing units (GPUs), perform well even when data is not already ordered in memory. For example, an AMO may implement a sorting-type algorithm as a precursor to determining the most active neurons in a patch; an operation commonly called K-winner-take-all or K-nearest as above. AMs are not limited to perform well only on tasks that GPUs do poorly on, they are flexible enough to also perform many GPU tasks well, such as vector-matrix multiplication. They perform especially well when implementing receptive fields (RFs) wherein the RFs and a tensor are stored across the memory banks.

When an AMO needs access to data stored in other memory banks to which there is no direct connection, the data may be shifted between memory banks using memory queue units (MQUs). In this way, each autonomous memory will have access to a given subset of feature vectors or a given piece of a tensor data structure during a time window. Because the data can be shifted between the autonomous memories using local queues without arbitrary data routing, the resources required to perform the data transfers between modules is reduced while still meeting the need of allowing each autonomous memory a window of time in which it may access data that is initially stored non-locally. These data transfers can be performed in parallel without ongoing interaction of the MPC core or the network-on-chip.

Depending on the types of updates the AMs typically perform, the interface of the network-on-chip to the AMOs may be optimized to allow data to flow into the AMO from the network-on-chip, but not vice versa. This may save resources in the implementation of the AMO and the network-on-chip, resulting in lower power and smaller silicon for a given level of algorithmic performance.

Riemannian Grammars

The present application defines a method for achieving the opposite of certain prior art approaches—to purchase the parts of the visual system which are more complex and experience dependent. In contrast to prior methods, the present approach fits a flexible function to the real data without a constraining hypothesis. Certain embodiments of the present methods can automatically (e.g., without careful work by humans) generate perceptual apparatus far superior to SSIM (see section 8 below). While others have used nonlinear regression towards the optimum to develop measures for IQA, none have taken such a principled approach. In image compression, said enclosed IQA measure can be immediately calculated on candidate compression methods, enabling an algorithmic search for superior compression formulas (e.g., RGPEG). Furthermore, it reduces the need for high volume human data collection, which often prescribes to strict standards for controls.

DETAILED DESCRIPTION OF THE FIGURES

FIG. 1. (A) Simple example of anatomical connectivity projections between two regions/groups of neurons. (B) Simple vector encoding of an anatomical projection with synaptic weights. (C) Examples of physiological neural responses in early visual areas (Gaussians). (D) Example instance of a Jacobian, corresponding to the synaptic connection pattern in part (B). As a whole, the Jacobian matrix denotes the overall effect of activity in the neurons of an input area ($\vec{x}$ on the neurons in a target area $f(\vec{x})$; each entry denotes the change in an element of f as consequence of a given change in an element of $\vec{x}$.

Figure 2:
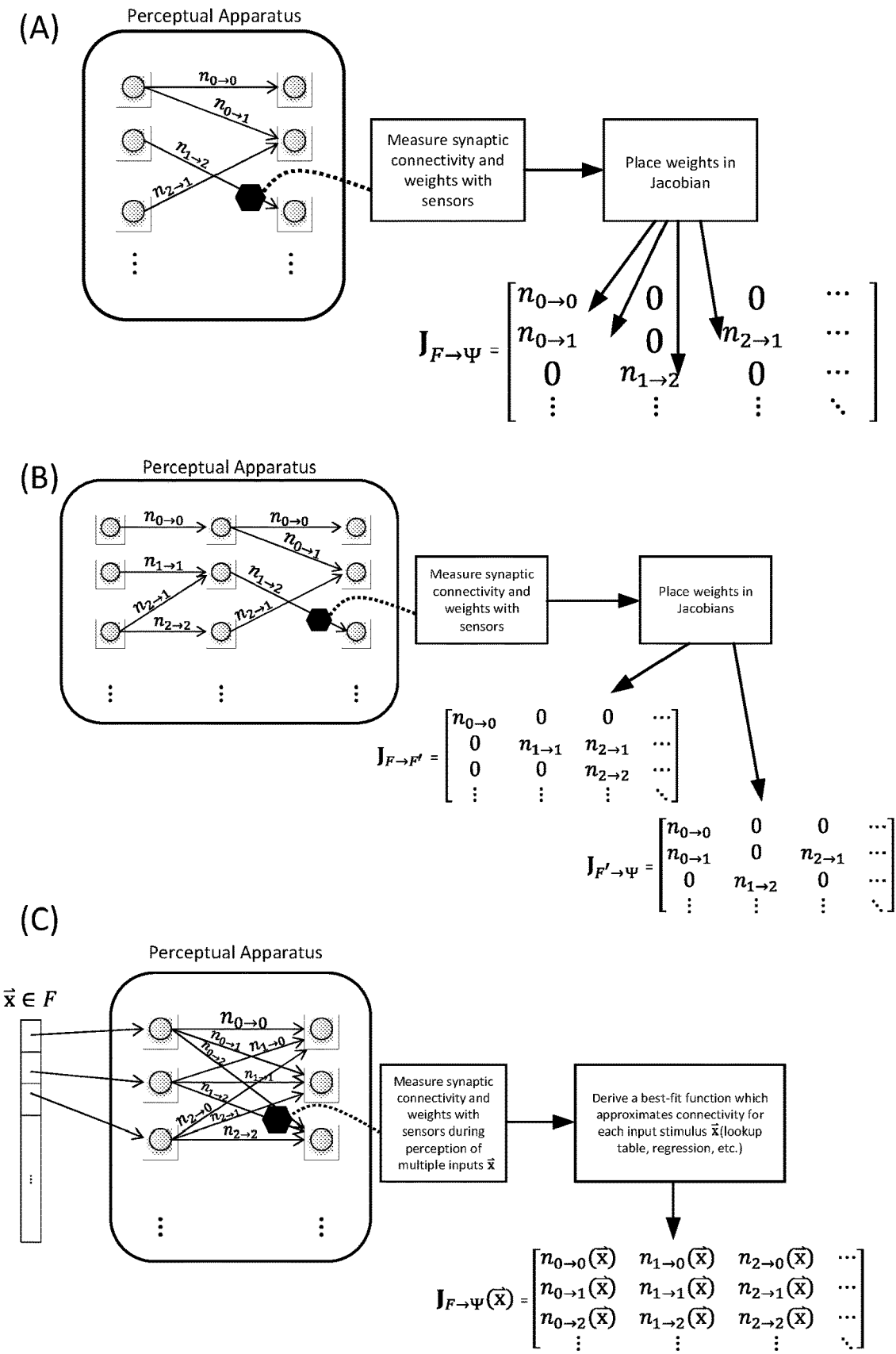
FIG. 2, A-C, shows a first method that generates at least one Jacobian as an approximation of neural synaptic connectivity, in embodiments.

FIG. 2. Method Ia. (A) Synaptic connectivity of a set of neurons forming a unidirectional bipartite connectivity graph is inferred from sensor data. Said sensors might be, for example, electrodes implanted in the brain of an animal. Each possible synaptic connection corresponds with a cell in a Jacobian, so measured/inferred weights are placed in appropriate cells to populate the Jacobian. Possible synapses which are not present receive a value of 0 in the Jacobian. (B) Synaptic connectivity of a set of neurons forming a multi-tiered connectivity graph, absent within-tier connections or back-projections, is inferred from sensor data. For each pair of tiers, a Jacobian is created. Each possible synaptic connection corresponds with a cell in a Jacobian, so measured/inferred weights are placed in appropriate cells to populate the Jacobian. Possible synapses which are not present receive a value of 0 in the Jacobians. (C) Functional connectivity of two sets of neurons is inferred from sensor data during perception of multiple inputs $\vec{x}$. A function is derived which produces a Jacobian for each input which best approximates the measured connectivity. This function may be derived by creating a lookup table with one Jacobian per input, or a lookup table with one Jacobian per grouping of inputs (grouped via clustering or by known properties). The function may also be derived by approximating the parameters of a function which generates values for each cell in a Jacobian. The parameters may be approximated by any existing regression algorithm, examples of which are described herein.

Figure 3:
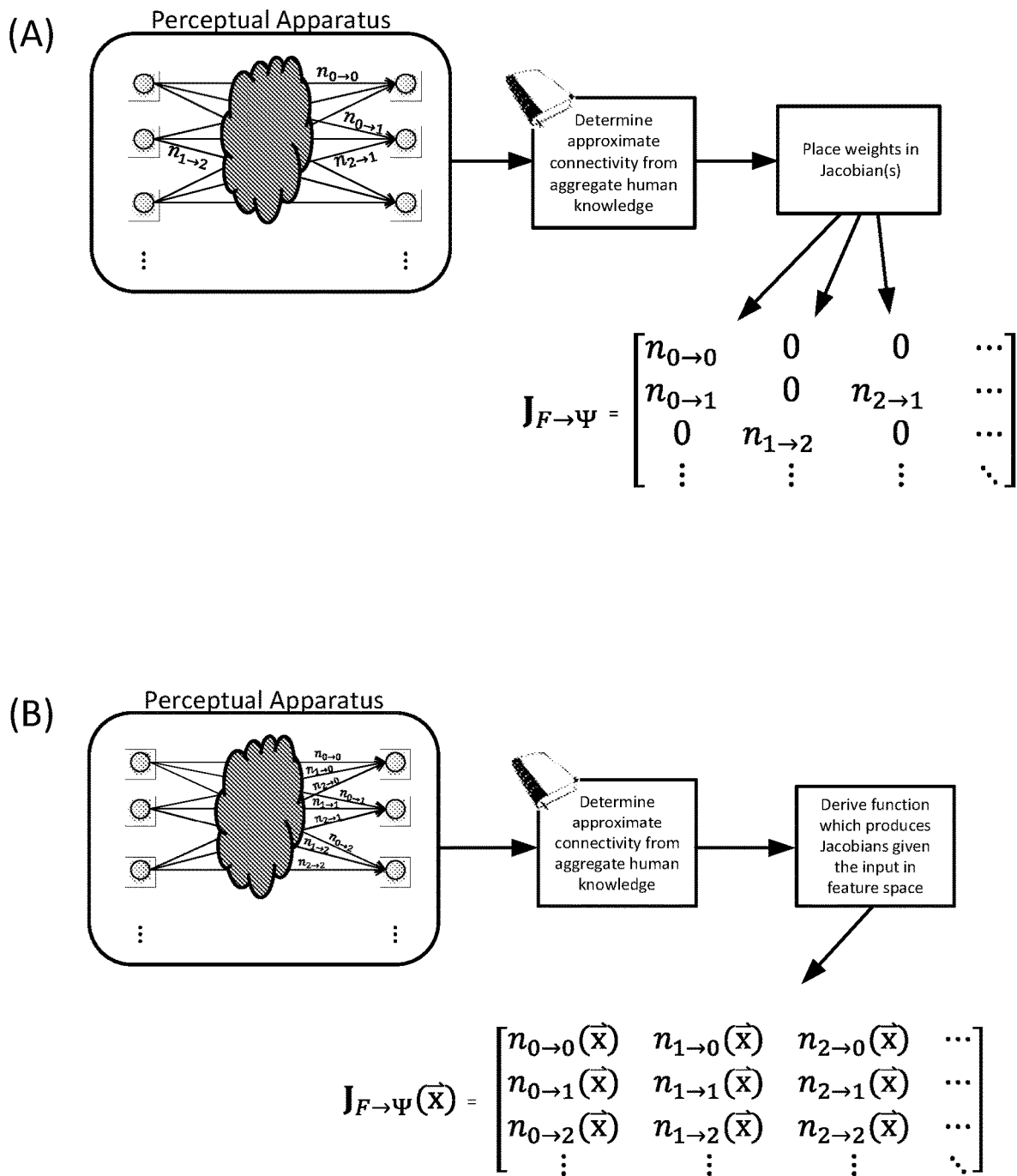
FIG. 3, A-B, shows a second method that generates at least one Jacobian as an approximation of neural synaptic connectivity, in embodiments.

FIG. 3. Method Ib. Approximate connectivity is derived from the body of relevant human knowledge. (A) Based upon this approximation, a Jacobian, or a hierarchy of Jacobians, is formed. (B) Based upon an approximation which is either a function of the input or specific to categories of input, a function is derived which produces a Jacobian for each input.

Figure 4:
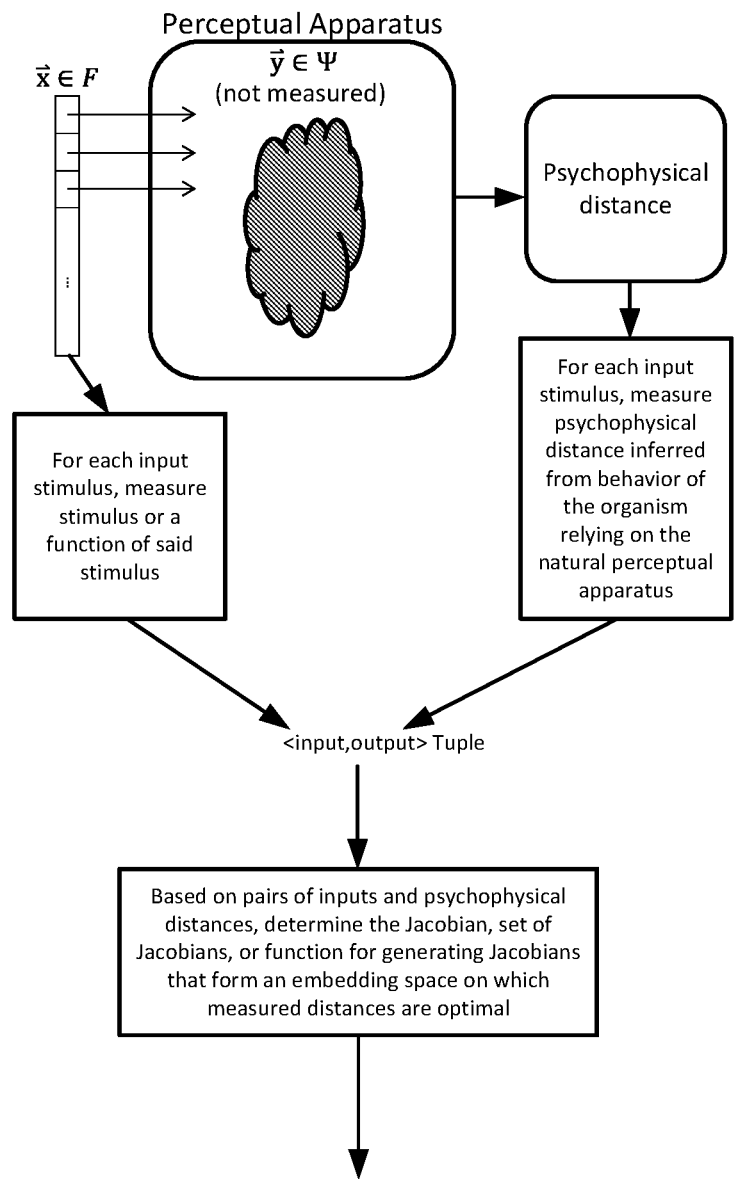
FIG. 4 shows a first method that generates at least one Jacobian as an approximation of a brain's behavior, in embodiments.

FIG. 4. Method IIa. Tuples are given consisting of a stimulus (or a multivariate function on said stimulus) and a psychophysical distance produced by an apparatus perceiving said stimulus. A Jacobian, set of Jacobians, or function for generating Jacobians is determined which, when applied to each stimulus (or said function of said stimulus) produces a perceptual space in which measured distances optimally match measured psychophysical distances. In this way, an input-output mapping is constructed, as a proxy or approximation of the perceptual apparatus, without observing the inner workings of said apparatus.

Figure 5:
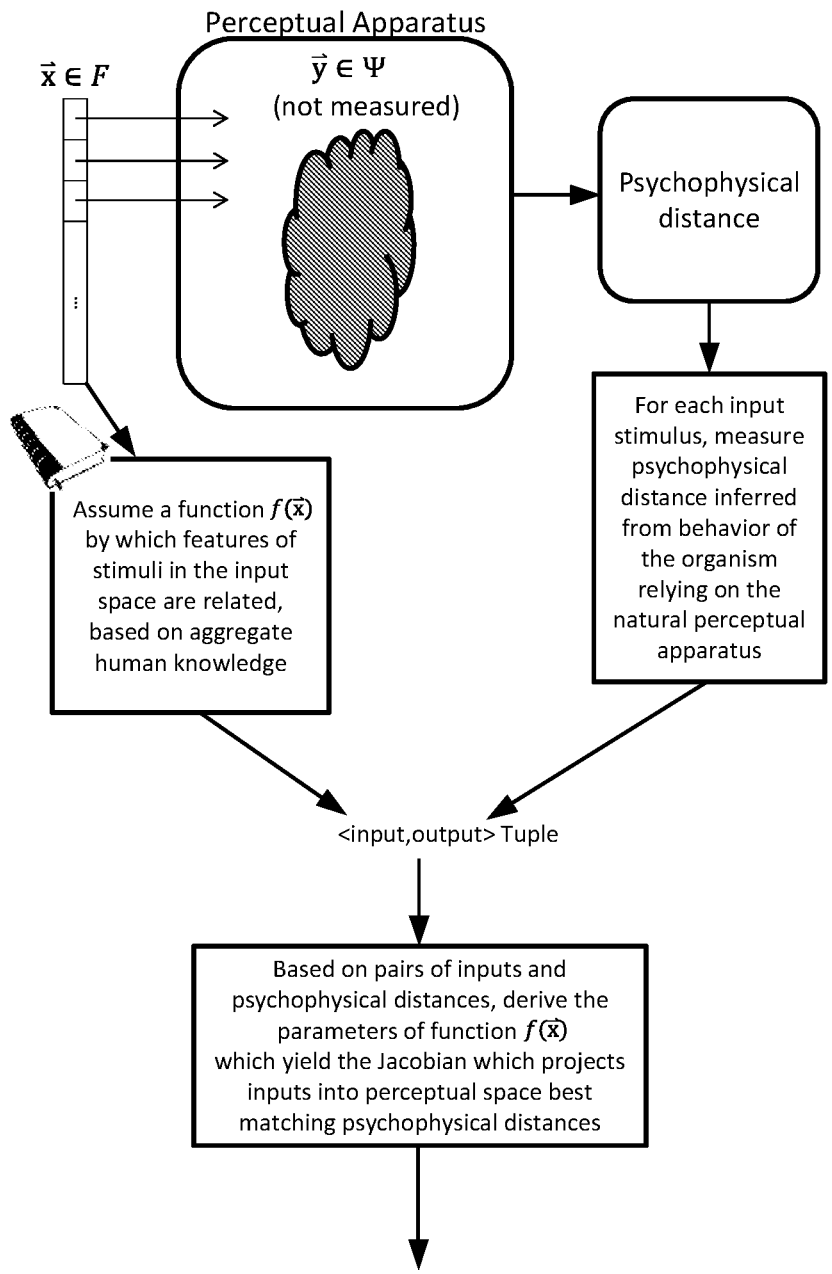
FIG. 5 shows a second method that generates at least one Jacobian as an approximation of a brain's behavior, in embodiments.

FIG. 5. Method IIb. First, a function $f(\vec{x})$ is assumed, based on aggregate human knowledge, by which features of stimuli in the input space are related. This function is based on knowledge of the underlying source of feature information or statistics gathered on input data, without reference to the inner workings of said apparatus. Method Ib may be combined with method IIb, if knowledge is available of both relations between features and how sets of features are regarded by the apparatus. Second, for each stimulus, psychophysical distance is inferred from the behavior of the organism relying on the natural perceptual apparatus (in the same manner as method IIa). Third, based on pairs of inputs and psychophysical distances, derive the parameters of function $f(\vec{x})$ which yield the Jacobian that projects inputs into perceptual space best matching psychophysical distances. This method also applies when function $f(\vec{x})$ is so simple as to not be parameterized, in which case the third step is trivial.

Figure 6:
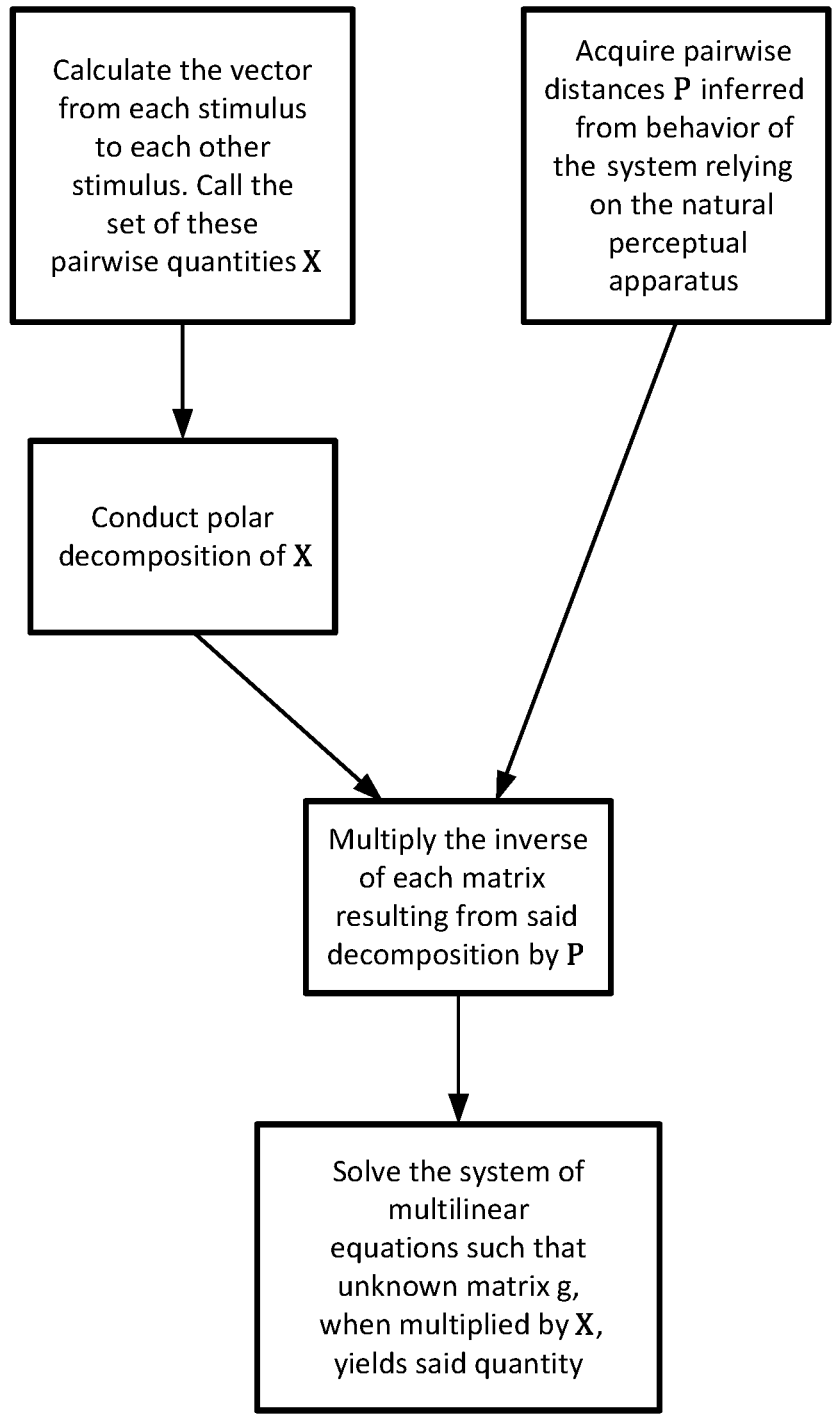
FIG. 6 shows a method that manipulates matrices, in an embodiment.

FIG. 6. Compute the vectors from each stimulus to each other stimulus in feature space F. Assemble these vectors into a matrix X. Conduct the polar decomposition of X, creating two matrices whose product is X and each of whom are invertible. Acquire pairwise distances P inferred from behavior of the natural (or possibly artificial) organism relying on the perceptual apparatus to be modeled. Invert both matrices resultant from the polar decomposition of X, and multiply the inverse of each matrix by P. Solve the system of multilinear equations such that when X is multiplied by unknown matrix $g_{\Psi, F}$, the result is equal to said quantity. This system of multilinear equations may be solved using a number of optimization procedures, for example gradient descent.

Figure 7:
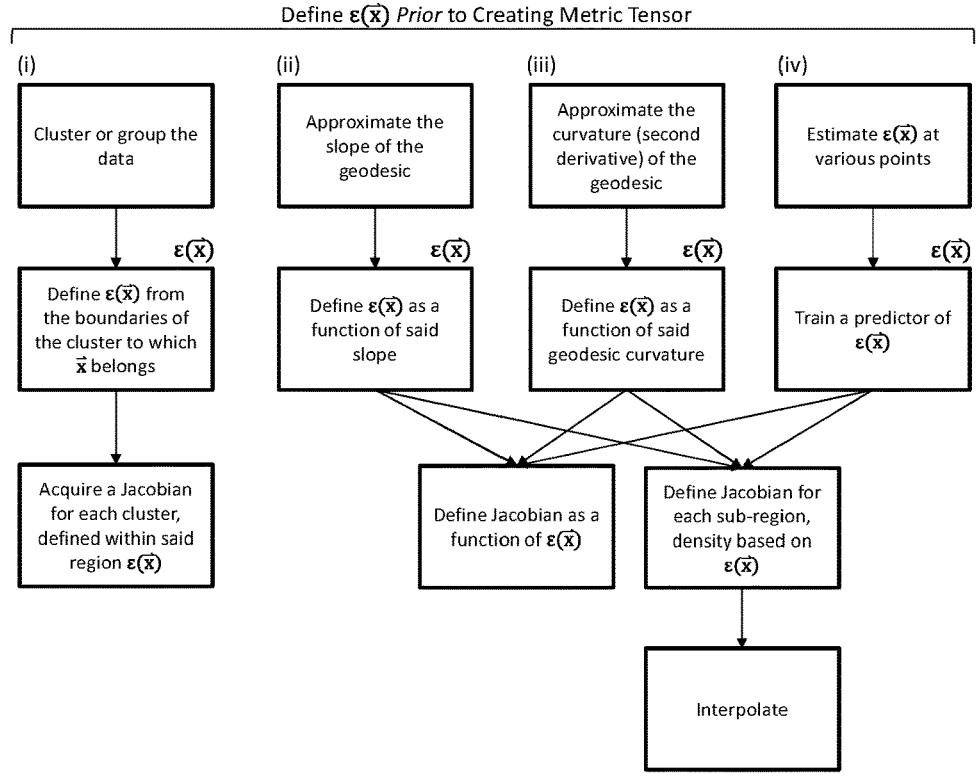
FIG. 7, A-B, shows example ways to create a metric tensor when the Jacobian is a non-constant function of an input, in embodiments.
Figure 7:
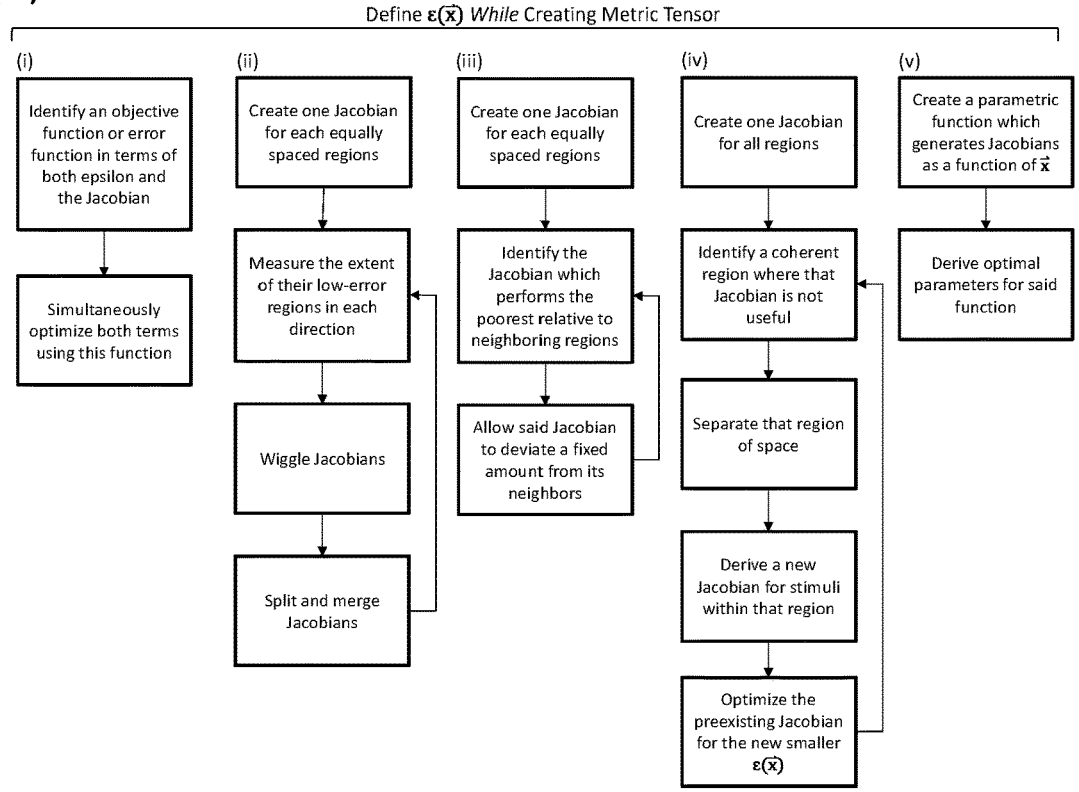

FIG. 7. Example ways to create a metric tensor when the Jacobian is a non-constant function of the input, and both $\varepsilon(\vec{x})$ and J need to be defined. (A) (i) Group the data (e.g., by known category, by ISDS, or by clustering algorithm in feature space F or a rough approximation of perceptual space). Define $\varepsilon(\vec{x})$ to implicitly be the boundaries of the cluster to which each stimulus belongs. Acquire a Jacobian for each cluster, defined only for members of said cluster (using any of the disclosed methods). New stimuli may be projected into perceptual space or measured using a metric tensor derived from the learned Jacobians by first identifying its cluster membership (e.g., nearest cluster centroid, nearest neighbor, a classifier) then selecting the Jacobian associated with said cluster membership. (ii) Determine the approximate slope of the geodesic (either as a scalar or a per-dimension quantity) at each location. This could be done using numerous methods. Define $\varepsilon(\vec{x})$ as a function of said slope, such that in regions of more consistent curvature $\varepsilon(\vec{x})$ is larger. A Jacobian can next be defined as a function of $\varepsilon(\vec{x})$, such that the Jacobian is more consistent where $\varepsilon(\vec{x})$ is large. Alternately, numerous unique Jacobians can be defined for numerous sub-regions of feature space, with the regions in which each Jacobian is applicable sized according to $\varepsilon(\vec{x})$. (iii) Determine the approximate curvature (second derivative) of the geodesic (either as a scalar or a per-dimension quantity) at each location. This could be done using numerous methods. Define $\varepsilon(\vec{x})$ as a function of said curvature, such that in regions of more flat curvature $\varepsilon(\vec{x})$ is larger. Use one of the methods for defining a Jacobian described for embodiment ii. (iv) Acquire estimates of $\varepsilon(\vec{x})$ at various points. Train a statistical model to predict $\varepsilon(\vec{x})$. Use this model as a stand-in for the true function $\varepsilon(\vec{x})$. Use one of the methods for defining a Jacobian described for embodiment ii. (B) (i) Identify an objective function or error function in terms of both $\varepsilon(\vec{x})$ and the Jacobian (see section 3). Simultaneously optimize both terms (Jacobian specificity and $\varepsilon(\vec{x})$ regularization error) by optimizing this function. This may involve expectation-maximization, alternating minimization, regularized regression, or evolutionary algorithms. (ii) Divide feature space into a number of equally spaced regions. Determine one Jacobian for each region, based only on stimuli present within that region. This step may either use methods disclosed within, or initialize with a Euclidean projection. For each Jacobian, measure the extent of its low-error region along each dimension of feature space. Adjust the extent of the region around each Jacobian as a function of said low-error extent, and of the low-error extent of Jacobians assigned to adjacent regions. Split or merge adjacent regions (splitting or merging their Jacobians as well) based on a heuristic. Repeat. (iii) Divide feature space into a number of equally spaced regions. Determine one Jacobian for each region, based only on stimuli present within that region as in ii. Identify the Jacobian which performs the poorest relative to neighboring regions. Allow said Jacobian to deviate a fixed amount from neighboring Jacobians. Repeat. (iv) Create one Jacobian for all parts of the space—an operationalization of the hypothesis that the perceptual space is of constant curvature (and forms an affine projection). Identify a coherent region where said Jacobian is ineffective. Separate that region of feature space from the rest and derive a new Jacobian fit to stimuli within said region. Optimize the preexisting Jacobian for the new, smaller space it represents. Repeat. (v) Derive a parametric function of position in feature space which generates Jacobians as a function of $\vec{x}$. Derive optimal parameters for said function.

Figure 8:
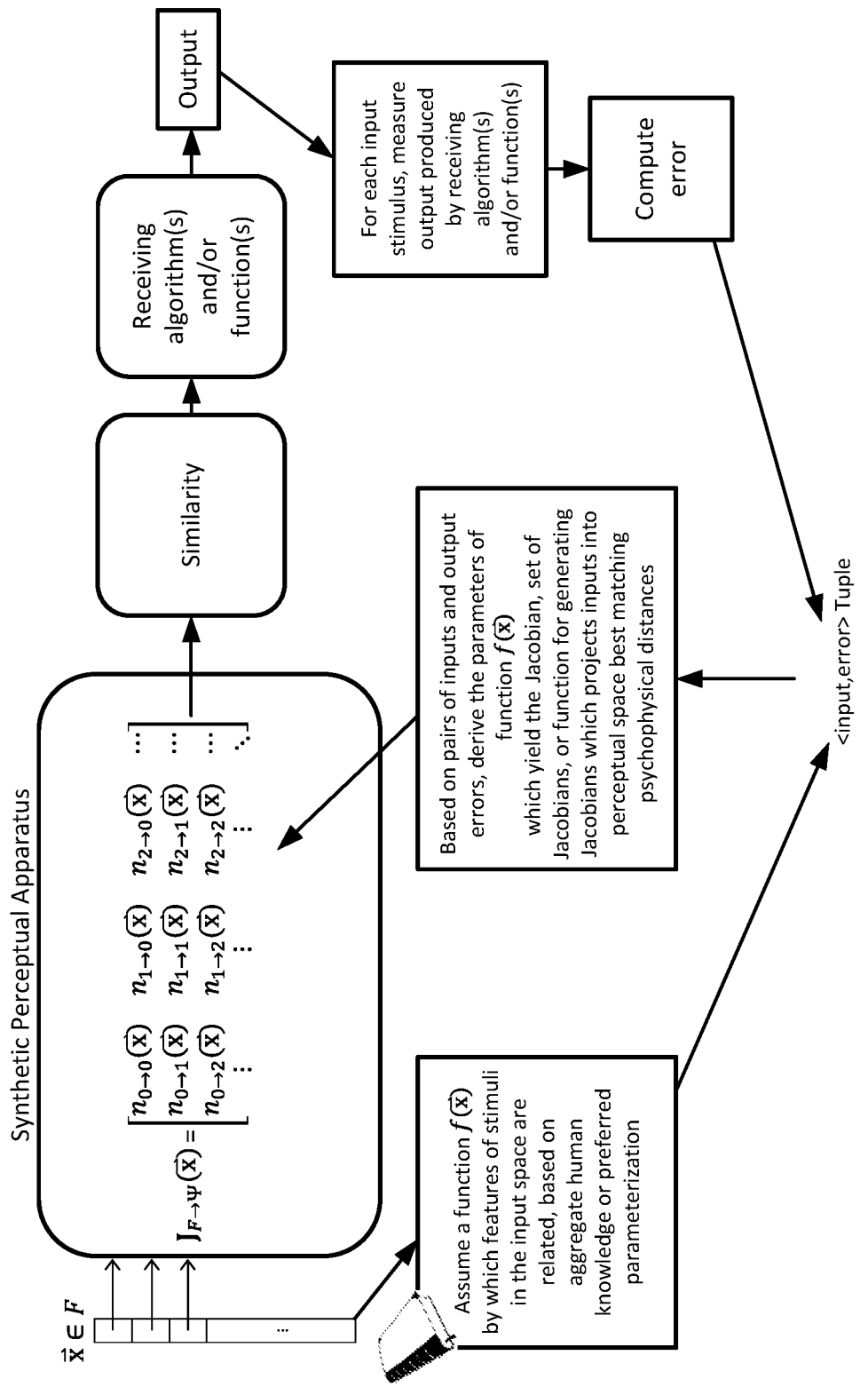
FIG. 8 shows a method that creates at least one Jacobian to approximate a best perceptual apparatus for a particular task, in embodiments.

FIG. 8. Method IIIa. Similarly to method IIa, we form an optimal input-output mapping. However, in this case the tuples consist of a stimulus (or a multivariate function on said stimulus) and an error term measured on the receiving algorithm and/or function. For each stimulus, measure output produced by receiving algorithm(s) and/or function(s). Next, compute error using one of many approaches which vary by application. Based on pairs of inputs and output errors, derive the parameters of function $f(\vec{x})$ which yield the Jacobian which projects inputs into perceptual space most useful by said receiving algorithm/function. The resultant metric tensor constitutes an optimal perceptual apparatus for the receiving algorithm/function and task at hand.

Figure 9:
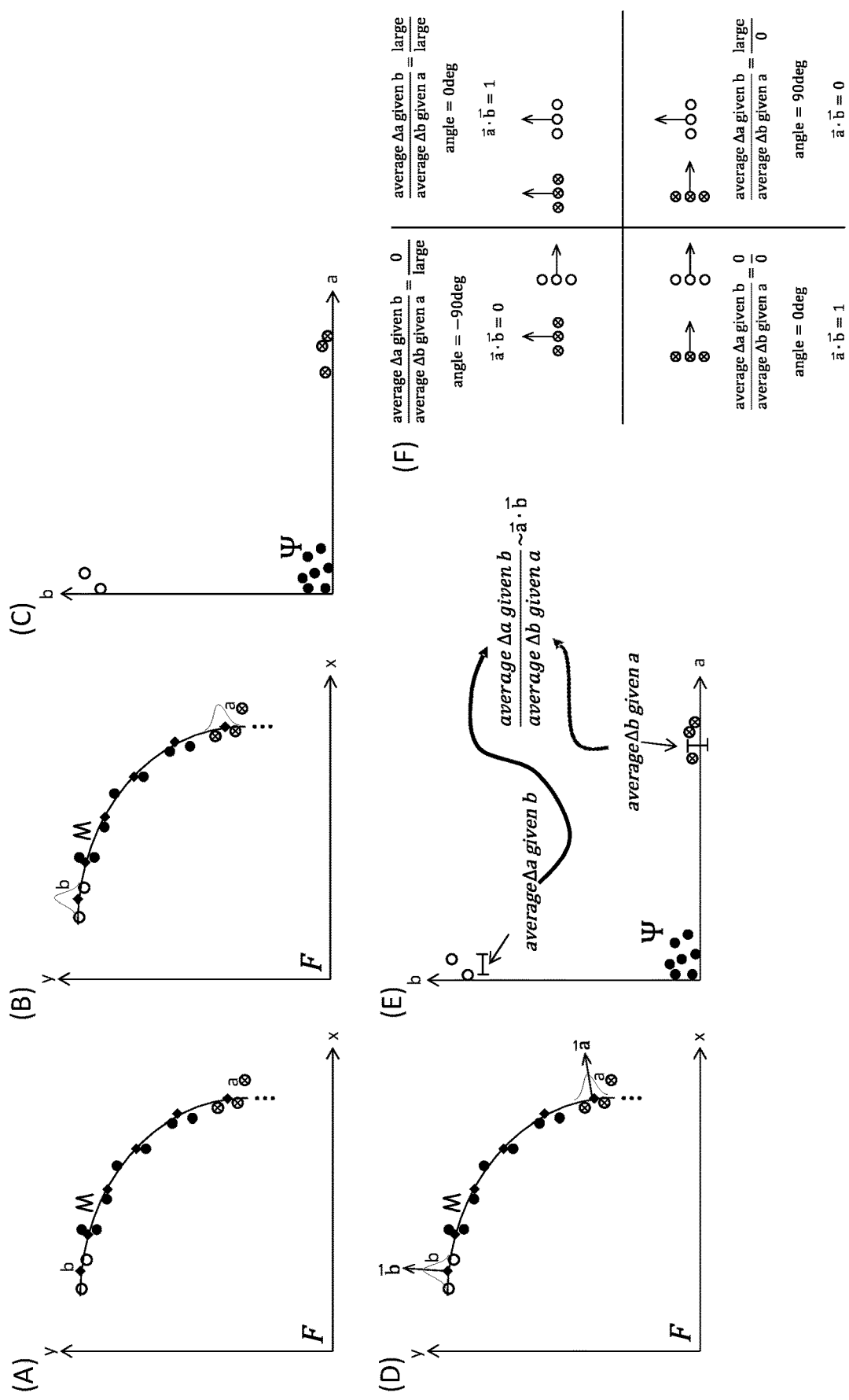
FIG. 9, A-F, illustrates one type of unsupervised metric tensor learning, in an embodiment.

FIG. 9. Method IIIb. Illustration of one type of unsupervised metric tensor learning disclosed herein. Assume that the data in feature space lies on a manifold. (A) Perform k-means or similar. (B) Measure a supralinear function f(dubbed "closeness") on the distance (in feature space) between each point and each mean. (C) Consider this "population code" of "closenesses" to be a new embedding space. Note that in this space, data are extremely sparse, linearly separable, and the basis is nearly Euclidean. Note that we need not necessarily do this—we could be studying a brain region which already does something like this. Note also that data in this space is primed for autonomous modules. (D) At each centroid, we can define the (unknown) tangent vector to the manifold. (E) Based on geometry in the original feature space, trigonometry dictates that the dot product between the tangent at 'a' and the tangent at 'b' is roughly the average relationship between how amplitude along axis 'a'$\in\Psi$ covaries with amplitude along axis 'b'$\in\Psi$ for members of 'a', and how amplitude along axis 'b'$\in\Psi$ covaries with amplitude along axis 'a'$\in\Psi$ for members of 'b' (see (F) for a visualization). Call this scalar relation between two local embeddings (a.k.a. two axes $\in\Psi$) the 'pseudo-dot-product'. This quantity should be computed using autonomous modules.

Figure 10:
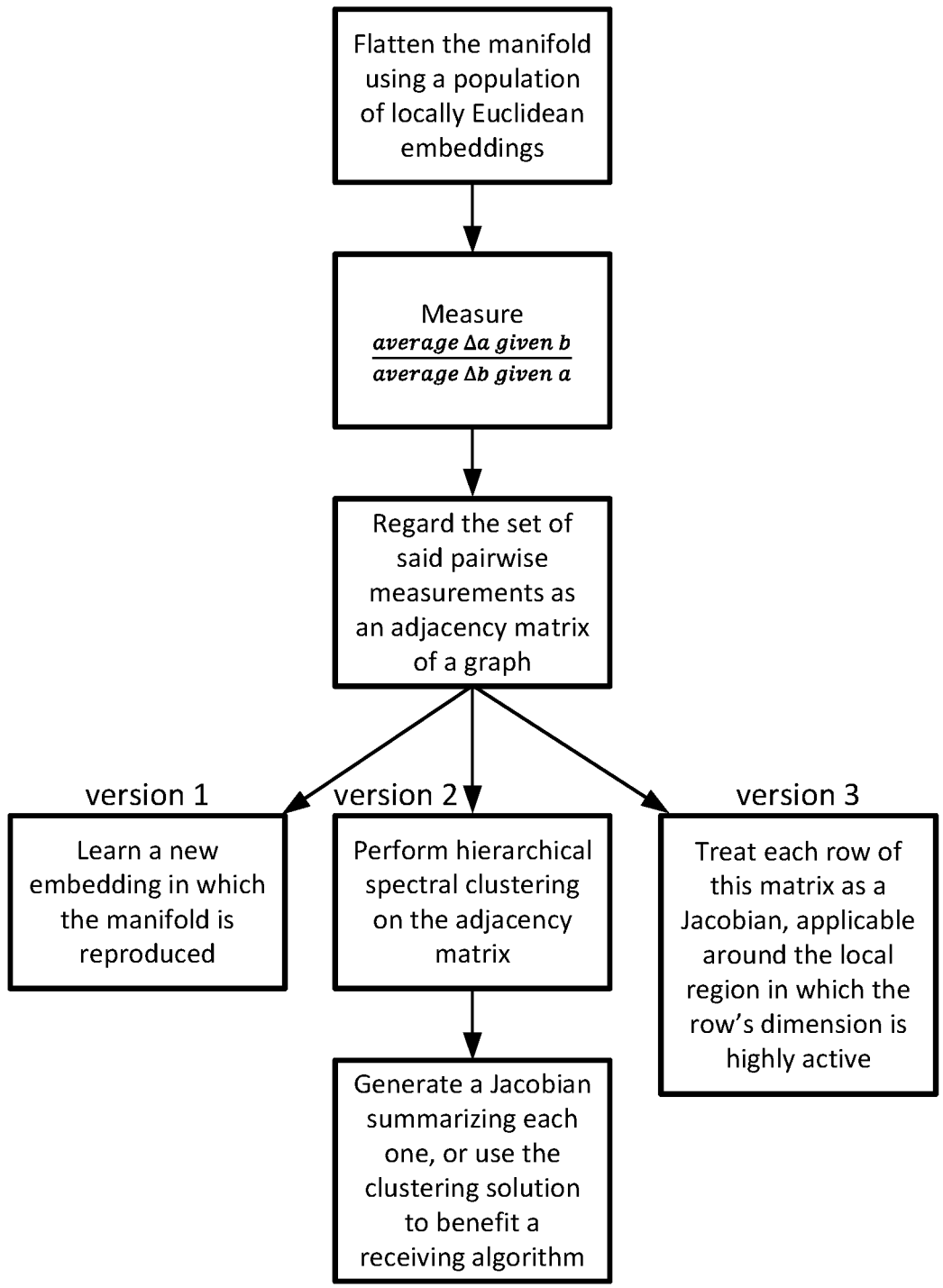
FIG. 10 shows a method that generates at least one Jacobian which approximates the natural curvature of real-world data, in an embodiment.

FIG. 10. Method IIIb. A metric tensor is created which approximates the natural curvature of real-world data. The manifold on which data resides is flattened using a population of locally Euclidean embeddings, either by an artificial perceptual apparatus using methods shown effective for this task (e.g., k-means), or by a natural perceptual apparatus, in which case the embedding parameters may or may not be observable. The pairwise pseudo-dot-product is then measured (as described in FIG. 9). The set of said pairwise measurements is regarded as a matrix representing the adjacency between local Euclidean embeddings. Said matrix implicitly stores an approximation of the curvature of the data. Three simple uses are available. Version 1: We wish to rediscover the shape of the manifold (in a new, arbitrary feature space), potentially without knowledge of the relative position of the local embedding spaces. This can be done using a number of existing systems from autoencoders to multidimensional scaling. Version 2: We wish to rediscover the shape of the manifold (in a new, arbitrary feature space), perhaps under a subset of conditions, and at the right fidelity, such that the manifold we discover is as lumpy as possible—points along parts of the manifold with similar dot products are grouped, regardless of how distant those points were in the original feature space. The simplest mechanism by which to perform this grouping is to perform spectral clustering on the adjacency matrix. By using spectral clustering on this pairwise pseudo-dot-product distance matrix, we place centroids with similar tangents near one another (weighting unknown dimensions of the tangent vectors based upon how much they influence dot products with other tangents). Why do we want to group regions with similar pseudo-dot-product relations, regardless of their position in the original feature space? If a manifold exists, there is local flatness ("pancakeness") in some direction. If the data is sparse, the manifold will have local flatness in most directions. Therefore, if two regions of the manifold share similar pseudo-dot-product relations, this is unlikely to be by chance and represents a real similarity in the world: the two regions relate to other regions in the same ways. Clustering must be performed at various (hierarchical?) levels of 'manifold fidelity' so that centroids can be grouped based upon similar tangents, groups of centroids can be grouped based upon similar tangents, and so on. The members of each cluster will contain similar tangents, so a single Jacobian can be generated to summarize each one (using methods described herein). The clustering solution itself can also provide a valuable input to some receiving algorithm (e.g., a supervised learning system). Version 3: We wish to extract a set of Jacobians and function for choosing said Jacobians directly from this adjacency matrix. Each row i of this adjacency matrix represents the projection of local embedding i onto all other embeddings j≠i. Therefore, said row already represents the Jacobian for the subset of data points which are high along the i dimension and low along all others. Because of the extreme sparsity of this embedding space $\Psi$, all data points meet this criterion for some dimension i. Thus, the adjacency matrix already is a lookup table of Jacobians.

Figure 11:
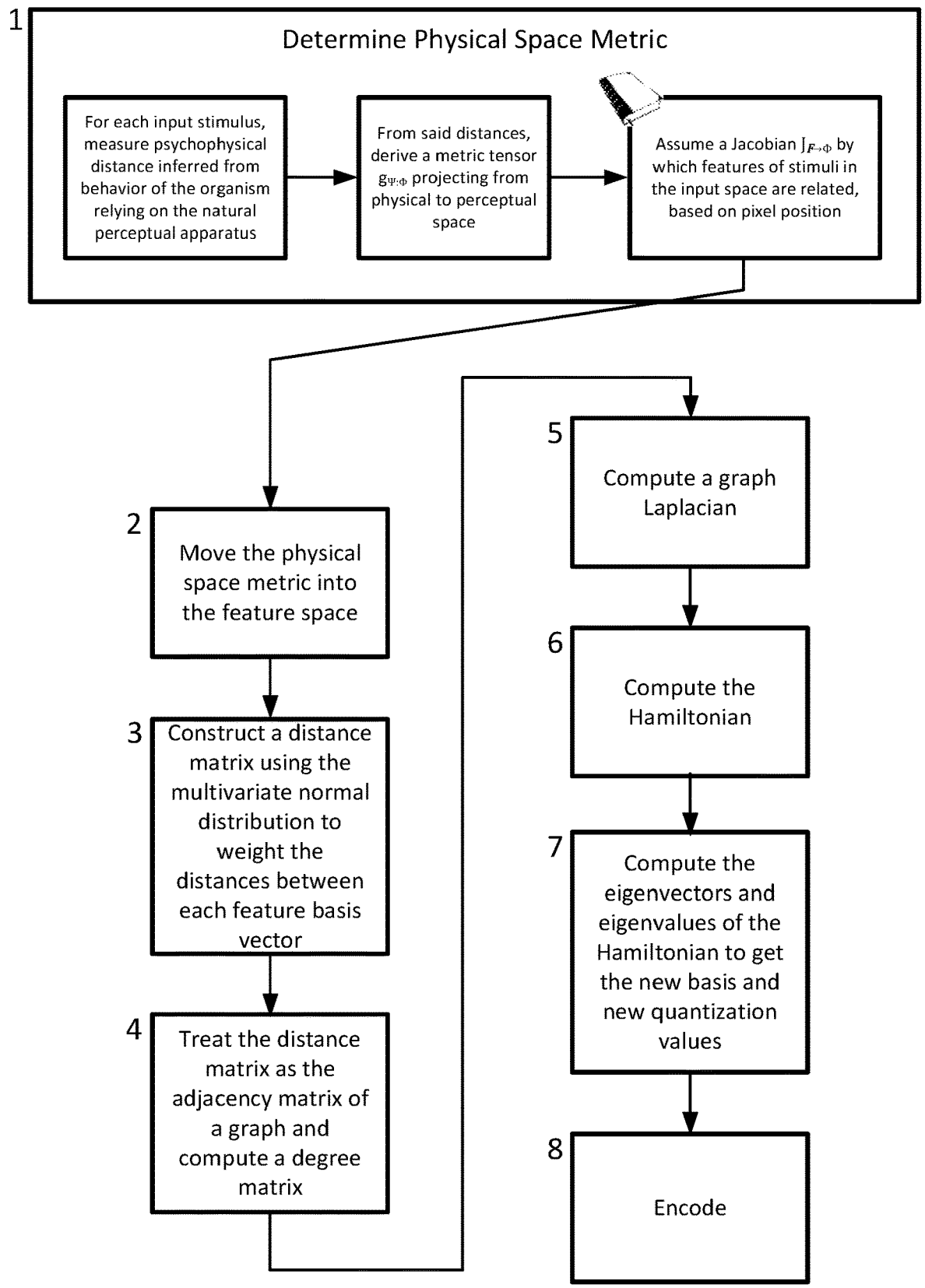
FIG. 11 shows a method that compresses an image according to Riemannian geometry, in embodiments.
Figure 37:
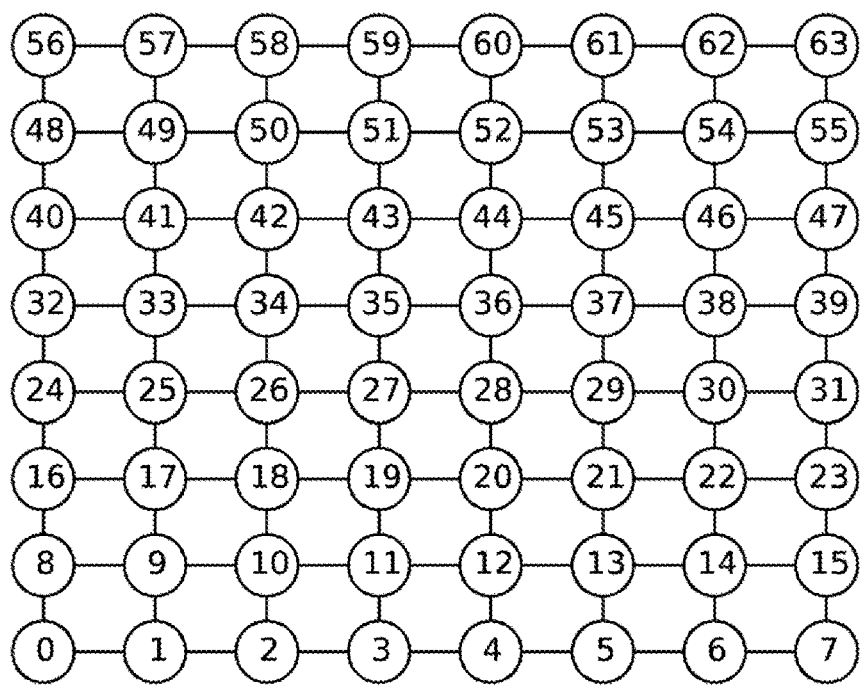
FIG. 37 shows basis vectors in feature space as a graph with edges connecting nearest neighbors.

FIG. 11. RGPEG steps. (1) Determine perceiver's acuity judgement with respect to each experimental dimension. (2) Said identified metric may then be moved from the physical space to the feature space, thus obtaining a metric that measures distances in the feature space with respect to the human observer. Said metric is found by Eqn. 13. (3) Once a metric has been obtained, it is moved into the feature space and used to determine distances between dimensions in the feature space. Once a complete distance matrix has been calculated with respect to said feature space metric, we may view this distance matrix as the adjacency matrix defining a graph. Since the dimensions of the DCT basis vectors are not independent (in Riemannian space) due to their two-dimensional spatial layout, $J_{Quant}$ must also be modified to reflect this dependency. In order to estimate the dependency between dimensions in the physical space with respect to their embedding in the perceptual space, the precision matrix ($\Sigma^{-1}$) is used. The precision matrix ($\Sigma^{-1}$) is then used as a metric to compute a distance matrix between all the features with Eqn. 14. This distance matrix A defines the adjacency between the feature vectors. (4) Given said adjacency matrix A, the degree matrix is computed using Eqn. 25. (5) A Laplacian L is derived from said degree and adjacency matrices of said graph by Eqn. 26. (6) As mentioned in section 7, the Hamiltonian is given by $\hat{H}=L+P$ where L is the graph Laplacian from the previous step and P is the potential as a diagonal matrix such that the eigenvalues are distinct and greater than zero. For the values of the Laplacian, P=0.0 was chosen herein. (7) Using a traditional Eigen decomposition, we solve for the eigenvectors and eigenvalues of the Hamiltonian. The plot of the 64 eigenvalues and the complete eigenbasis is shown in FIG. 37. Finally, the heat equation is solved for the update operator, and said update operator is used to lower the state of the system to a lower entropy which also has minimal error. Samples of the encodings are available in Tables 10-15. (8) Multiply each original image block by the matrix Γ to project into perceptual space, then multiply by the update operator, then round the result.

Figure 12:
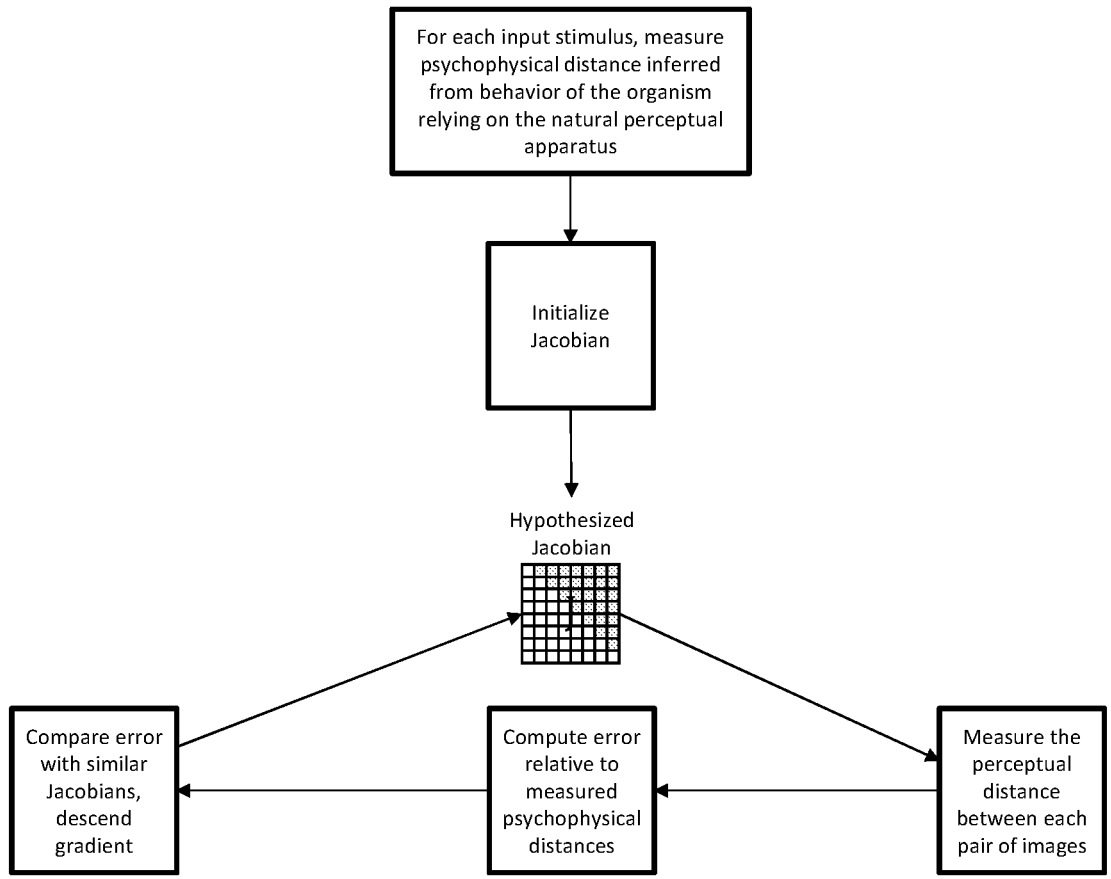
FIG. 12 shows a method that determines at least one Jacobian by way of regression for image quality analysis (IQA), in embodiments.

FIG. 12. Determination of a method IIa Jacobian by way of regression for IQA. First, the Jacobian is initialized (e.g., to the identity matrix or a random matrix). Next, an iterative loop begins wherein the Jacobian is used to predict perceptual distance between tuples of original and degraded images. Error is calculated as a function of the difference between predicted perceptual distance and psychophysical distances. A new Jacobian is created which reduces overall error, and the loop repeats.

Figure 13:
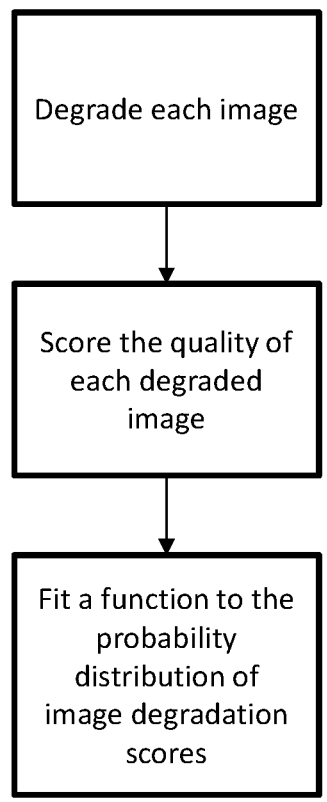
FIG. 13 shows a method that determines and uses the ISDS property, in embodiments.
Figure 13:
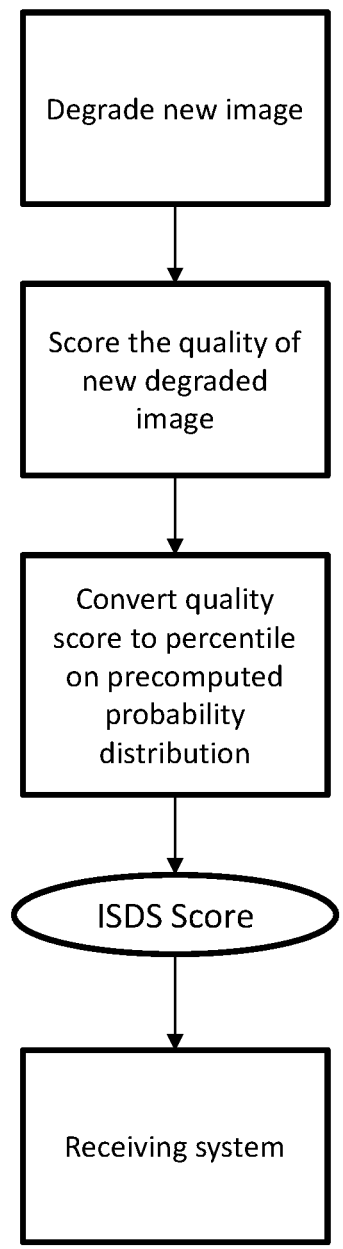

FIG. 13. Determination and use of the ISDS property. First, each image is degraded using the exact same procedure (e.g., using JPEG, Gaussian blur, etc.). Next, each degraded image is scored using the exact same procedure (e.g., Riemannian IQA, SSIM, etc.). Finally, a function is fit to the probability distribution of image degradation scores.

New images are degraded and ranked using the same procedure, and are rated based upon their percentile in the precomputed probability distribution. Alternately, a machine learning predictor may be trained to predict quality score percentile from quality score without the use of a parametric function. Using this ISDS score as a property of the image, receiving systems may form predictions or characterizations of the image. ISDS may be used either as a standalone property, or its interactions with other properties may be used. Receiving systems may, for example, fine tune parameters or use different algorithms towards the purpose of image compression, object recognition, scene categorization, search, etc.

Figure 14:
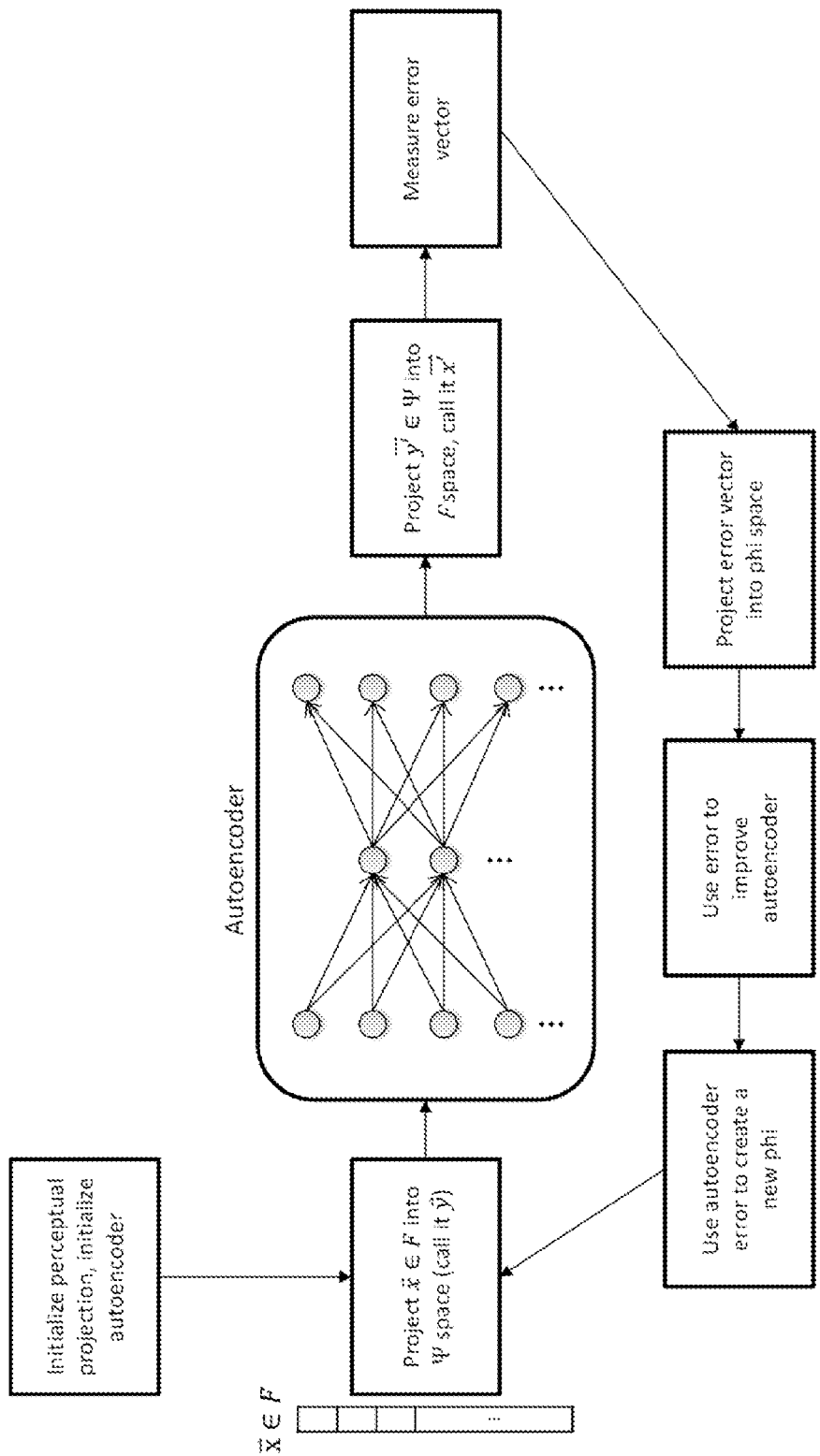
FIG. 14 shows a method for collaborative filtering that uses a pseudo-Riemannian autoencoder, in an embodiment.

FIG. 14. Initialize the projection to perceptual space $J_{F \to \Psi}(\vec{x})$ (e.g., to the identity matrix). Initialize the autoencoder (e.g., to random weights, or using pre-training to identify an optimal autoencoder in Euclidean feature space). For each data point $\vec{x} \in F$, project it into perceptual space $\Psi$ using $J_{F \to \Psi}(\vec{x})$, then pass it forward through the autoencoder. Project the result back into feature space F, using a function explicitly created to be the inverse of $J_{F \to \Psi}(\vec{x})$ (either via optimization or sometimes using a matrix inverse operation). Measure error (perhaps only for non-zero entries in the subject-item rating matrix) in feature space F. Next, create a representation of that error in perceptual space $\Psi$. Use said perceptual error to optimize the autoencoder's success in perceptual space. Finally, create an iterative improvement on $J_{F \to \Psi}(\vec{x})$, either by use of a propagated error function or by comparing how alternate functions $J_{F \to \Psi}(\vec{x})$ would have performed.

Figure 15:
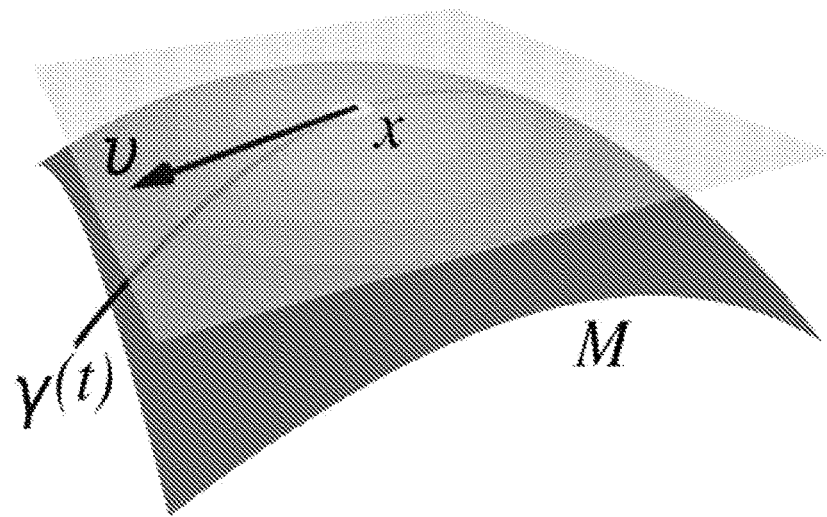
FIG. 15 shows a tangent space on a Riemannian manifold.

FIG. 15 shows a tangent space on a Riemannian manifold.

Figure 16:
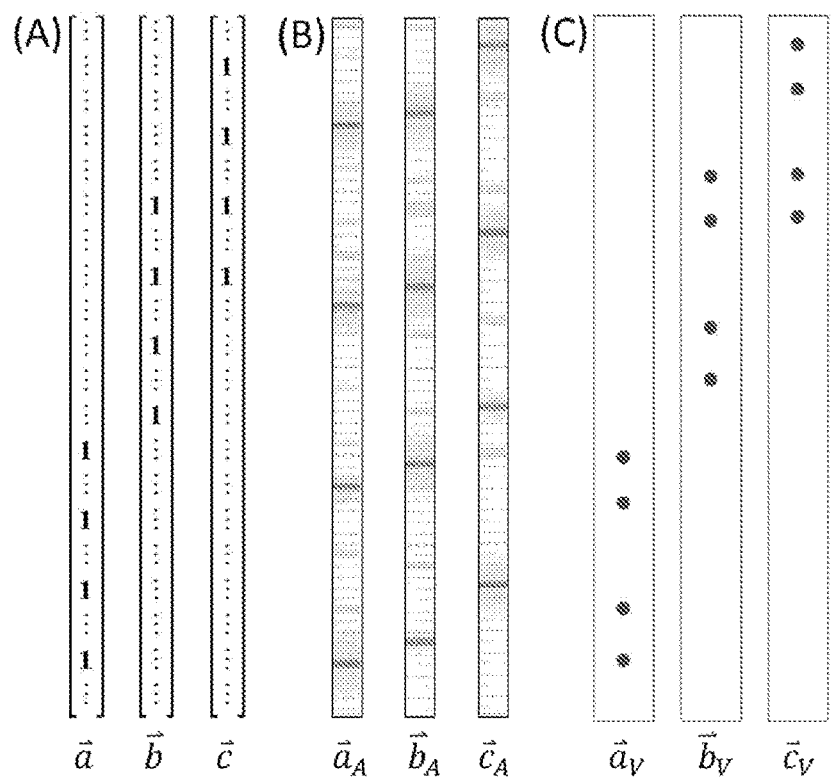
FIG. 16 shows three vectors that represent construction of simple input stimuli to be tested for perceptual distance measures.

FIG. 16 is a diagram of three vectors that can represent the construction of simple input stimuli to be tested for perceptual distance measures. (A) Shows the raw vectors. The leftmost vector $\vec{a}_S$ is nonzero along four dimensions. Displacement of the ones transforms $\vec{a}$ to $\vec{b}$, whereas a larger displacement instead transforms $\vec{a}$ to $\vec{c}$. In standard vector representations of these patterns, the distance $\vec{a}$ to $\vec{b}$ equals the distance $\vec{a}_S$ to $\vec{c}$, whether measured via Euclidean, Hamming, Mahalanobis, Minkowski, or any other edit distance. (B) shows simple auditory tone stimuli with a similar pattern—frequencies of the tones in $\vec{b}_A$ are less offset from $\vec{a}_A$ than the frequencies of $\vec{c}_A$. (C) shows simple visual dot-pattern stimuli each with four dots. Each dot is at one of 64 possible heights within the rectangular viewing area, again with a similar pattern to the vectors in (a).

Figure 17:
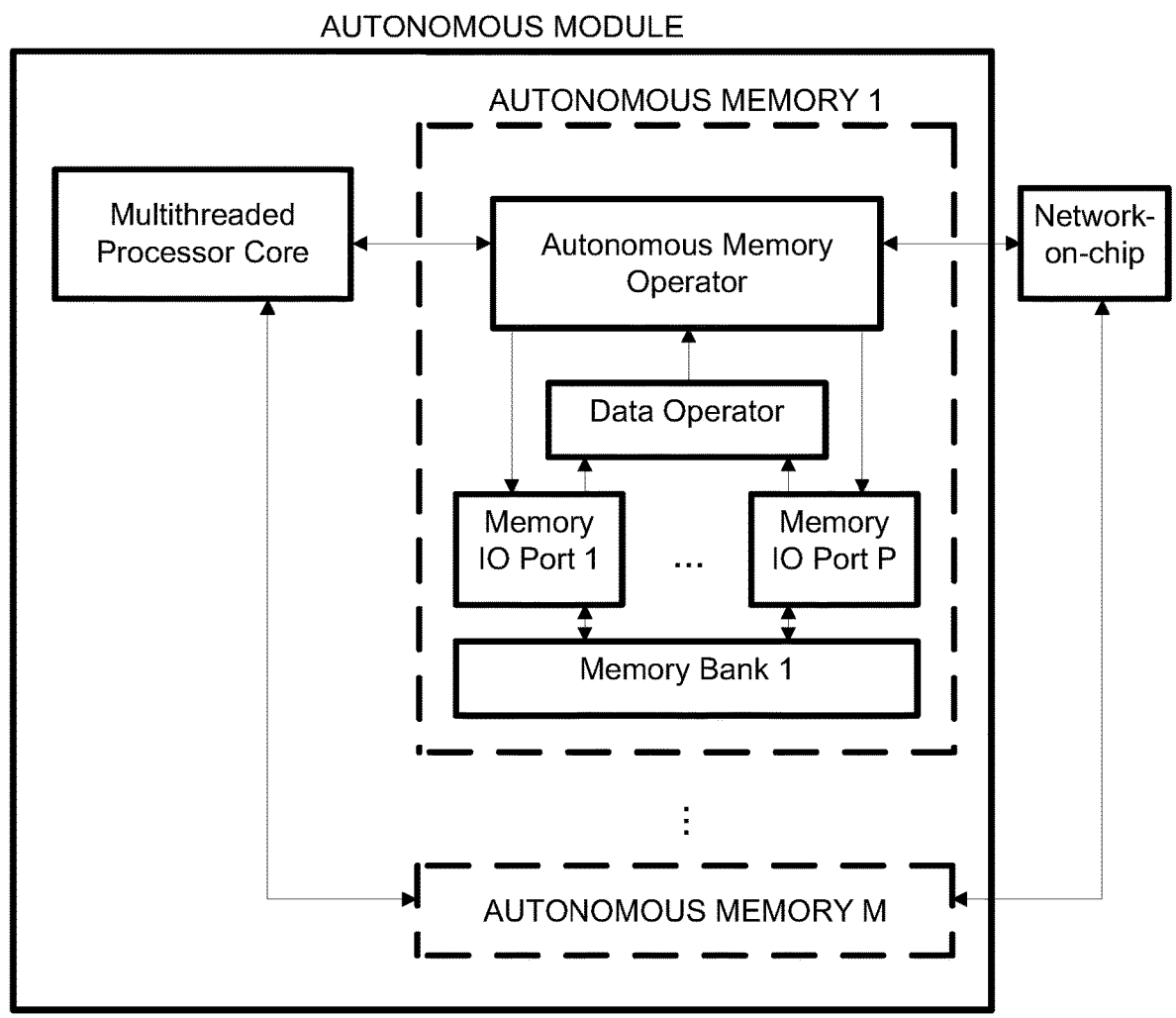
FIG. 17 is a functional diagram of an autonomous module, in an embodiment.

FIG. 17 depicts an Autonomous Module (AM) of the novel system. The AM includes a Multithreaded Processor Core (MPC). The AM may be implemented on a field-programmable gate array (FPGA) and multiple AMs may be implemented on a single FPGA. The MPC communicates with one or more Autonomous Memories (AMem) which contain one or multiple Memory Banks (MB) and an Autonomous Memory Operator (AMO). The MB is controlled by the AMO and the AMO implements a state machine in order to carry out algorithms that read from and write to the MB. When the state machine being executed by the AMO executes in a state that is to read data from the MB, it will send a read command, along with the address to be read, to the MB through one of the Memory IO Ports, depicted as Memory IO Port 1 through Memory IO Port P. It may be that only 1 memory IO Port is available, or it may be that two or three are available. Each port may be read-only, write-only, or read and write. Data that is read back to the AMO is transferred from the MB to the relevant Memory IO Port on which the read command began, and passes through the Data Operator (DO) back to the AMO. The memory operator may perform various functions such as acting as a simple pass-through such that the data is not modified, or it may contain a multiplication function wherein data entering from two memory ports are multiplied together and the result is sent to the AMO. The Data Operator may implement multiple such functions including pass-through. Various functions implemented by the Data Operator may be enabled or disabled by the AMO in order to save power by not operating those functions that are not needed by the AMO to operate in its current or anticipated future states. The network-on-chip, which may integrate multiple AMs on a single FPGA or on multiple FPGA so that they can communicate with each other, interfaces with the AMs and allows the memory banks to receive data from the network without intervention by the MPC. Depending on the state machine being executed by the AMO, it is possible that a memory command received over the network-on-chip could change the state of the AMO or the AMO may execute a state machine on data received over the network-on-chip when combined with data already held in the local MB. For example, a memory command received by an AMO from the network-on-chip may trigger the AMO to read a particular address in the memory bank as indicated by the memory command, set the Data Operator to increment mode which causes the value read from the MB to have 1 added to it, and then the AMO might write this value back to the MB at the same address. Similarly, the AMO might write a second value to the MB if the newly incremented value surpassed some threshold after increment. The fact that these operations occur without intervention by the MPC enables low power operation and high performance. The reconfigurable nature of the MPC when implemented in FPGA allows various state machines to be loaded and executed on the same hardware, allowing some of the flexibility normally associated with software while avoiding much of the low performance and power draw that would be typical if the system were to require the traditional software processor's execution for every operation.

Figure 18:
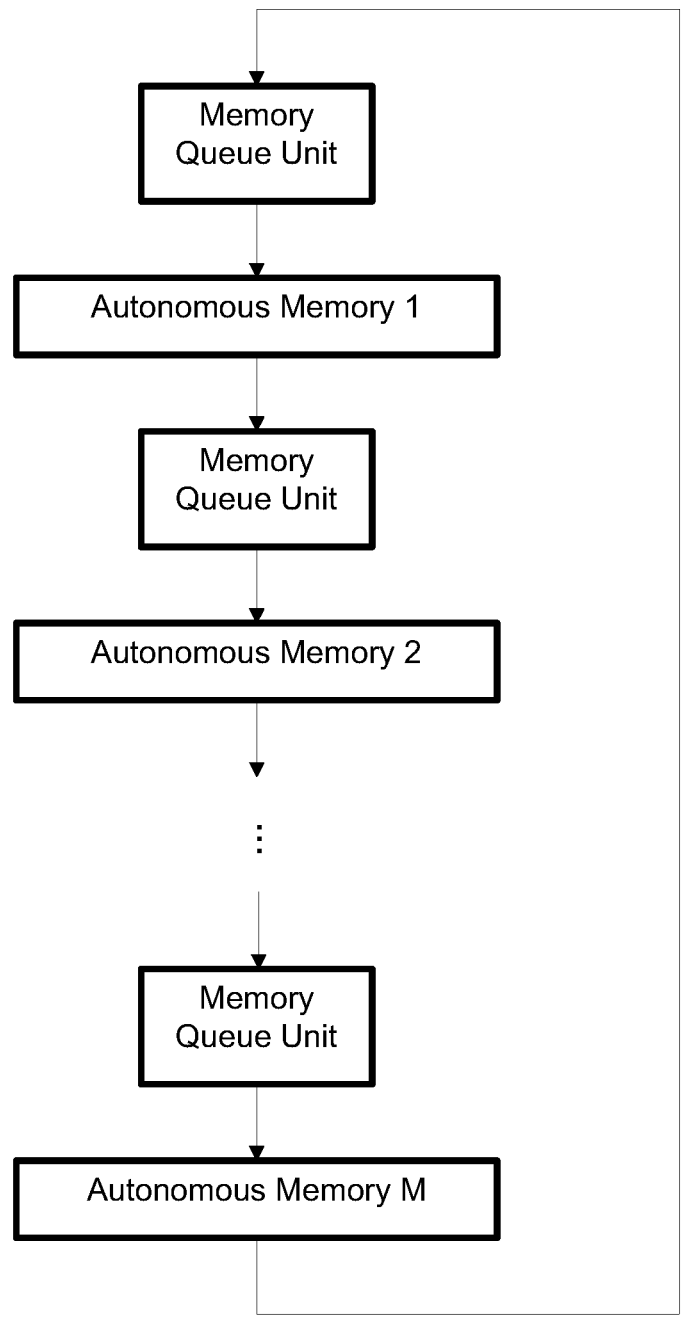
FIG. 18 depicts a mechanism wherein data may be transferred between autonomous memories in the same autonomous module, in an embodiment.

FIG. 18 depicts a mechanism wherein data may be transferred between Autonomous Memories (AMs) in the same Autonomous Module. Typically a processor must operate a memory instruction in order to move memory from one location to another, however the Memory Queue Units depicted in FIG. 18 show that data may be transferred, e.g., from Autonomous Memory 1 to Autonomous Memory 2 through a Memory Queue Unit. The Memory Queue Unit may be commanded by the MPC or by the Autonomous Memory Operator to transfer one or more pieces of data from one address range in a first Memory Bank of a first Autonomous Memory to a second address range in a second Memory Bank of a second Autonomous Memory. For example, an Autonomous Memory Operator may execute a vector-matrix multiplication however the matrix may be stored across multiple Memory Banks across multiple Autonomous Memories. Once a given Autonomous Memory Operator has finished the operations that required a certain portion of the matrix, the local portion of the matrix may be transferred through a Memory Queue Unit to another Autonomous Memory and in turn new data that can be used for further operations may be received from yet another Autonomous Memory so that the data can move from bank to bank and each Autonomous Memory Operator will get a turn with each piece of data. Certain algorithms such as vector-matrix multiplication benefit greatly from this architecture.

Figure 19:
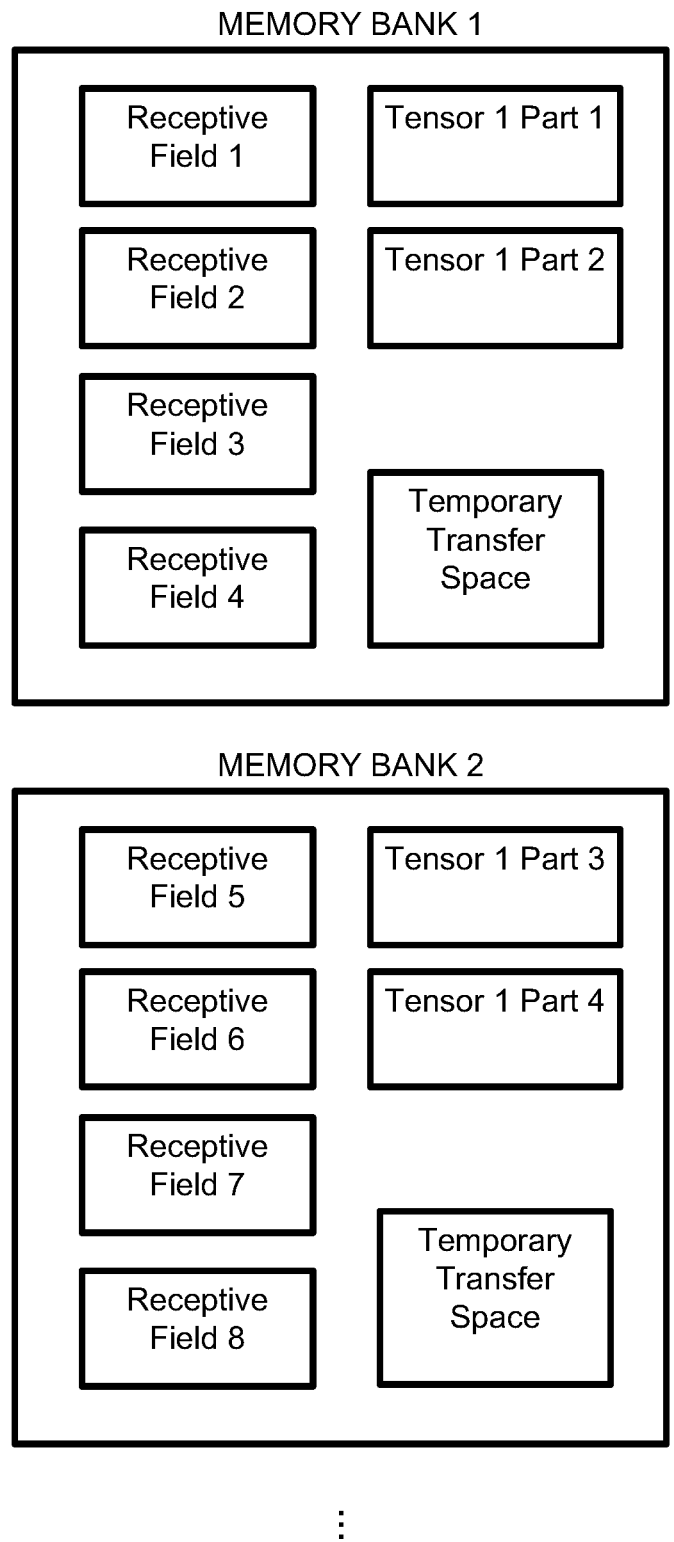
FIG. 19 depicts two memory banks and various pieces of data held within those memory banks, in an embodiment.

FIG. 19 depicts two Memory Banks and various pieces of data held within those memory banks. These Memory Banks may be in separate Autonomous Memories in the same Autonomous Module. The Autonomous Module might be responsible for operating 8 receptive fields however the work to operate the receptive fields may be performed two Autonomous Memories in parallel, and within those Autonomous Memories by the Autonomous Memory Operators. The state machines across the Autonomous Memory Operators may be the same however the state that each Autonomous Memory Operator is in may be different at any given moment, and, most importantly, the data that each state machine operates on will be different if, as in FIG. 6, the banks assigned to the Autonomous Memory Operators hold different data.

FIG. 19 further depicts Receptive Fields 1-4 assigned to Memory Bank 1 and Receptive Fields 5-8 assigned to Memory Bank 2. In order to perform distance calculations, Tensor data structures may be needed however these may not fit in each Memory Bank separately, and therefore Memory Bank 1 is depicted in this example as holding Tensor 1 Part 1 and Tensor 1 Part 2, whereas Memory Bank 2 is depicted in this example as holding Tensor 1 Part 3 and Tensor 1 Part 4. To operate the Memory Queue Units efficiently it may be useful for each Memory Bank to have reserved space, namely Temporary Transfer Space, which enables data to be transferred into a Memory Bank without overwriting any important data that may be in current use by the local Autonomous Memory Operator.

Figure 20:
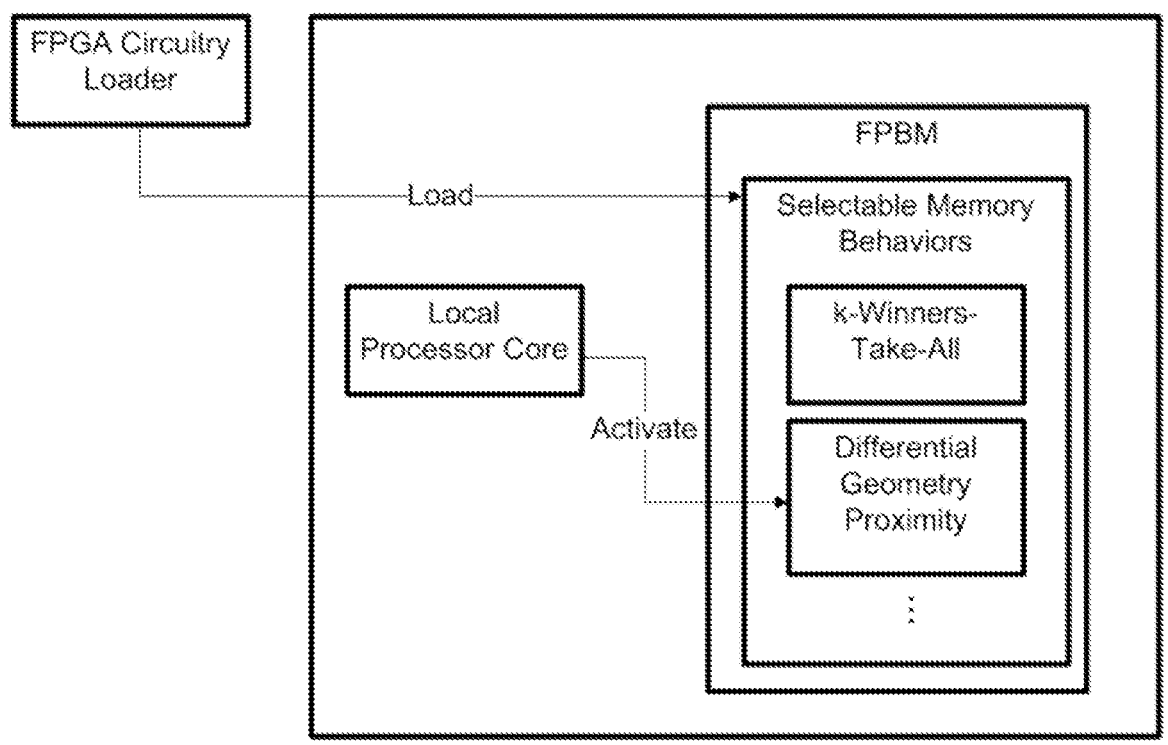
FIG. 20 depicts examples of memory behaviors, in embodiments.

FIG. 20 depicts an embodiment wherein an Autonomous Module is implemented in whole or in part with FPGA circuitry. The Autonomous Memory Operator contains Selectable Memory Behaviors which implemented by reprogrammable circuitry (FPGA). The FPGA Circuitry loader loads the Selectable Memory Operators into the Autonomous Memory Behaviors. Multiple memory behaviors may be loaded so that the Multithreaded Processor Core can choose which behavior to activate at runtime without requiring a new FPGA Circuitry Loader load. In this way it is possible to switch between the Selectable Memory Behaviors rapidly, such as within a few nanoseconds. In contrast the FPGA Circuitry Loader can require microseconds or milliseconds to load the Selectable Memory Behaviors. The MPC may implement an algorithm with algorithmic components that can be offloaded to the Autonomous Memory Operator and the MPC algorithm may select one memory behavior for a given time period, e.g., for 100 microseconds, and then process the results and select a different memory behavior based on those results, which it may allow to operate for another 100 microseconds.

FIG. 20 also depicts exemplary memory behaviors, namely k-Winners-Take-All and Differential Geometry Proximity behaviors. These behaviors use the local memory banks as data which they operate upon and the results of the behaviors are stored as updated data values in those same memory banks.

Figure 21:
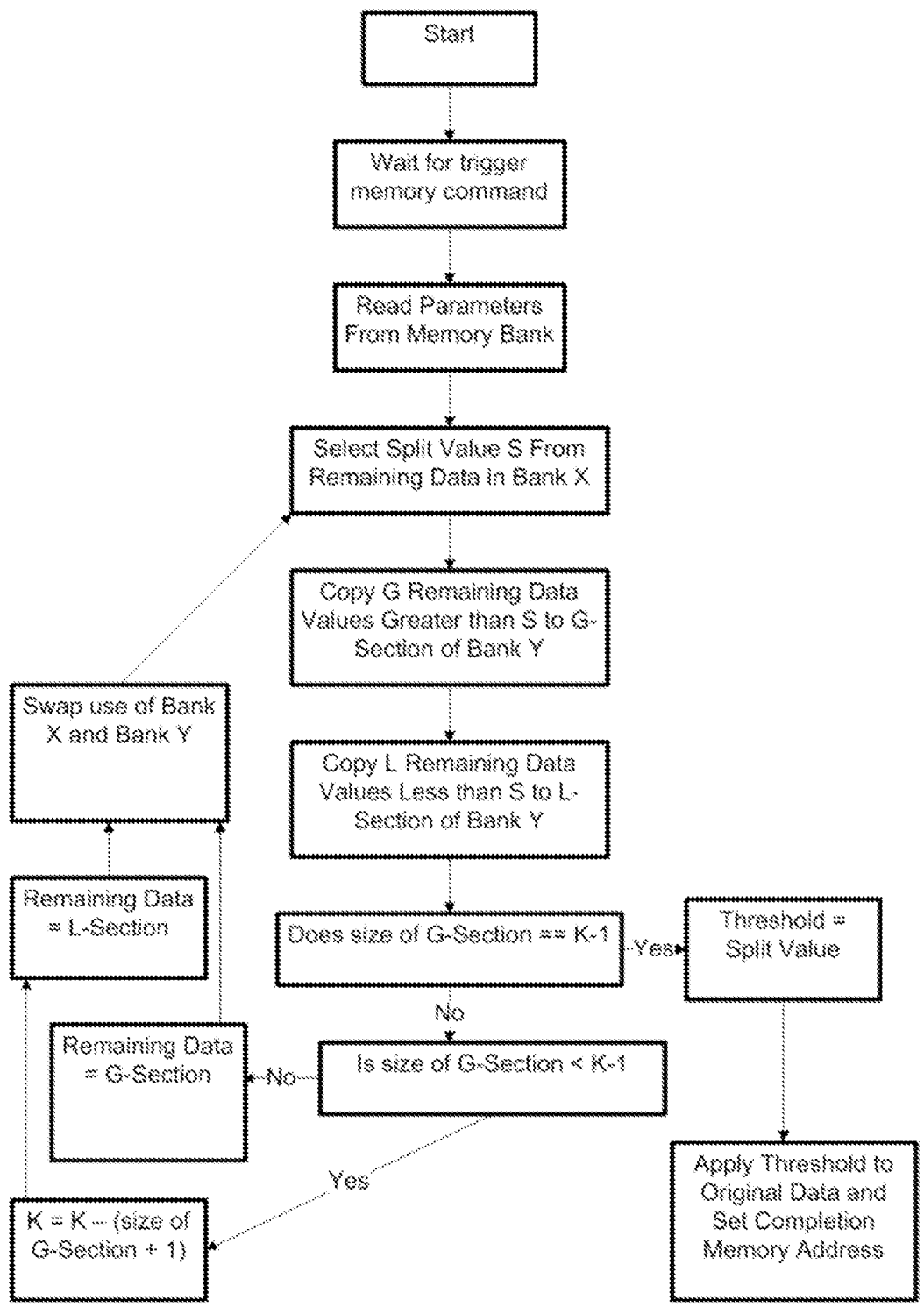
FIG. 21 is a flow chart depicting an example of selectable memory behavior, in an embodiment.

FIG. 21 depicts an embodiment of selectable memory behavior, namely the k-nearest algorithm, also called "soft max", and it is related to the "selection" algorithm where the K-highest value in an unsorted set of data is searched for. In particular the process relates to the Quick-Select algorithm however the process describes how this may be carried out in an autonomous memory operator which is limited in how it may use the memory banks. In particular the algorithm is adapted to accommodate the case where an autonomous memory contains just two banks, with each bank containing just one port that may read or write but not both read and write in the same cycle. FPGA hardware that contains block ram memory with dual ports each usable in read or write mode may implement the two banks with one physical bank. During one pass of the process one bank is dedicated to reading and the other to writing, and this accommodates a pipelined circuit implementation as well as prevents switching back-and-forth between read and write modes of a bank. By preventing this switching from occurring frequently, the penalty associated with this switching is prevented, which otherwise cost a delay cycle whenever read commands are followed by writes. The process depicted assumes the data does not contain duplicate values however it is easily adapted to accommodate duplicate values.

The process begins at the "Start" box. From start the process proceeds to the "Wait for trigger memory command". In this state the Autonomous Memory Operator stays in an untriggered state until it receives a memory command of the format required for triggering. Such a command may be, for example, a write of a particular value to a particular address within the memory bank, where that address is reserved for receiving commands such as the triggering command. Once the triggering memory command is received the process proceeds to the "Read Parameters From Memory Bank" step.

In the "Read Parameters From Memory Bank" step, the parameters that will be used to carry out the process are read from the memory banks and stored in register circuits within the autonomous memory operator. These registers serve as inputs to data operators. This step proceeds to the "Select Split Value from Remaining Data in Bank X" step.

In the "Select Split Value from Remaining Data in Bank X" step a value is selected from the set of remaining data elements in Bank X. During the first processing of this step the remaining data will comprise all the data that is to be analyzed, however subsequent executions that result from the looping of the process will progressively narrow the set of data that is to be analyzed during an individual pass. Importantly, the bank that is referred to as "Bank X" may change to be "Bank Y" and the bank referred to as Bank Y, may change to be "Bank X" on alternating passes through the process. This is because "Bank X" is a stand-in name for the bank containing the data that remains to be analyzed. During each pass data is read from Bank X, processed, and the results are sent to Bank Y. During the next pass the data that remains to be analyzed is held in Bank Y at the start of the new loop. To preserve the ability to use memory banks as the input and output of the analysis process, and to use data operators directly out the data that is output from the memory banks and to provide the output of the data operators directly as input to a memory bank, the banks must have the number of reads and writes that occur within an individual bank during any given clock cycle to be limited. In a typical case the bank will be limited to allowing 1 read or 1 write per cycle, and it is preferred that a bank remain in a reading state or writing state as long as possible without switching between the two states frequently (certainly not every cycle if it can be avoided).

In systems such as FPGAs that implement the memory banks with block RAM, and where the block RAM has two independent read/write ports, it is possible that the autonomous memory operator reserves 1 port per block RAM for autonomous memory operation of a selectable memory behavior, and allows the other port to be used for standard memory operations. In this way the MPC may operate on data in parallel while a selectable memory behavior is operating on the same or other data within those same memory banks.

In the "Select Split Value from Remaining Data in Bank X", one method for selecting this split value is to select a random piece of data from the set of data that remains to be analyzed. In the case that all the data that remains has equivalent values, it is possible that the subsequent dividing up of the data based on the split value will not make any progress and the data will not divide any further. This can be the case after multiple passes through the process, for example, and some of the data have equal values. In this case it will be important to detect the condition that all the remaining data has the same value. Generally in neural network activation value analysis the activation values will not be equal and so duplicates will be rare and their performance impact will be minimal. Because methods for dealing with this condition are known and in many cases the condition is rare we do not discuss further. As an example, if the remaining data is a list of values such as "5", "7", and "2", a random index into this set of data may be determined by the data operator producing a pseudorandom number based on the initial process parameters and the second value, having value "7", might be selected. Random selection is not guaranteed to choose a good value but the average quality of the selection will typically allow the algorithm to make progress into segregating the data. This step proceeds to the "Copy G Remaining Data Values Greater than S to G-Section of Bank Y" step, and subsequently to the "Copy L Remaining Data Values Less than S to L-Section of Bank Y".

Although depicted separately, data operators may carry out the "Copy G Remaining Data Values Greater than S to G-Section of Bank Y" step and the "Copy L Remaining Data Values Less than S to L-Section of Bank Y" step simultaneously. During these steps each data element is read from the set of remaining data in Logical Memory Bank X in turn, and each is compared to the split value S (the randomly selected value from the set). Here, we describe the case where no values are duplicates of each other. One method for making each value unique is to set the low bits of the data (preferably unused low bits) equal to their initial position in the array. To avoid breaking ties in a way that gives preferential treatment to low or high initial positions, the data may be shuffled prior to starting the process. If the element is greater than S, it is written to the next available position in the reserved G-section of Logical Memory Bank Y. If the element is less than S, it is written to the next available position in the reserved L-section of Logical Memory Bank Y. The "next available position" is held in register and operates further as a tally of the number of data written to each section.

Once all of the remaining data have been written to their relevant section in Logical Memory Bank Y, the process proceeds to the "Does size of G-Section==K−1" step.

In the "Does size of G-Section==K−1" step the number of elements written to the G-section during the current pass through the process is compared to the value of K−1 (K minus 1). If equal, this means that the split value S is the K'th largest value and the process proceeds via the "Yes" transition to the "Threshold=Split Value" step. Otherwise the process proceeds to step "Is size of G-Section<K−1".

In the "Is size of G-Section<K−1" step, if the size of the G-Section is less than K−1 (K minus 1) then the process proceeds to the "K=K−(size of G-Section+1)" via the "Yes" transition. In this case the K'th largest value is not in the G-section, since too few values are in the G-section to contain it. Therefore it is in the L-section and when we look through the L-section in a future pass through the process we will not look for the K'th largest value in the sense of the current K value, but will look for a different K value that we calculate, which takes into account the fact that we have already found "size of G-section+1" values greater than all the values in the L-section, and so we need not find the K'th largest value in the L-section but rather we reduce K by the number of elements we have eliminated as being larger than all the values in the L-section.

If the size of the G-section is greater than or equal to K−1 then the process proceeds to the "Remaining Data=G-Section" step.

In the "K=K−(size of G-Section+1)" step the K value is adjusted to account for the number of values larger than those in the L-section that have been eliminated as options for being the K'th largest value. This is done by subtracting from K the number of elements that are in the G-section plus 1. The 1 is added because the G-section does not include the split value so we must add 1 to account for it. This step then proceeds to the "Remaining Data=L-Section" step. The updated K value will be used in a subsequent pass through the process.

In the "Remaining Data=G-Section" step the remaining data that will be processed in a subsequent pass of the process is restricted to just that set of data in the G-Section. In this way, the set of data that is processed gets smaller each pass through the process (although it is only guaranteed to make progress if the data does not contain duplicates or is modified to not contain duplicates). This step proceeds to the "Swap use of Bank X and Bank Y" step.

In the "Remaining Data=L-Section" step the remaining data that will be processed in a subsequent pass of the process is restricted to just that set of data in the L-Section. In this way, the set of data that is processed gets smaller each pass through the process (although it is only guaranteed to make progress if the data does not contain duplicates or is modified to not contain duplicates). This step proceeds to the "Swap use of Bank X and Bank Y" step.

In the "Swap use of Bank X and Bank Y" step the process switches to use the bank containing the L-Section and G-Section as the input memory bank and the output memory bank becomes the other memory bank. This may require switching the ports used by the autonomous memory operator from read mode to write mode or write mode to read mode to accommodate the new use case. Because use of the banks is only switched once per pass through the process the mode of the ports is switched relatively infrequently. This is a performance advantage because switching from read mode to write mode generally has a latency cost because the read value must exit the memory before it can be switched to write mode on that same port. The means by which the data operators and the autonomous memory operators in general switch banks may be a mux where the inputs to the data operators are switched from the data received by a first bank to the data received by a second bank by setting the selection bit of the mux based on whether the process is in an odd or even pass. This step proceeds back to the "Select Split Value S from Remaining Data in Bank X" step.

It is noteworthy that the data can be analyzed in this process in parallel so long as the pointer to the "next value" in the L-Section and G-section is updated properly so that two data will not get written to the same address. By enabling pipelining it is possible for memory banks with read latencies of 2 or more cycles to not result in much performance detriment.

The "Threshold=Split Value" step sets one of the results of the process, that is the threshold, which represents the K'th highest value in the original data set, to its proper value. This is the split value in the case that the size of the most recently created G-section is equal to K−1 (where K may have been modified in previous passes). This step proceeds to the "Apply Threshold to Original Data and Set Completion Memory Address" step.

In the "Apply Threshold to Original Data and Set Completion Memory Address" step the original data will be compared to the threshold so that those values that are greater or equal to the threshold will be "fired" or set to some other signal value (e.g., set to some MAX VALUE parameter). Once the original data has been modified based on the derived threshold, a value representing that the process has completed is set at a memory address that has been reserved for the purpose. In one embodiment this value may be polled by the MPC so that the MPC can determine which autonomous memory operators have completed their calculations. In another embodiment a completion value is not written to memory but instead an interrupt is generated by the memory bank and that interrupt is specific to that memory bank. In another embodiment a tally of the number of banks that have completed is incremented whenever an autonomous memory operator creates a signal and the MPC receives an interrupt only when this tally reaches a certain value, such as when all of the autonomous memory operators have completed their calculations.

Figure 22:
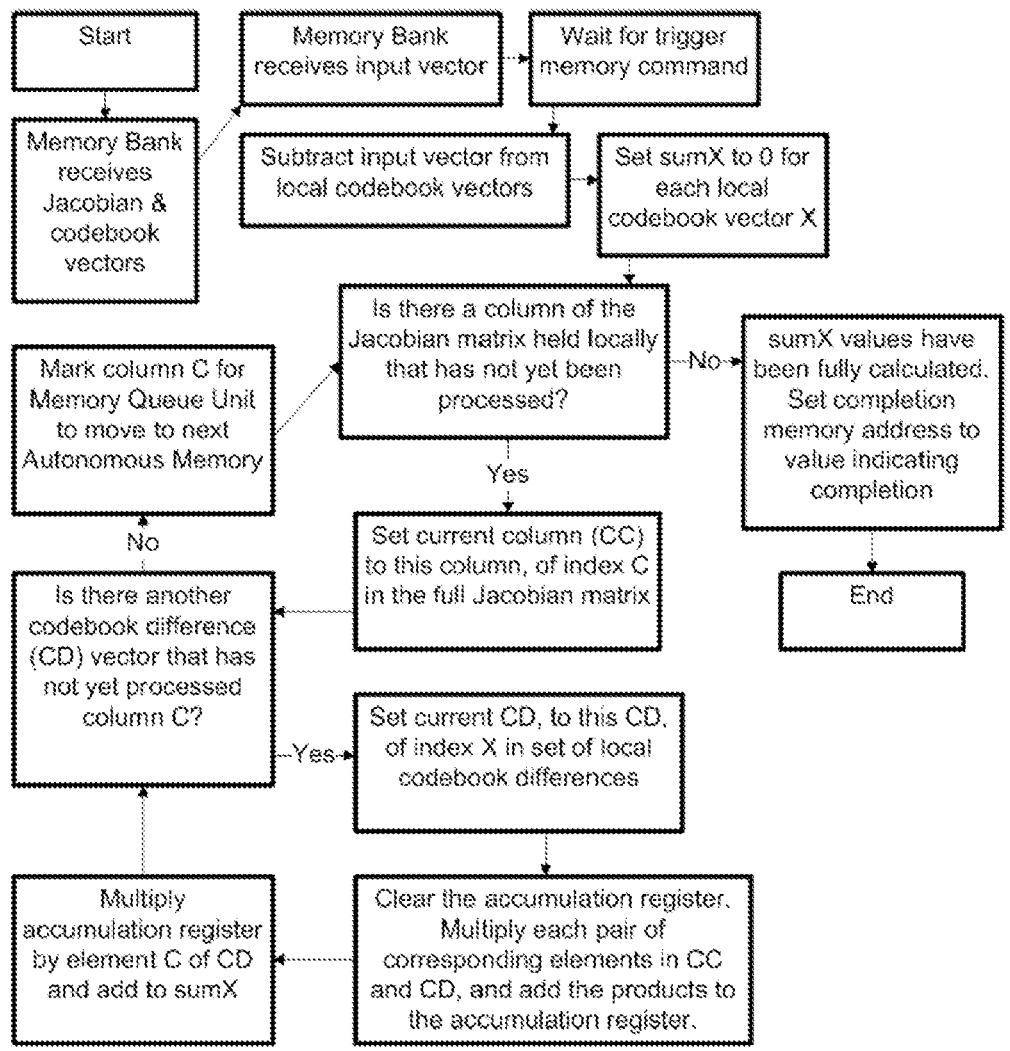
FIG. 22 is a flow chart depicting a first autonomous memory operator process calculating differential geometry proximity, in an embodiment.

FIG. 22 depicts an Autonomous Memory Operator process calculating Differential Geometry Proximity. In this process an input vector is subtracted with various reference/codebook vectors, multiplied with a Jacobian matrix, and finally multiplied again with the previously calculated subtraction result to get a final distance. Because each Autonomous Memory does not contain an entire copy of the Jacobian the various parts are shifted through the memories as they finish being used by a certain Autonomous Memory so that they can be used by a different Autonomous Memory.

The process begins in the "Start" step, which proceeds to the "Memory Bank receives Jacobian & codebook vectors" step.

In the "Memory Bank receives Jacobian & codebook vectors" step the Jacobian matrix is sent to the different memory banks, with different starts stored in the memory banks of different Autonomous Memories. Each Autonomous Memory further receives a set of codebook vectors. This step proceeds to the "Memory Bank receives input vector" step.

In the "Memory Bank receives input vector" step an input vector is saved in the memory bank of an Autonomous Module. Each Autonomous Module may receive its own copy of this vector, which would be stored locally in one of its memory banks (or the only memory bank of the Autonomous Memory in the case that the Autonomous Memory has only one bank). The input vector may be written to the memory bank by the network-on-chip or the MPC, as is generally the case for any data transferred to the memory. In one embodiment it may require less circuitry resources if this data can be written only by the MPC, such as in the case that the network-on-chip is only given write-access to a particular memory bank of a given Autonomous Memory and the other bank is dedicated for the calculation of the process depicted here. This step proceeds to the "Wait for trigger memory command" step.

In the "Wait for trigger memory command" step the Autonomous Memory Operator waits for a memory command that matches a special signature which has been previously assigned as a trigger to begin the Differential Geometry Proximity calculation process. Once this memory command is received, e.g., when the MPC sends such a memory command to the Autonomous Memory, the process proceeds to the "Subtract input vector from local codebook vectors" step.

In the "Subtract input vector from local codebook vectors step" the Autonomous Memory Operator reads the values of the codebook vectors from memory and corresponding elements of the input vector, and the Data Operator performs a subtraction, and the results of the subtraction are written back to the memory bank. In one embodiment the new values overwrite the original codebook vectors however this embodiment requires that the vectors be written back to the memory banks during initialization. If the Differential Geometry Proximity calculation will be executed with the same set of codebook vectors but many different input vectors, it may be preferred to write the results of the subtraction to a different reserved section of the memory banks at the expense of requiring the memory banks to be larger or to have more memory banks per Autonomous Memory in order to hold these values. This step proceeds to the "Set sumX to 0 for each local codebook vector X".

In the "Set sumX to 0 for each local codebook vector X" step the process initializes the data location that will hold the result of each proximity calculation, for each codebook vector, to zero. During the process values will be added to this data location until the process completes and the final value holds the finally calculated proximity, one proximity value per codebook vector representing the distance of each codebook vector to the original input. This step proceeds to the "Is there a column of the Jacobian matrix held locally that has not yet been processed" step.

In the "Is there a column of the Jacobian matrix held locally that has not yet been processed" step the state of the calculation is determined. If all portions of the Jacobian Matrix that are held in a local memory bank have already been processed with each locally held codebook vector then the process will wait for a new piece of the Jacobian Matrix to arrive in a memory bank, which will be transferred by the Memory Queue Unit. During the initial pass of the process, all of the locally held columns of the Jacobian matrix have not yet been processed and one will be selected in the next step. If all columns held in the Autonomous Module have already been processed with respect to the local codebook vectors the process will proceed to the "sumX values have been fully calculated. Set completion memory address to value indicating completion" step. Otherwise, additional columns remain to be processed and once one is available in a local memory bank the process proceeds via the "Yes" pathway to the "Set current column (CC) to this column, of index C in the full Jacobian matrix" step.

In the "Set current column (CC) to this column, of index C in the full Jacobian matrix" step a new column has been selected, namely the current column (CC). In one embodiment a Jacobian matrix is a 64×64 array of values, with 64 different columns. The variable C describes the column that has been selected for the next pass of processing. This step proceeds to the "Is there another codebook difference (CD) vector that has not yet processed column C" step.

In the "Is there another codebook difference (CD) vector that has not yet processed column C" step the Autonomous Memory Operator checks the state held in its registers to determine if all of the codebook difference (CD) vectors have been processed with the current column. The codebook difference (CD) vectors are the vectors that are the results of the subtraction of the codebook vectors and the input vector, previously described. The first time this step is reached after having selected a new current column (CC), all of the codebook difference (CD) vectors will remain to be processed and the "Yes" pathway will be followed. In a subsequent pass, once all CD vectors have all been processed with the CC, the No path will be followed. If they have all been processed with the current column, the process proceeds via the "No" path to the "Mark column C for Memory Queue Unit to move to next Autonomous Memory" step. Otherwise the process proceeds to via the "Yes" path to the "Set current CD, to this CD, of index X in set of local codebook differences" step.

In the "Set current CD, to this CD, of index X in set of local codebook differences" the current codebook difference (CD) vector is assigned to the next codebook difference vector that is to be processed with the current column. This step proceeds to the "Clear the accumulation register, multiply each pair of corresponding elements in CC and CD and add the products to the accumulation register" step.

In the "Clear the accumulation register, multiply each pair of corresponding elements in CC and CD and add the products to the accumulation register" step the dot-product of the CC vector and the CD vector is calculated by the Autonomous Memory Operator. The Autonomous Memory Operator performs this task by fetching values from the memory banks in pairs of corresponding elements. In one embodiment the codebook difference vectors are stored in one bank and the Jacobian matrix columns are stored in another bank so that in each cycle a pair of corresponding values can be fetched from the memory banks, one from each bank. The values are multiplied and summed in an accumulation register by the Data Operator. If the vectors are 64-elements long, then this could, for example, require 64 steps and it could be pipelined, for example, in the case that the fetches from the memory banks take more than 1 cycle or the multiplier of the Data Operator has a single-cycle throughput but multicycle latency (such as is sometimes the case when implementing a floating point multiplier with FPGA circuitry). In other embodiments the data can be fetched and the data is processed in fixed point at low precision and latency is not an issue, which makes pipelining unnecessary. Because the addition is done in a special independent accumulation register, so long as that register is able to update in a single cycle a pipelined implementation will not have conflicts. This step proceeds to the "Multiply accumulation register by element C of CD and add to sumX" step.

In the "Multiply accumulation register by element C of CD and add to sumX" step the value held in the accumulation register is multiplied by a certain value held in the current difference vector. This has the effect of post-multiplying the Jacobian matrix by the codebook difference vector, which is necessary to the distance/proximity calculation. Once the accumulation register has been multiplied by element C of the codebook difference vector, the product is added to sumX, which is the running sum for the current codebook difference vector. Each column in the Jacobian matrix will cause each sum to have a value added to it, and once all Jacobian matrix columns have been processed the sum values hold the final distance/proximity measurement representing the distance/proximity of the input vector to the corresponding codebook vector. This step proceeds to the "Is there another codebook difference (CD) vector that has not yet processed column C?" step previously described.

In the "Mark column C for Memory Queue Unit to move to next Autonomous Memory" step the current column, which has been fully processed against all codebook difference vectors, is transferred to a different Autonomous Memory so that that Autonomous Memory may take a turn in using that data. Similarly, new Jacobian Matrix columns will be transferred to Autonomous Memory for additional calculations, unless all columns have been processed. This step proceeds to the "Is there a column of the Jacobian matrix held locally that has not yet been processed?" step, previously described.

In the "sumX values have been fully calculated. Set completion memory address to the value indicating completion" step the sumX values now hold their final values for calculation with the current input vector. A large value for a given sum, say sumZ, represents the distance between the input vector and codebook vector Z. Large values will indicate greater distances and small values indicate closer proximity. The MPC is signaled so that it can begin processes that depended on the completion of these calculations. In one embodiment the MPC polls the data held in the memory banks at certain addresses designated for signaling completion. In other embodiments the Autonomous Memory Operator raises an exception for processing by the MPC. Other methods for signaling completion have been previously described as well, and they apply here as embodiments. This step proceeds to the "End" step, where the Autonomous Memory Operator may restart to the beginning of the process, await reconfiguration, or await reinitialization.

In one embodiment, the result of the subtraction of the input vector from the codebook vector is stored so that it does not have to be recalculated after the vector-matrix multiplication. In another embodiment input vector is the reference vector and subtraction of a reference vector does not occur. In another embodiment a process will use the resulting values of the distances in an attempt to optimize the Jacobian matrix and will update the Jacobian matrix based on the results of one or many of the distance calculations. Distance calculations would then be recalculated using the new Jacobian matrix and if the resulting distances are superior then a new Jacobian matrix will be calculated as a variation on the most recent Jacobian matrix. If the new distances are worse, (e.g., from the perspective of image-quality analysis) then a new Jacobian matrix would be calculated based on a variation of the previous Jacobian matrix. This describes a greedy search for a Jacobian matrix, however less greedy methods wherein intermediate Jacobian matrices that lead to less-optimal distance results may be used as the basis for new Jacobian matrix modifications under the control of a mechanism that prevents such derivatives from proceeding too long before an improvement must be reached. One such controlling mechanism may be, for example, the well-known simulated annealing process. In this way superior Jacobian matrices may be found and the acceleration and power reduction of the distance calculations that is achieved through the use of the optimized hardware described herein improve the number of Jacobian matrices that may be tried and the depth to which the search for an improved Jacobian that may proceed under the constraints of time and/or power draw.

The codebook vectors may be vectors taken directly from the input space or they may be vectors that have been learned by a learning algorithm such as a neural network learning algorithm. Although the term codebook used in the literature generally implies that they have been from the input space this is not the meaning we give to the term, as we include in our meaning of the term codebook both possibility that the codebook represents vectors gathered in the traditional method as well as vectors that were initially gathered from the input space, randomly generated, or some combination, and then some or no learning may have been applied to the vectors so that they were subsequently modified. Even after such modification the vectors may have been further modified by random variation for the purpose of avoiding over-fitting. Other methods for deriving the codebook vectors may be used as well. The codebook vectors may also be called reference vectors, as they are the reference to which the input is compared.

Note that the accumulation register is able to add negative values and to hold a negative total. When cleared, the accumulation register is set to 0. It is also possible for the precision of the product of the multiplication to be different from the precision of the accumulation register. For example the multiplication may be performed in 16-bit fixed point arithmetic and the accumulation register may be 24-bit fixed point. In this way the result of the accumulation may have higher precision than that of any of the individual elements of the vectors. Furthermore, by carrying out the multiplication at a lower precision less circuitry is required and less power consumed, and it may be possible to clock the circuitry higher, while the precision of the final result may be relatively unaffected by the carrying-out of the multiplication at lower precision when the aggregation process produces a higher precision result. This will generally be true when most of the products are of the same magnitude. Where products vary wildly and only one or two are near the maximum, and where there are not a sufficient number of elements to add, then carrying out the accumulation at increased precision relative to the multiplication will have a less beneficial impact, though it will generally never detract and the circuitry for carrying out the accumulation at higher precision is generally minimal.

Figure 23:
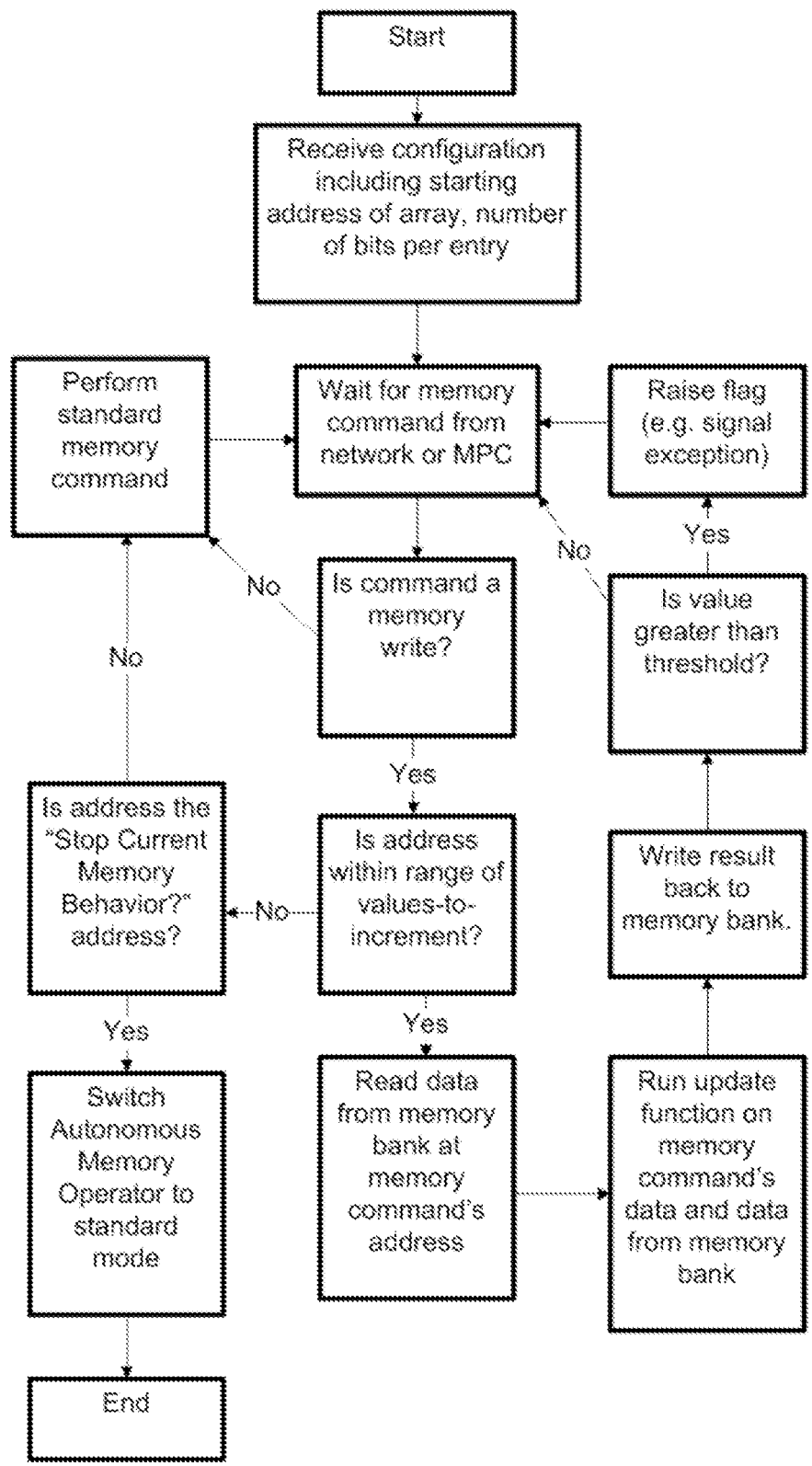
FIG. 23 is a flow chart depicting a second autonomous memory operator process, in an embodiment.

FIG. 23 depicts an Autonomous Memory Operator process wherein memory commands are received and instead of writing the value directly to a memory bank the data of the memory command is computed with the value already held at the address of the memory command and the result of the computation is stored at the address of the memory command. If the value that is written surpasses a threshold then a signal is raised in some manner, thereby notifying the MPC that further processing should be performed. In one embodiment this process simulate an "integrate and fire" neuron where the value of the memory command represents the weight of the synapse that is receiving input and the address of the memory command represents the data location where the neuron receiving input from the synapse stores its current depolarization state (e.g., sum). In another embodiment the synapses are binary representing "presence" or "nonpresence" and the data of the memory command represents the magnitude of the firing pattern of the axon providing input to a given synapse. In another embodiment both the synapse weights and the axon firing pattern magnitude are constant and so the memory command need not contain a data field, thereby allowing smaller memory commands that require less data transfer.

The process begins at the "Start" step which proceeds to the "Receive configuration including starting address of the array, number of bits per entry" step.

In the "Receive configuration including starting address of the array, number of bits per entry" step the process receives in the memory banks the configuration data for the e.g., integrate-and-fire process. A value specifying the starting address of the array and another value specifying the bit width of each entry in the array may be stored at special locations within the memory bank. Once the integrate-and-fire Autonomous Memory Operator Selectable Memory Behavior is selected, data writes to addresses within this array will be interpreted as inputs to the Autonomous Memory Operator's integrate-and-fire process. When the Selectable Memory Behavior is initially started these configuration values will be read from the memory banks into registers of the Autonomous Memory Operator. In another embodiment these values can be reconfigured while the Autonomous Memory Operator is still operating the relevant Selectable Memory Behavior and the registers are updated whenever data is written to the configuration address in a memory bank for the respective configuration value. This step proceeds to the "Wait for memory command from network or MPC".

In the "Wait for memory command from network or MPC" step the Autonomous Memory Operator waits for a new memory command. This step proceeds to the "Is command a memory write?" step.

In the "Is command a memory write?" step the Autonomous Memory Operator analyzes the input memory command to determine whether it is a read or a write. If it is a read then the command is interpreted as a standard memory command by proceeding to the "Perform standard memory command" step via the "No" path, which then proceeds back to the "Wait for memory command from network or MPC" step. Otherwise the process proceeds to the "Is address within range of values-to-increment?" step via the "Yes" path.

In the "Is address within range of values-to-increment?" step the process further analyzes the input memory command, already having been determined to be a memory write command, and determines whether the address of the memory command is to a value within the array that is reserved for integrate-and-fire behavior. If the address is within this reserved array location, the process proceeds via the "Yes" path to the "Read data from memory bank at the memory command's address" step. Otherwise the process proceeds to the "Is address the Stop Current Memory Behavior address" step via the No pathway.

In the "Read data from memory bank at the memory command's address" step the process reads data in the memory bank corresponding to the location within the reserved array specified by the address of the memory command. By fetching this value an update to the value may be performed that takes this current value (soon-to-be previous value) into account. This is important if, for example, the purpose of the currently selected Memory Behavior is to add values written to an address to the value already held at that address, thereby allowing that data location to act as an accumulator. In one embodiment, a neural network simulation is running and networked processors may send memory commands over the network-on-chip to the Autonomous Memory Operators and directly update the depolarization value of a particular neuron simply by sending a memory command to write a value to that neuron's address. By triggering an exception or signal whenever that value surpasses a threshold, the MPC may carry out a firing routine for the neuron and propagate signals to simulate the output messages sent from that neuron's simulated axon. This step proceeds to the "Run update function on memory command's data and data from memory bank" step.

In the "Run update function on memory command's data and data from memory bank" step the process runs a function in the Data Operator feeding the data value from the memory command, held in one register, as a first input, and the value fetched from the memory banks as a second input. The Data Operator may perform any function but a typical function for an integrate-and-fire neural network simulation would be a summation routine. Once the calculation, e.g., summation, is computed the process proceeds to the "Write result back to memory bank" step.

In the "Write result back to memory bank step" the process the output from the Data Operator is sent back to the memory bank at the same location that data was previously fetched from (i.e., the location indicated by the memory command and the current configuration). Thus, if a subsequent pass through the process receives a memory write to the same memory address the updated value will be read from memory and fed to the Data Operator. In one embodiment the data of the memory commands is always 1, the Data Operator functions as an adder, the array values are initialized to zero, and after executing the memory behavior for many memory commands the values stored in the array are counts of the number of memory commands that have been directed to each address (i.e., a summing tally). It is noteworthy that the Data Operator may implement multiple data operations so that multiplication, subtraction, or other functions may be run, and the Autonomous Memory Operator may operate selection muxes so that only the results of the relevant calculator(s) of the Data Operator at a given moment (within a given state of the Memory Behavior) are used. This is similar to simple ALU where all the calculations occur in parallel and selection-by-mux determines which result will be used. This step proceeds to the "Is value greater than threshold".

In the "Is value greater than threshold" step the value written back to the memory bank, which is still held in a register, is compared to a threshold and if the value is greater than the threshold the process proceeds via the "Yes" pathway to the "Raise flag (e.g., signal exception)" step. Otherwise, in the case that the updated value is less than the threshold (the threshold having been read into a register during the configuration step at the beginning of the process, for example), the process proceeds to the "Wait for memory command from network or MPC" step (previously described) via the "No" pathway.

In the "Raise flag (e.g., signal exception)" step the MPC is notified in some manner (several embodiments previously described, e.g., value-updating and polling, or interrupt) so that it may process the event that the threshold has been surpassed. The MPC may in response to this condition send messages over the network and reset the state of the neuron. In another embodiment the MPC may look up a list of neurons connected to the neuron that surpassed threshold, and send memory commands to the memory addresses representing the states of those neurons. In another embodiment the data field of those memory commands may be filled with a multiplication of the synapse weight representing the connection between the receiving neuron and the neuron that just surpassed threshold, multiplied by a value representing the level of activation of the neuron that surpassed threshold. This step proceeds to the "Wait for memory command from network or MPC" step.

In the "Is address the Stop Current Memory Behavior address?" step the address of the current memory command is compared for equality with an address that has been designated as the address representing the command to stop the current memory behavior. If the address is the same, the process proceeds to the "Switch Autonomous Memory Operator to standard mode" step via the "Yes" path. Otherwise the addresses are not equal (indicating that the Autonomous Memory Operator is not being signaled to stop the current behavior) and the process proceeds to the "Perform standard memory command" step.

The "Perform standard memory command" step reads or writes to the memory bank as a standard memory operation using the address specified in the memory command and, if the command is a write, using the data of the memory command. This step proceeds back to the "Wait for memory command from network or MPC" step previously described.

The "Switch Autonomous Memory Operator to standard mode" step switches the Autonomous Memory Operator such that no memory addresses are treated specially and all read and write memory commands are treated as standard memory commands without special behavior. This step proceeds to the "End" step, ending the process. The process may be restarted by sending a new Activate Command to the Autonomous Memory. In this way the MPC may control the starting and stopping of the memory behaviors and may control a meta-process that itself comprises switching between different selectable memory behaviors at different times.

Figure 24:
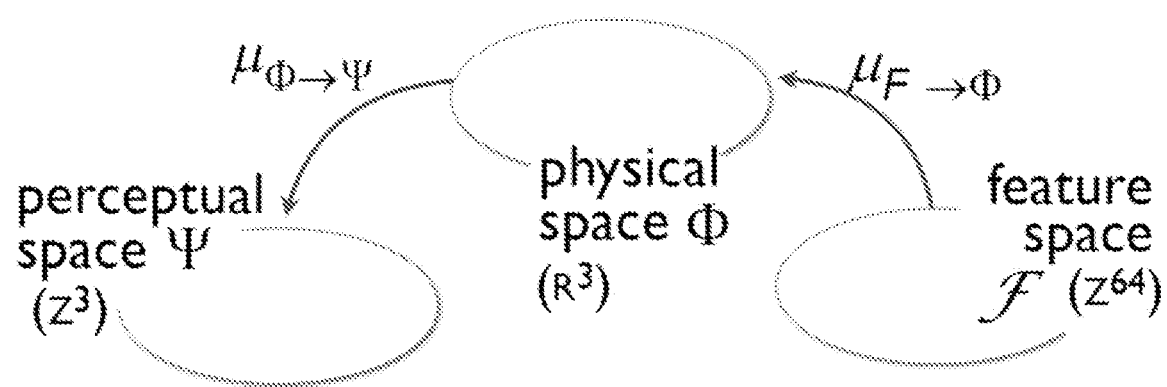
FIG. 24 shows three projection spaces for image compression, in embodiments.

FIG. 24. The three relevant projection spaces for image compression. For all the examples herein, we adopt the JPEG assumption of an 8×8 pixel image. The image consists of a set of intensity settings for each pixel at a given x and y coordinate; this corresponds to physical space $\Phi$ (Euclidean in x-y pixel coordinates). Images are mapped into feature space, listing the 8×8 pixels as a 64-dimensional vector with integer intensity values from −255 to +255. Human judgments of the similarity of two images (such as an original and a compressed image) correspond to a distinct metric space accounting for geometric neighbor relations among the pixels (absent from feature space representation), along with just-noticeable differences (JND) of intensity values at any given pixel. The mapping functions ($\mu$) map from feature to physical space (F→$\Phi$) and from physical to perceptual space ($\Phi$→$\Psi$) as shown.

Figure 25:
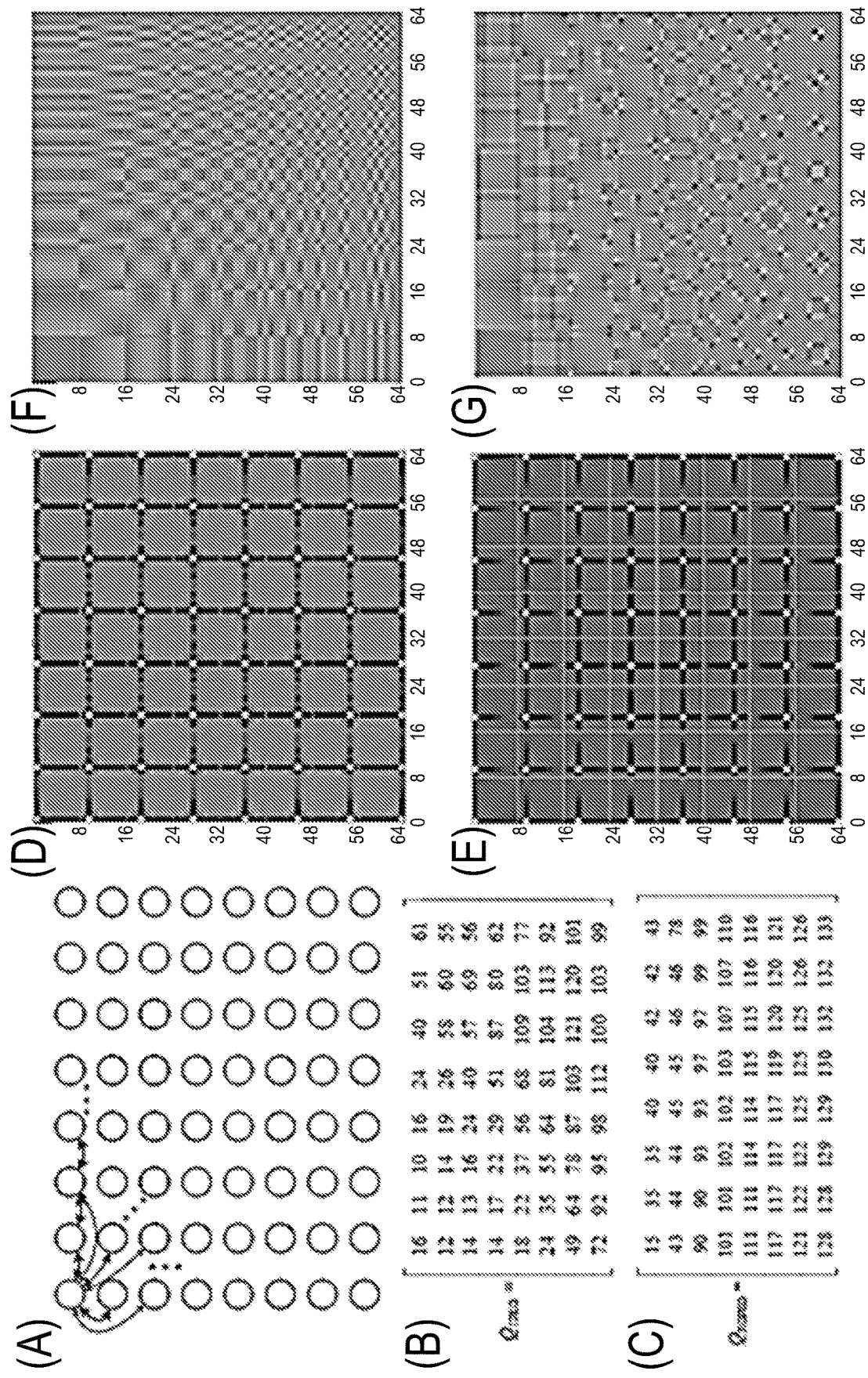
FIG. 25, A-G, show basis vectors, Q matrices, Hamiltonians, and eigenvectors for JPEG image compression and the Riemannian geometric perceptual encoding graph (RGPEG) method of FIG. 11.

FIG. 25. (A) Basis vectors in feature space F treated as a graph with whose nodes are the dimensions of the basis and whose edges are the pairwise distances between dimensions (see Eqn. 14). From that graph, the adjacency and degree matrices, and thus the graph Laplacian, can be directly computed. (B) Q matrix for JPEG (quality level 50%). (C) Computed Q matrix for RGPEG. (D) Hamiltonian for JPEG. (E) Hamiltonian for RGPEG (see section 11B table 8, FIG. 11 step 3. (F) Eigenvectors of Hamiltonian for JPEG. (G) Eigenvectors of Hamiltonian for RGPEG (see FIG. 11 steps 3-7).

Figure 26:
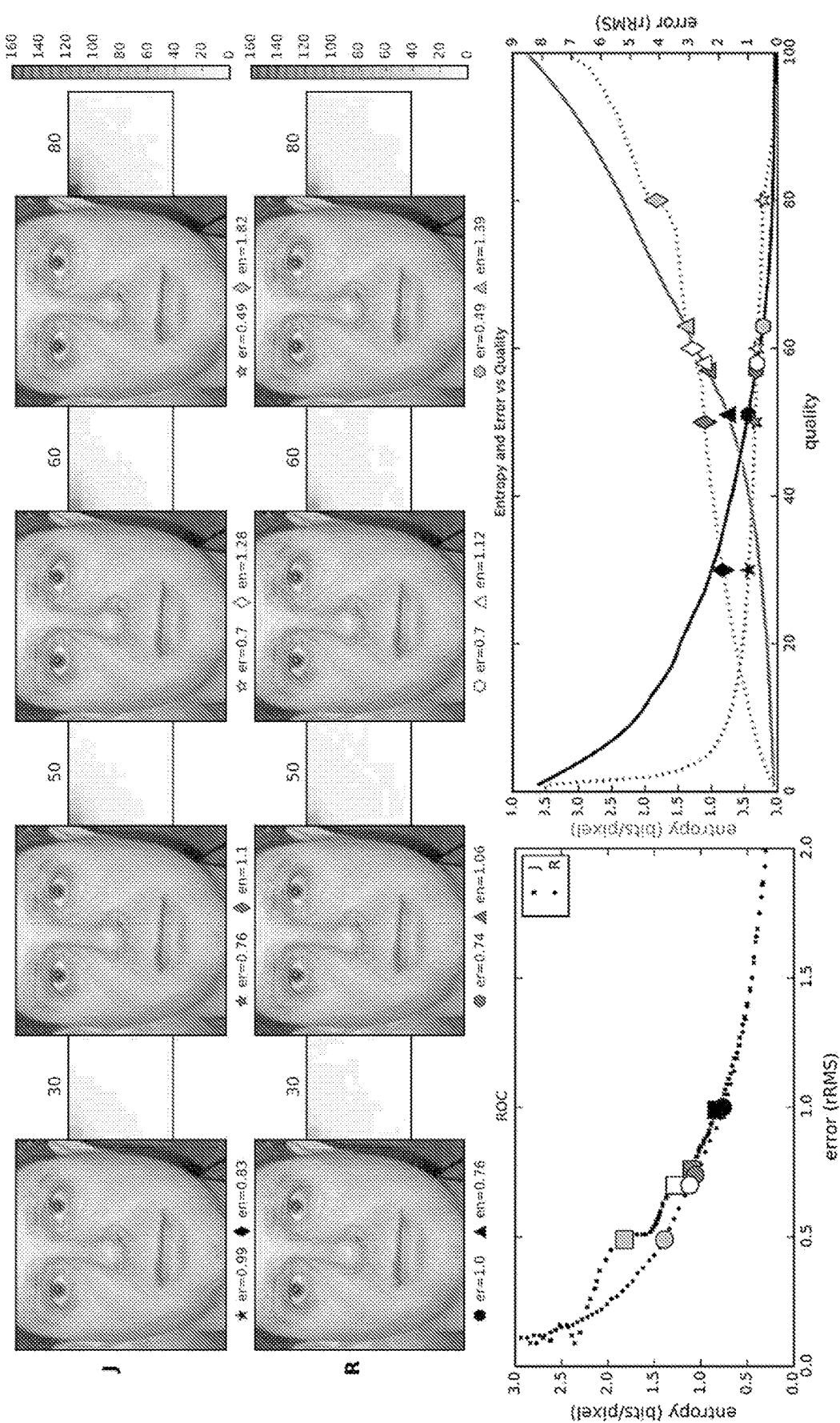
FIG. 26 compares JPEG and RGPEG compression on a sample image.

FIG. 26. Side by side comparison of JPEG (J) and RGPEG (R) compression on a sample Image. (Top) Examples of images (alongside corresponding computed Jacobians) for given values of desired quality (and corresponding Q matrices), at quality levels 30, 50, 60, and 80, for JPEG (J) and RGPEG (R). For each image, the computed error (er) and entropy (en) are given below the image. For comparable error measures, the entropy for RGPEG is consistently lower than for JPEG. (Bottom left) Receiver operating characteristic for entropy-error tradeoff for JPEG (boxes) and RGPEG (circles). At comparable entropy values, RGPEG error values are consistently equivalent or smaller. (Bottom right) Sample measures of entropy (gray) and error (black) for JPEG (dotted) and RGPEG (solid) at distinct quality settings.

Figure 27:
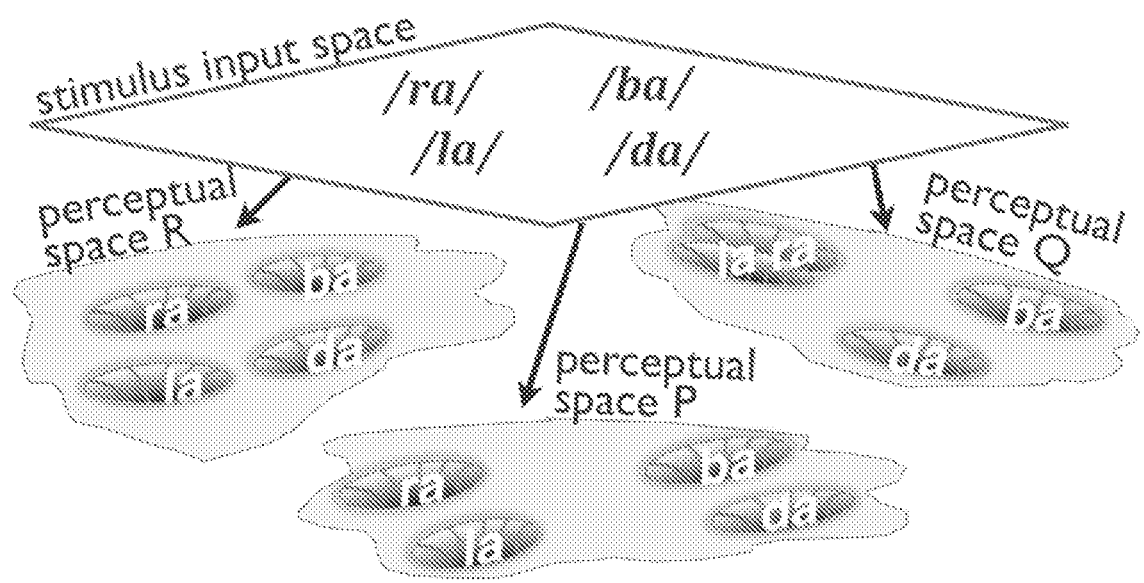
FIG. 27 illustrates transforms from acoustic stimuli to three distinct perceptual reference frames.

FIG. 27. Illustration of transforms from acoustic stimuli to three distinct perceptual reference frames: R, corresponding to a perceiver who hears the sounds as roughly the same as their (Euclidean) acoustic distances; P who hears "ra" and "la" as more similar than "ba" and "da," roughly corresponding to a native English speaker; and Q who hears "ba"

distinct from "da" but does not discriminate between "ra" and "la" sounds, as might occur in native Japanese speakers.

Figure 28:
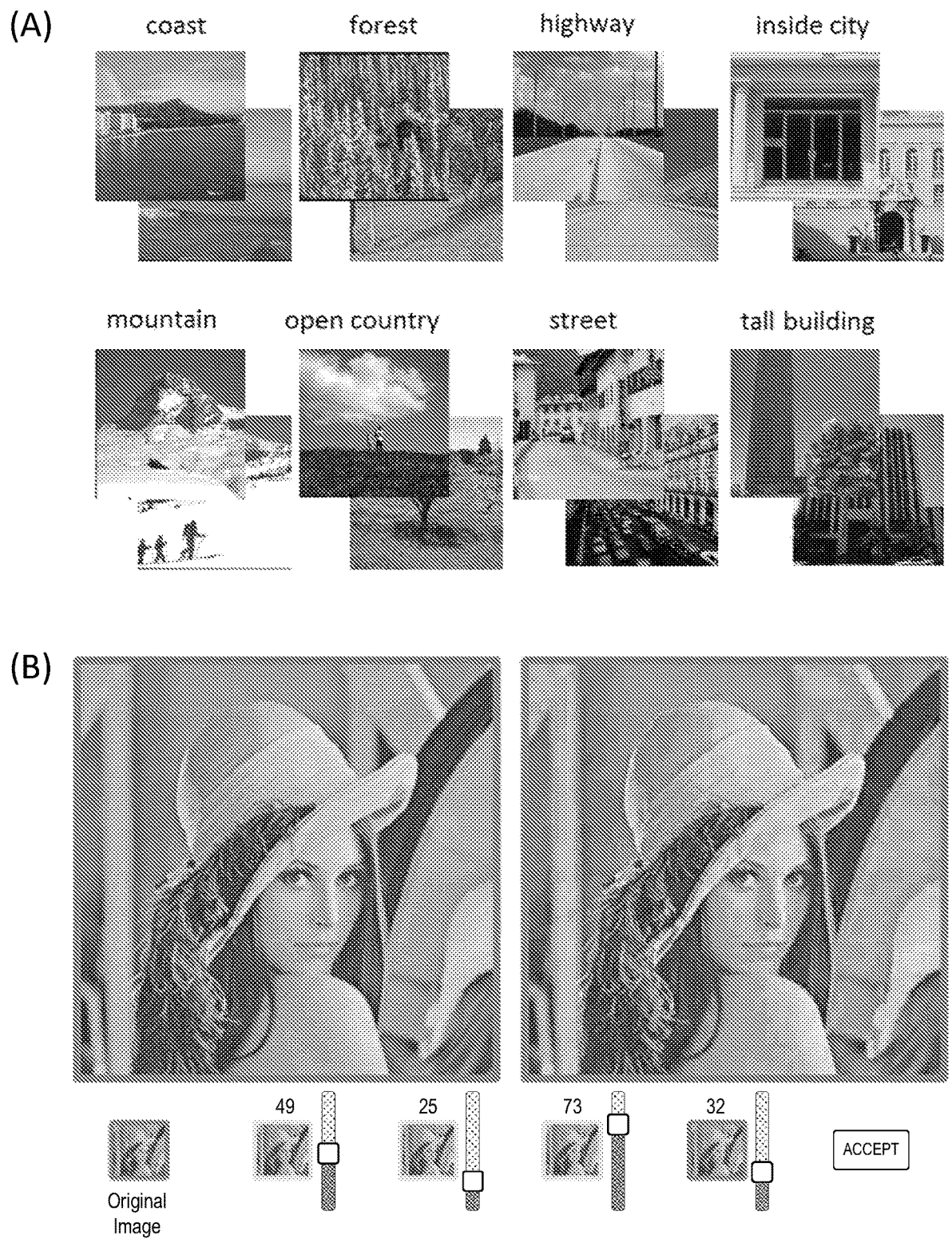
FIG. 28, A-B, shows sample images from a public dataset used to evaluate IQA algorithms.

FIG. 28. (A) Sample images from the dataset. (B) Screenshot of a single (practice) trial. The user has selected the uncompressed image to view on the left and one degraded image to view on the right. This screenshot was also presented in the instructions to participants.

Figure 29:
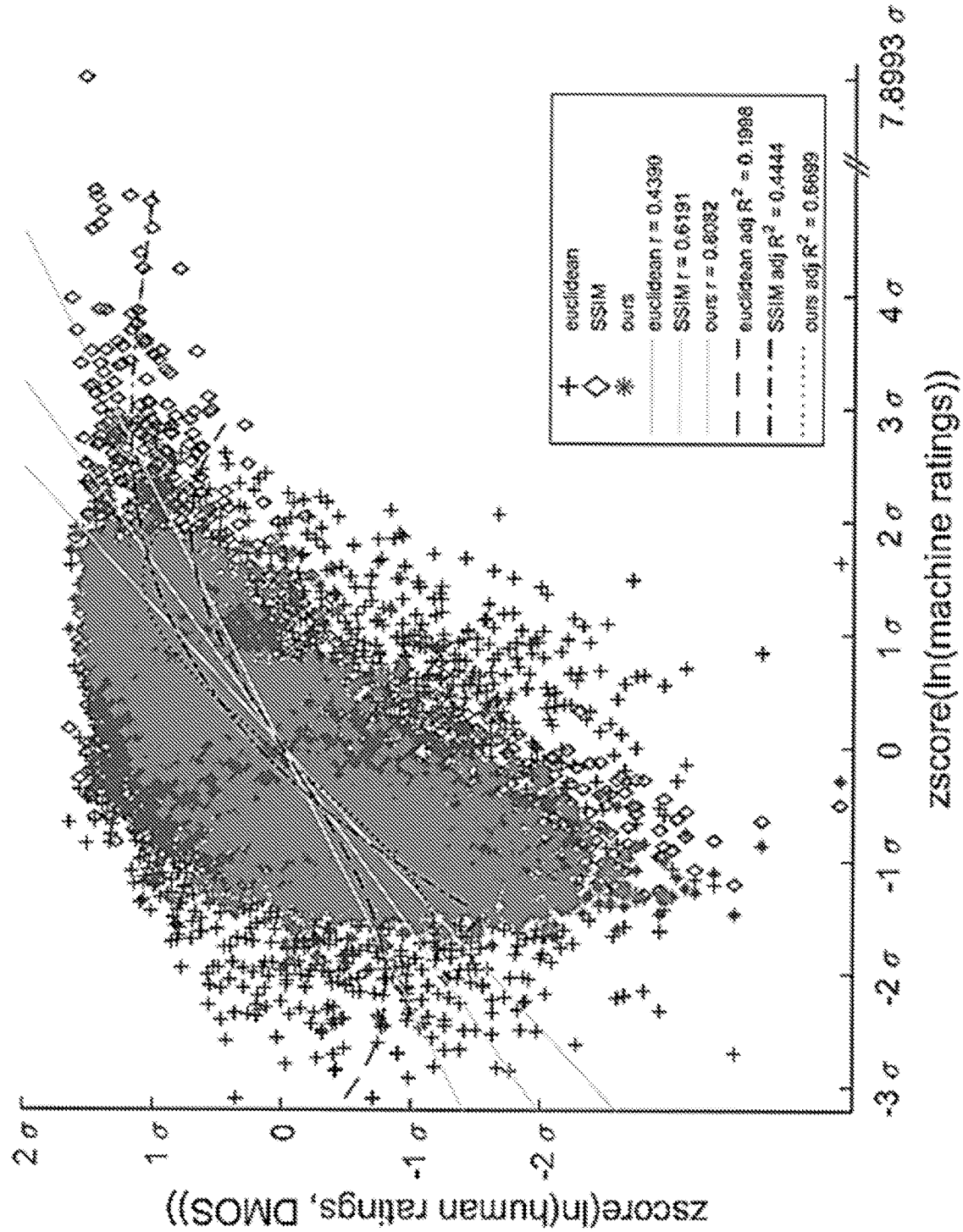
FIG. 29 is an example of a EST-PER graph showing estimated measures against empirical perceptual measures.

FIG. 29. EST-PER results on the full Oliva2001 dataset. Machine ratings are on the X axis, while human DMOS ratings are on the Y axis. Each set of machine ratings was z-scored separately so that they can be more usefully superimposed (in log-log space, Euclidean cubic fit $y=-0.2477x^3-2.312x^2-6.6473x-6.4665$, SSIM cubic fit $y=2.1933x^3-5.7526x^2+4.7339x-1.4524$, our cubic fit $y=-0.0413x^3+0.8636x^2-5.6266x+10.524$).

Figure 30:
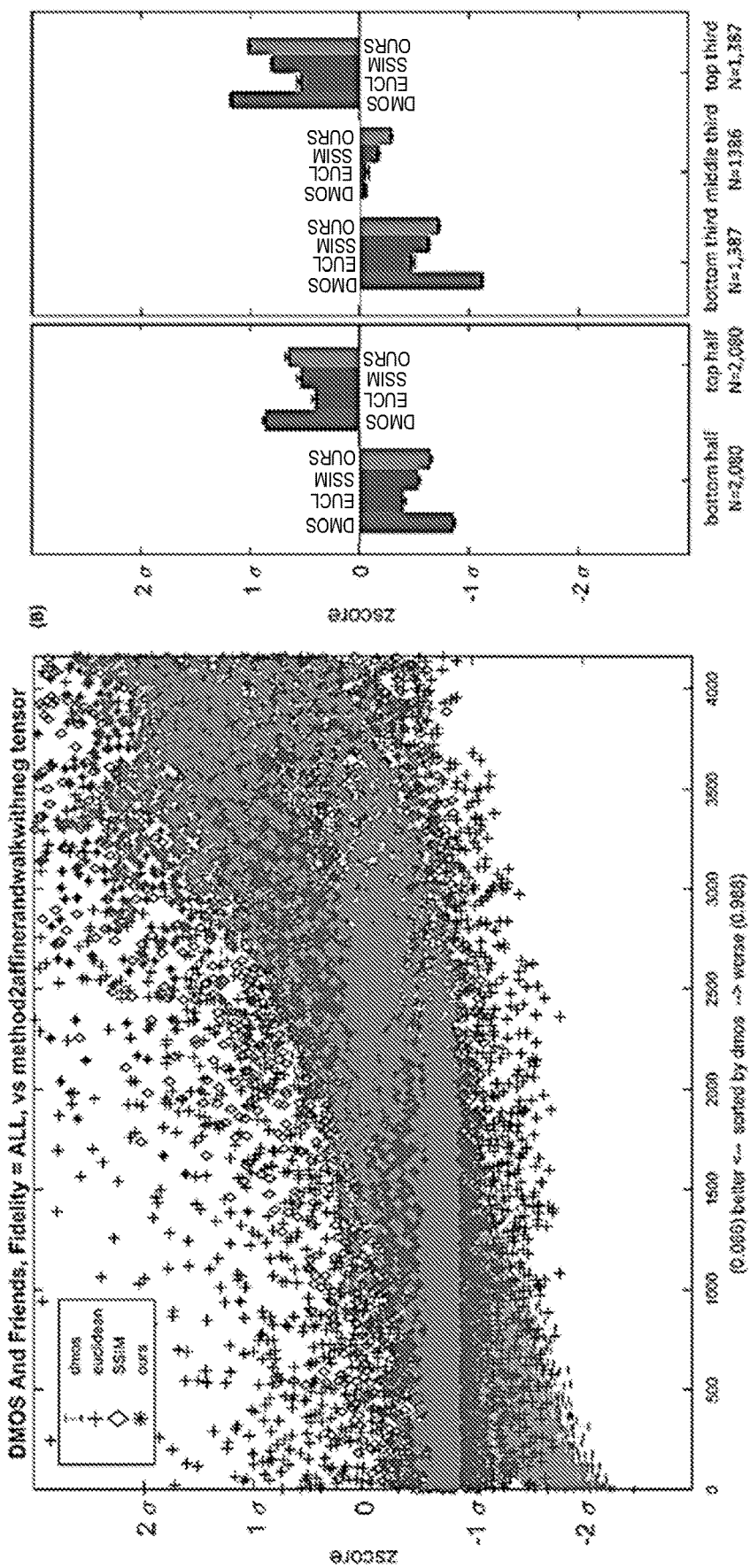
FIG. 30 is an example of a STIM-MEAS graph.

FIG. 30. (A) STIM-MEAS graph. The X axis is a nominal scale, containing individual stimuli (the 4,160 degraded images from the Oliva2001 holdout set, combined across categories and JPEG degradation levels, and ordered in this case by ascending DMOS scores); the Y axis contains (z scores of) both human empirical measures (DMOS) and estimated measures (Euclidean RMS, SSIM, and Riemannian RMS). (B) Measures from the STIM-MEAS graph. Bars represent the mean values (±standard error) based on median (2-way) and 3-way splits. It can be seen that eRMS performs poorly; SSIM performs relatively well in the low-DMOS domain, but less well in the middle and high domains; and rRMS performs most closely to actual DMOS scores in all three ranges.

Figure 31:
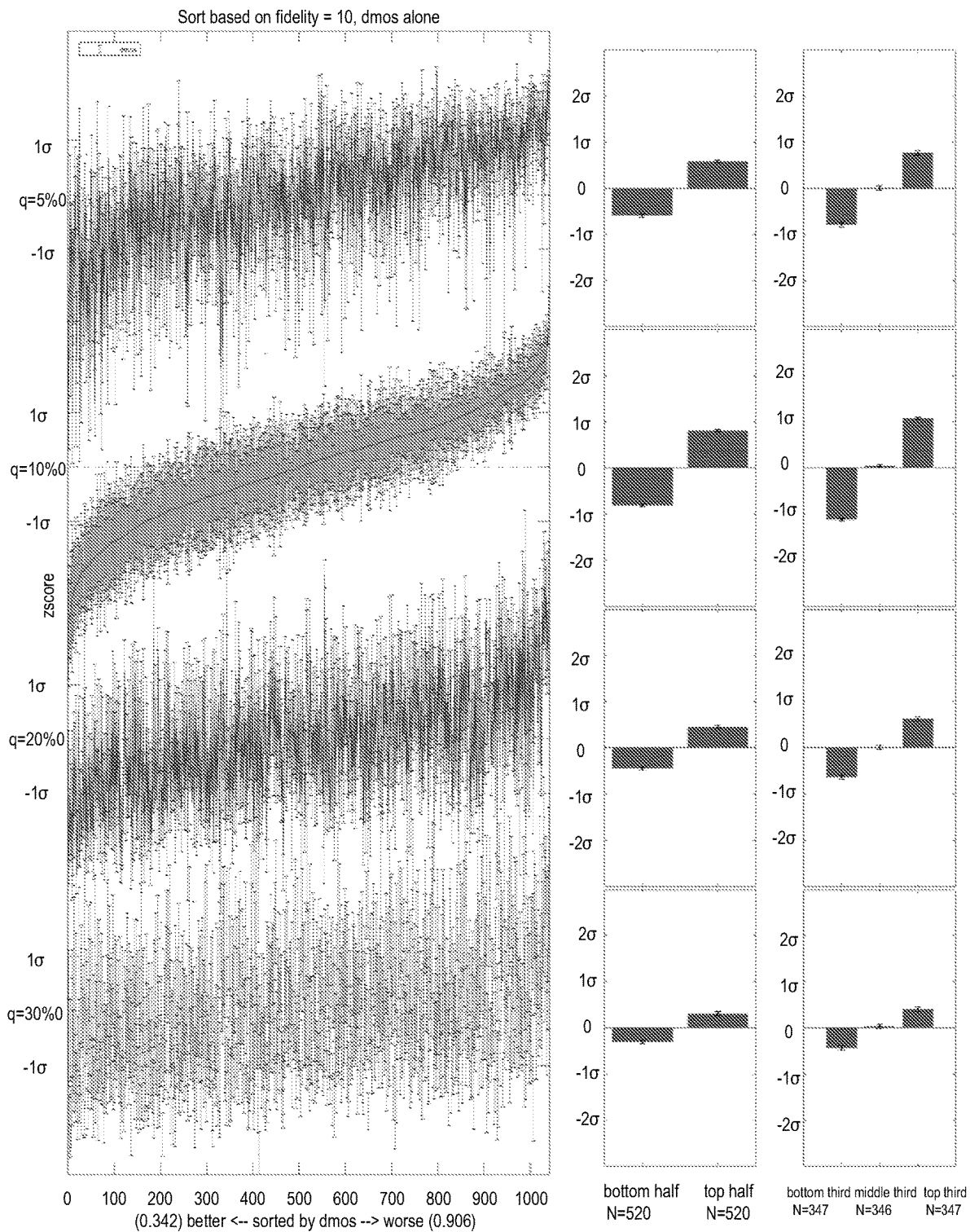
FIG. 31 shows four STIM-MEAS graphs that provide further evidence for intrinsic image-specific degradation susceptibility.

FIG. 31. Further evidence for intrinsic image-specific degradation susceptibility. (A) All images (combined across categories), sorted based on the human DMOS scores of JPEG 10% degradation. A set of four separate graphs, each of which share the same X axis, but each have separately calculated Y axes. Y axis is zscore (DMOS). Shared X axis is position in JPEG-10 sort. Error bars are standard error across subjects. (B) Bar charts represent the mean values (± standard error) based on median (2-way) and 3-way splits. When ordered by the increasing DMOS scores for a given degradation method (JPEG-10 compression), the ordering for other degradation methods (JPEG-5, JPEG-20, JPEG-30) is correlated, suggesting that certain images may be intrinsically more or less susceptible to decreased quality judgments under multiple different forms of degradation. Figures based upon SSIM and our IQA methods, which show a similar profile.

Figure 32:
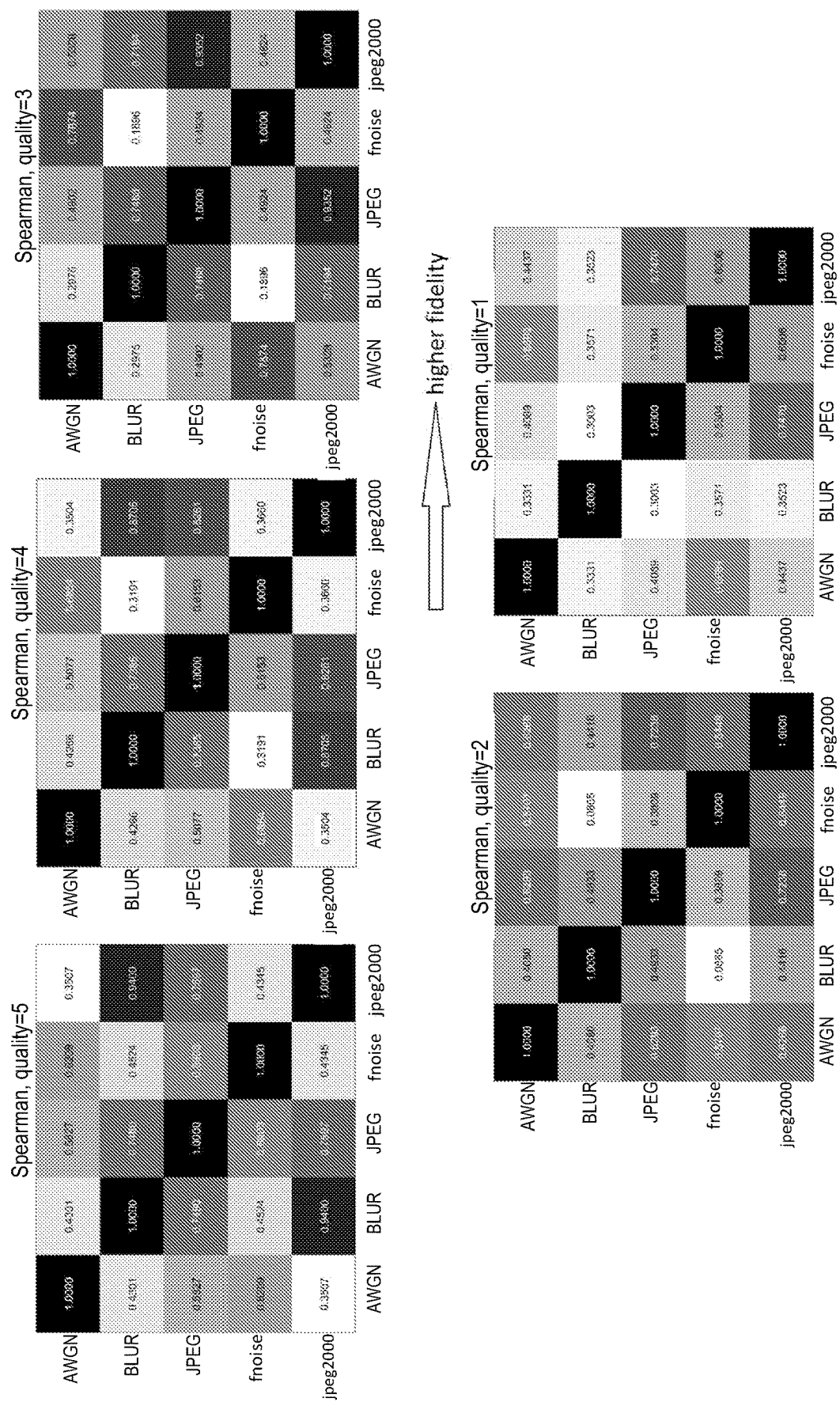
FIG. 32 shows Spearman correlations among the image orders of multiple different pairs of degradation methods.

FIG. 32. Spearman correlations among the image orderings of multiple different pairs of degradation methods, including JPEG, JPEG-2000, addition of noise, and Gaussian blur. Correlations are measured within a quality level, for images degraded the same amount, and thus represent a fundamental quality of image degradation. Quality levels are sorted from most degraded (left) to most like the original (right).

Figure 33:
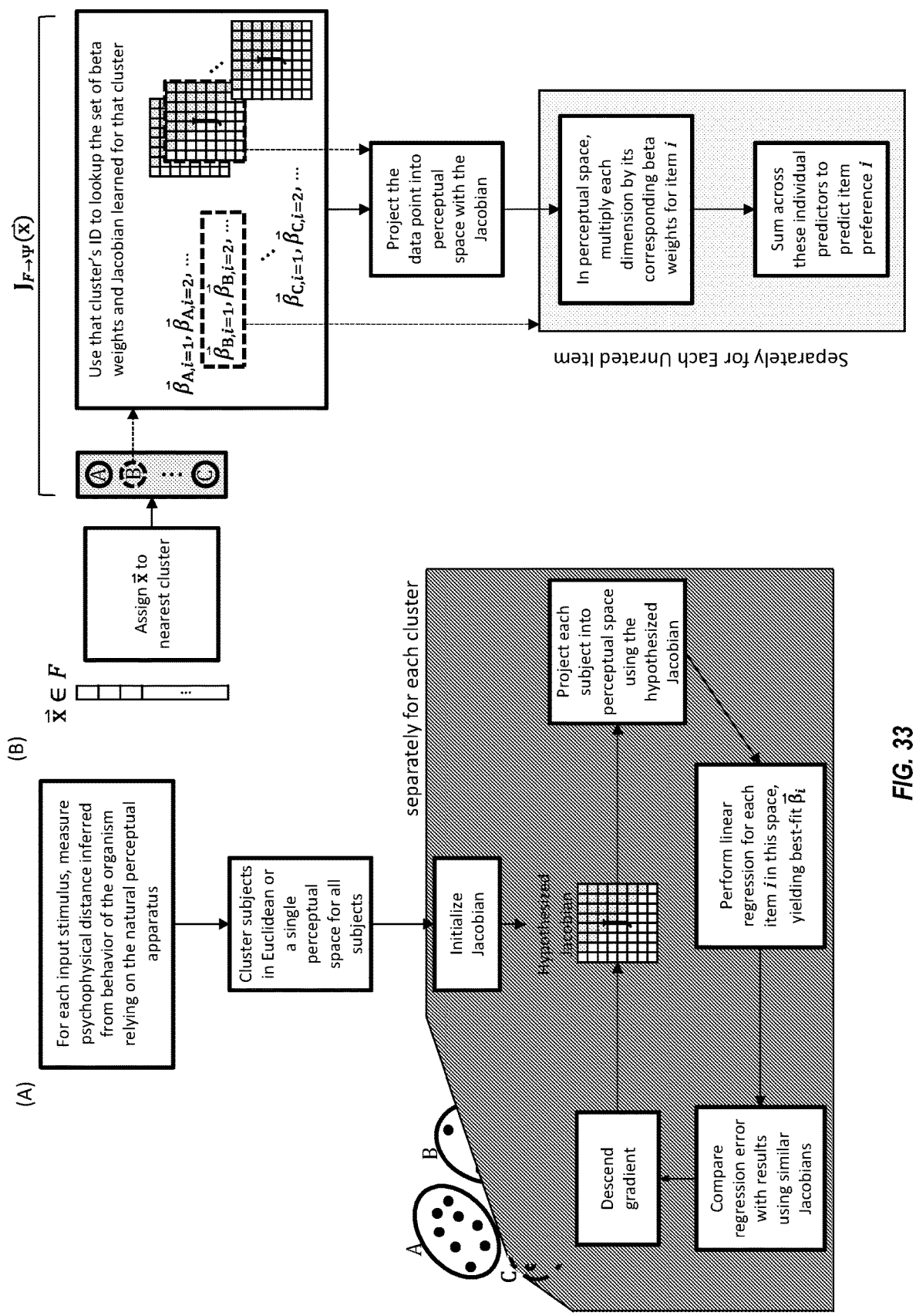
FIG. 33, A-B, shows the architecture of the regression being performed to create a metric tensor for collaborative filtering, in an embodiment.

FIG. 33. Architecture of the regression being performed to create a metric tensor via method IIa for collaborative filtering. (A) Model fitting. Human preferences are clustered in Euclidean space. Separately for each cluster, an initial Jacobian is compared with a randomly modified Jacobian by comparing mean squared error of linear regression models trained in the representational spaces specified by each Jacobian. If the modified Jacobian is superior, it is selected to replace the initial Jacobian and the process recurs. (B) Usage. When evaluating a new subject, their ratings $\vec{t}$ are assigned to their nearest cluster centroid by measuring distance in Euclidean space $d_E(\vec{t}, \vec{\mu}_k)$, then the appropriate Jacobian and regression parameters are retrieved from a table and used in prediction.

Figure 38:
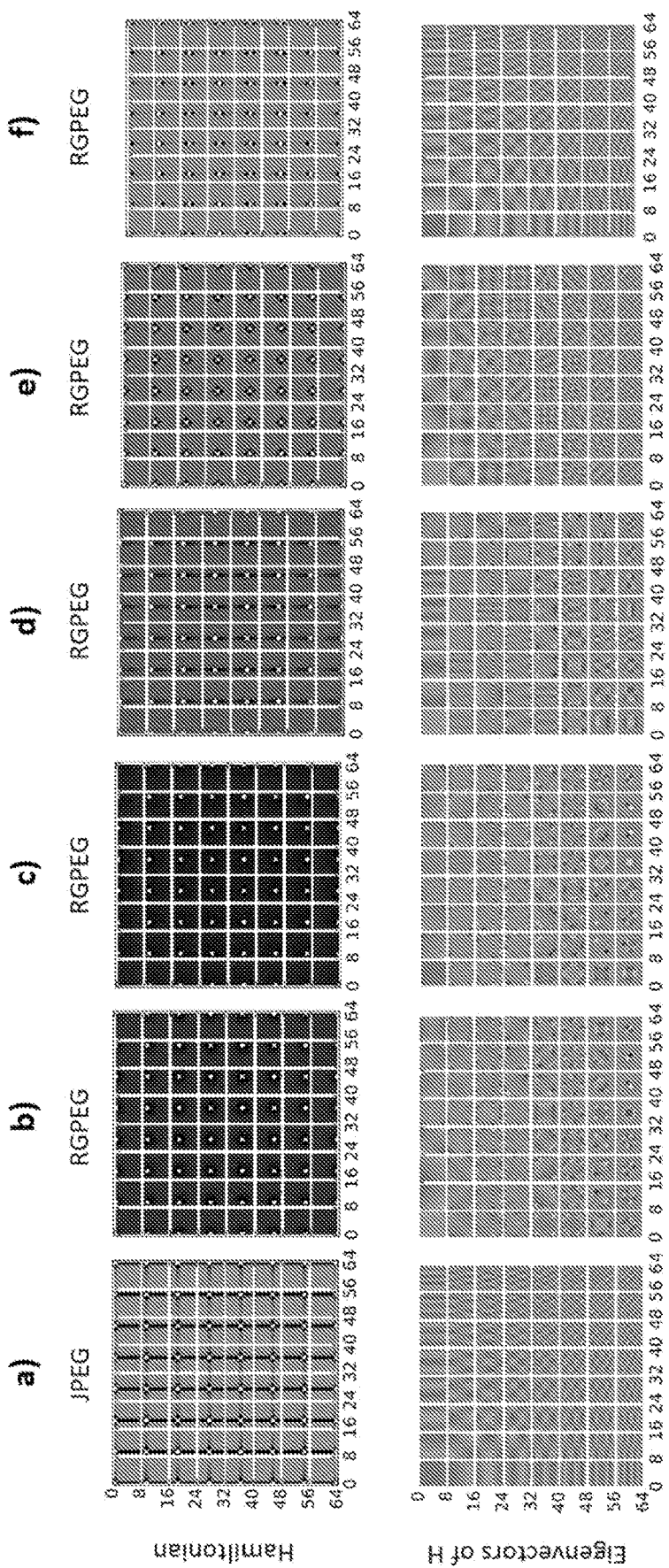
FIG. 38 shows Hamiltonians and corresponding eigenvectors of the Hamiltonians for both JPEG and an example of RGPEG across multiple parameters.
Figure 39:
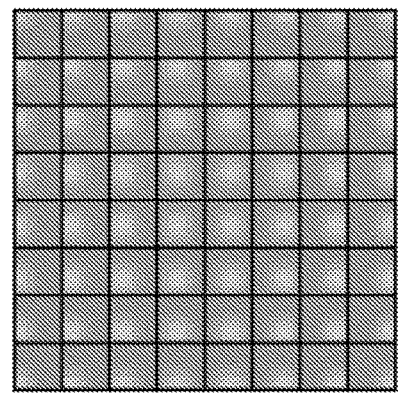
FIGS. 39 and 40 are tables depicting a sample adjacency matrix and a sample Hamiltonian matrix, respectively, with $\Delta x=1,000$ and $\Delta y=1,000$.
Figure 40:
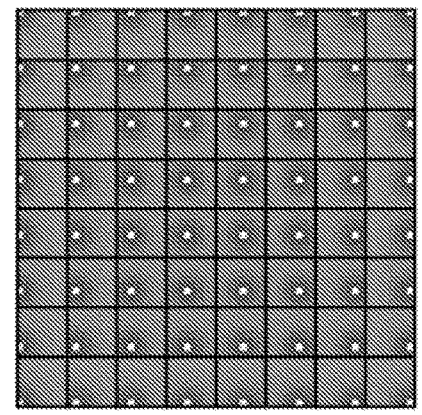
Figure 41:
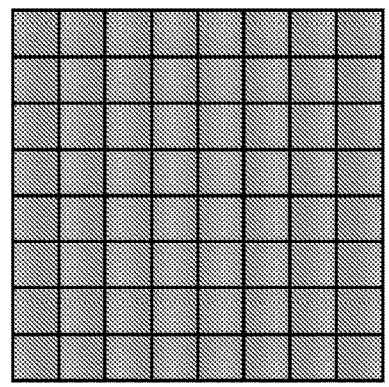
FIGS. 41 and 42 are tables depicting a sample adjacency matrix and a sample Hamiltonian matrix, respectively, with $\Delta x=1,000$ and $\Delta y=100$.
Figure 42:
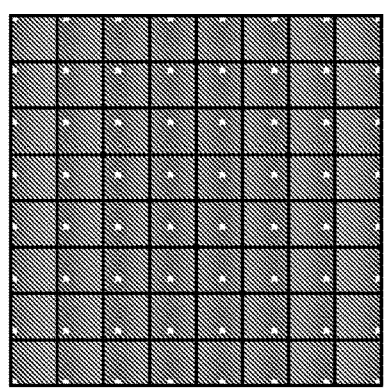
Figure 43:
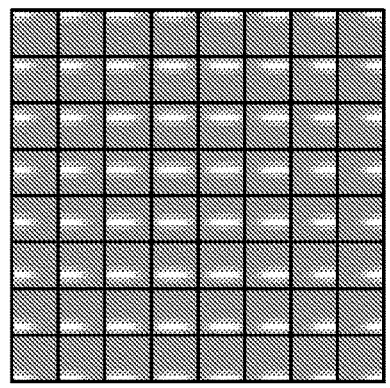
FIGS. 43 and 44 are tables depicting a sample adjacency matrix and a sample Hamiltonian matrix, respectively, with $\Delta x=1{,}000$ and $\Delta y=10{,}000$.
Figure 44:
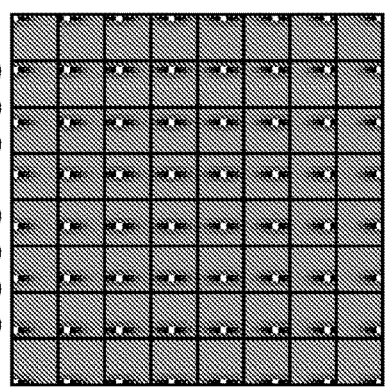

FIG. 38. Hamiltonians and eigenvectors of the Hamiltonians for both JPEG and an example of RGPEG across multiple parameters: (a) JPEG. (b) $\Delta x=1,000$ and $\Delta y=1,000$. (c) $\Delta x=100$ and $\Delta y=100$. (d) $\Delta x=6,290$ and $\Delta y=100$. (e) $\Delta x=50,000$ and $\Delta y=50,000$. (f) $\Delta x=50,000$ and $\Delta y=25,000$. This result is very similar to the special case of JPEG.

1. General Construction and Use of the Jacobian Mappings

The present application offers the following constructive procedures for deriving a mapping of features from their physical input space to a particular perceiver's internal reference space. Said perceiver might be a living subject of study, a natural dynamic system, or a man-made measurement system. This mapping defines how features in the feature space are perceived by a viewer, enabling a formal description of how changes in the physical image are registered as perceptual changes.

Information from the physical stimulus or from the perceiver (or both) enables construction of a Jacobian to map from feature vectors to the perceptual space a perceptual apparatus may use. Such a Jacobian, $J_{F \to \Psi}$, can be obtained directly from synaptic connectivity patterns, either by a priori assumptions or from empirical measurements:

Method Ia: Empirically Defined Synaptic Jacobian

Measure anatomical connections and synaptic strengths, if known; the Jacobian(s) is directly obtained from those data (as in FIG. 1). These measures typically are unavailable, but as will be seen, approximations may be drawn from a set of simple connectivity assumptions. This is illustrated in FIG. 2.

Method Ib: Estimated Synaptic Jacobian

Approximate the connectivity of a perceptual apparatus using aggregate human knowledge. For example, in FIG. 1A we assume a radius of projection fan-out from a cortical region to a target region, based on measures of typical such projections (see FIG. 3).

As long as a perceiver's detailed connectome is known or can be estimated, a predictive metric transform can be straightforwardly computed via methods Ia or Ib. In the (almost ubiquitous) circumstances in which these detailed connection patterns are not fully known, nonetheless the perceptual reference frame of the perceiver can be educed as a function of the relations among features via empirical measures of the perceiver's judgments:

Method IIa: Empirically Defined Psychophysical Jacobian

Measure one or more empirical properties for each input feature or pair of input features. Obtain empirical measures of psychophysical distances. Formulate Jacobian(s) which best represent the relations among input feature properties and psychophysical distances. This is illustrated in FIG. 4.

Method IIb: Estimated Psychophysical Jacobian

Assume a function by which input features are related, based on aggregate human knowledge. For example, if each feature is a pixel of an image, one might reasonably assume a Gaussian function of the distance between pixels of an image. Measure psychophysical distances as in IIa. Estimate the parameters of the assumed function such that measures of distance using the function best match psychophysical results. This is illustrated in FIG. 5.

In order to synthesize a new perceptual apparatus for a given task independently of any existing perceptual apparatus, several methods exist:

Method IIIa: Task-Optimal Jacobian

On any multivariate dataset for which interactions between features may be exploited to improve perception, a method similar to IIa may be applied. Jacobians are constructed which create the best manifold for use by receiving algorithms. This is illustrated in FIG. 8.

Method IIIb: Data-Optimal Jacobian

Using multivariate data without an explicit connectivity, psychophysics, or receiver, Jacobians can be created which best represent the natural curvature of the data. The curved manifold acquired by this method can then be useful for perceptual apparatus. This is illustrated in FIG. 10.

Measurement of Distances with an Acquired Metric Tensor

Jacobians derived by any of the above methods may be used to predict the distance judgements of the perceiver or other similar perceivers on the same or new stimuli. A number of methods and considerations are discussed herein.

If we imagine a simple organism with the radially-extended topographic network of FIG. 1A, we can transform coordinates of stimulus $\vec{x}$ from input to target space by matrix multiplication:

$$\vec{y} = J_{F \to \Psi}(\vec{x}) \cdot \vec{x} \quad (5)$$

Distances can be calculated in the target (perceptual) space by producing a metric tensor $g_{\Psi;F}$ from the Jacobian matrix $J_{F \to \Psi}$, (see Eqn. 4) in which tangents to the curved manifold form covariant (or contravariant) vectors as the basis vectors for a Euclidean embedding space:

$$g_{\Psi;F} = J_{F \to \Psi}(\vec{x})^T J_{F \to \Psi}(\vec{x}) \quad (6)$$

As we will see, the metric tensor $g_{\Psi;F}$ enables us to replace any dot product in the Euclidean space with an inner product in the corresponding non-Euclidean metric space.

The simplest use of this metric tensor is available when a single Jacobian is presumed to be applicable to the new data. In this case, the distance of a new stimulus $\vec{a}$ from the origin is simply $\vec{a}^T g_{\Psi;F} \vec{a}$ and the inner product between two new stimuli is easily defined as:

$$<\vec{a}, \vec{b}> = (\vec{a} - \vec{b})^T g_{\Psi;F} (\vec{a} - \vec{b}) \quad (7)$$

In some settings, it may be more useful to project each data point into the perceptual space via $J_{F \to \Psi} \cdot \vec{a}$ for storage and use at a later time.

In situations where the Jacobian is a variable function of a data point's position, only nearby points can be measured using a single Jacobian. Since a metric tensor and its corresponding manifold are assumed to be smooth, it is up to the engineer to determine the maximum size E of a region in which the tensor has not changed dramatically enough to warrant the use of a new Jacobian. Within said region, distances are defined by a single Jacobian which quantifies a tangent space (visualized in FIG. 15). Between said regions, no single tangent space (and thus no single Jacobian) is a valid approximation of the geodesic (path between two points on the manifold) because $|J_{F \to \Psi}(\vec{a}) - J_{F \to \Psi}(\vec{b})| > \epsilon$, so the geodesic must be approximated using discrete calculus. The extent (size and shape) of these tangent spaces may be defined a number of ways, often as a function of the position in space $\epsilon(\vec{x})$. Methods for algorithmically determining $\epsilon(\vec{x})$ are applied at the time when Jacobians are being constructed using method II, and so will be detailed in section 3.

Armed with said local radius $\epsilon$, distances or geodesics between distant data points can be computed using a number of methods. In some embodiments, the manifold contains gradual deviations from the tangent space and we restrict our geodesics to a limited area of the space. In this case, said geodesic may be approximated by summing the vectors at each tangent space point to obtain the length of the entire geodesic. Several common methods for approximating said geodesic are the method of finite differences, iterative relaxation, stochastic or natural gradient descent, tangent space approximations, phase flow, and concepts from the calculus of variations such as the Euler-Lagrange and Hamiltonian methods.

The usefulness of a tensor constructed via method I or II when compared to Euclidean space is in its ability to predict perceptual responses to new stimuli from a perceptual apparatus, predict the perceptual responses of other similar perceivers, or model the inner workings of a human perceiver's mind or brain. In all methods (I, II, III), this tensor defines an embedding space for data which may be superior in a myriad of computational tasks in fields such as machine learning. However, as with any sampling-based approach, such extensions may prove inaccurate if the input space has been insufficiently sampled.

2. Computation of Perceptual Tensors from Biological Projection Patterns

Computations for Simple Synaptic Projections

In many cases, the connectivity pattern measured (method Ia) or estimated (method Ib) may form a system of linear equations, in which case a single Jacobian (or a product of a single set of Jacobians) can represent the perceptual space of the entire connectivity pattern under all stimuli. In said cases, the Jacobian can be created, often even by hand, simply by recording the individual connections which form cells of the Jacobian.

The described method is also capable of modeling complex neural connectivity containing nonlinearities, feedback, or other complications. For example, in the case of feedback connectivity, contextual information such as physical or social settings may modulate human perception. In said cases, rather than a simple topographic projection from input to target, there may be a series of (perhaps cortico-cortical) transforms (shaped both by development and by adult learning), that include feedback projections (which can be in part based on prior learned information) all of which may affect the overall computation.

To model cases such as this, one Jacobian may not be enough. The Jacobian defined in Eqn. 4 is a function of $\vec{x}$, the received input, which means that different Jacobians can be defined for different parts of the input space. For example, separate Jacobians can be defined for visual stimuli at different scales or for auditory stimuli as a function of the type of background noise. If the input can be first categorized, the Jacobian can be defined relative to an expected top-down signal indicative of the item's category. $J_{F \to \Psi}(\vec{x})$ may be implemented as a lookup table, or as a function of the features present in the input, depending on the type of neural data available. In this case, $\epsilon(\vec{x})$ can be defined as a function of the known or approximated synaptic connectivity.

Synaptic Connectivity Defines Riemannian Perceptual Distances

Brain circuit assemblies may use neurally-generated (sometimes Gaussian) receptive fields to compute transforms with the metric properties we describe here via method I. Any anatomical connection pattern will transform inputs into particular target non-Euclidean metric spaces specified by the connectivity, resulting in correspondingly different distances perceived among the stimuli.

Many portions of the brain's connectome retain vestiges of topographic neighbor relations (i.e., that are neither completely uniform nor non-topographic). A radially-extended topographic connectivity (e.g., FIG. 1) exists in many sensory cortical regions, encoding relations between nearby parts of a visual scene or nearby auditory frequency bands. We posit the principle that these regions are capturing neighbor relations that actually occur within physical stimuli. That is, partially topographic connectivity is specifically well suited to the accurate internal representation of multidimensional topographic stimuli. The fact that sensory cortical systems exhibit partially-topographic, radially-extended connectivity perhaps may be viewed as an evolutionary adaptation to the actual neighbor relations among physical stimulus components (e.g., physical similarity of neighboring frequency bands in acoustic stimuli). The construction of similar perceptual spaces using methods I, II, or III can exhibit similarly useful properties.

An Illustration of the Synaptic Method

To test an illustrative embodiment of method Ib, we produced both auditory and visual stimuli corresponding to the vectors in FIG. 16A. In experiment 1, nine auditory chord-like sounds were constructed (see FIG. 16B) directly from 64-dimensional vectors, each containing exactly four nonzero items, with each dimension corresponding to a specific frequency band (see section 11A). Each of said auditory vectors contained distinct non-overlapping sets of four frequencies with nonzero amplitude. Vectors $\vec{a}_A$ and $\vec{b}_A$ contained nonzero values in nearby dimensions, whereas $\vec{c}_A$ contained its four nonzero values in dimensions that were more distant from those in $\vec{a}_A$ (see FIG. 16B). Thus there were exactly eight differences between each pair of vectors. Between binary vectors $\vec{a}$ and $\vec{b}$, then, the Euclidean distance is given by:

$$d_E(\vec{a}, \vec{b}) = \sqrt{(a_0 - b_0)^2 + (a_1 - b_1)^2 + \cdots + (a_D - b_D)^2} \quad (8)$$
$$= \sqrt{\cdots + (1-0)^2 + (1-0)^2 + \cdots + (0-1)^2 + (0-1)^2 + \cdots}$$
$$= \sqrt{8} \approx 2.83$$

The Euclidean distance between $\vec{a}$ and $\vec{c}$ entails the same calculation, since there still are exactly eight binary differences between these two vectors, i.e., $d_E(\vec{a}, \vec{b}) = d_E(\vec{a}, \vec{c}) = \sqrt{8}$. In both cases, the Hamming distances are 8.

If these vectors were treated as containing independent dimensions, the distances from $\vec{a}$ to $\vec{b}$ and from $\vec{a}$ to $\vec{c}$ would be the same. Instead, frequency bands have natural topographic relations among them (in a physical sense), and our auditory systems reflect this via radially-extended topographies, perceiving the physically "closer" sounds $\vec{a}_A$ and $\vec{b}_A$ as more similar to each other than $\vec{a}_A$ is to $\vec{c}_A$. It is the synaptic projections from input to target brain regions that transform these inputs from physical sounds to perceived sounds; this neural wiring pattern projects any input into a non-Euclidean perceptual metric space, in which "neighboring" components are perceived as more similar than more distal components.

So, a topology can be assumed based on the topographical layout of the features in ascending order of distance from the first to the last feature element, producing the Jacobian $J_{F \to \Psi}$ in FIG. 1D with values for n, n', and n" of 1.0, 0.5, 0.25. We may then compute the metric tensor $g_{F \to \Psi}$ via Eqn. 6 and from it, compute the Riemannian distances between each point $d_R(\vec{a}, \vec{b}) = 3.32$ and $d_R(\vec{a}, \vec{c}) = 3.61$.

In the example, then, moving the sound components to "nearby" dimensions, $\vec{a}$ to $\vec{b}$, results in a smaller perceived distance ($d_R(\vec{a}, \vec{b}) = 3.32$) than moving those components to "farther" dimensions, $\vec{a}$ to $\vec{c}$ ($d_R(\vec{a}, \vec{c}) = 3.61$). Though the Euclidean vector distances among the physical sounds can be identical, such distances do not correctly reflect either their physical or perceptual characteristics, whereas this Riemannian differential geometry treatment does.

3. Computation of Perceptual Tensors from Psycho-Physical Judgments

Computations for Simple Psychophysical Spaces: From Empirical Judgments to Generalized Distances A number of algorithms can be used to formulate the Jacobian using method II. If the difference (e.g., correlation) between perceived distances and those measured with the Jacobians is treated as an error signal, the error space is in the dimensionality of the number of free parameters specifying the Jacobians (e.g., naively $$\frac{D(D+1)}{D}$$

for a single D×D Jacobian) and regression algorithms such as error minimization can be used. This might be embodied in the form of (deterministic, stochastic, normal) gradient descent, random sampling (MCMC, Gibbs, . . . ), Newton's method, or genetic algorithms.

Occasionally, the search for ideal Jacobians may fit the criteria of a convex optimization problem, in which case new tools (linear programming, least squares regression, . . . ) become available. When the problem is not known to be convex, it is recommended that multiple solutions be generated from different starting Jacobians to minimize (and analyze) the effects of non-global error minima. Simulated annealing can improve the performance of optimization algorithms on some data.

If perceived distances between nearly every pair of studied stimuli are available (anS*(S−1)/2×1 pairwise distance matrix P) to accompany the S*(S−1)/2×D matrix X of vectors between pairs of stimuli in their original input space F, a much more efficient solution may be applicable. The problem to be solved can then be defined as:

$$X g_{\Psi;F} X^T = P \quad (9)$$

where all but the D×D matrix $g_{\Psi;F}$ are known. A solution to the polar decomposition (e.g., via singular value decomposition) X=RY must exist, where R is an $$\frac{S*(S-1)}{2} \times D$$

orthogonal projection matrix and Y is a positive-semidefinite D×D symmetric matrix. This yields the new equation:

$$RYg_{\Psi;F}X^T = P \quad (10)$$

which can be rewritten as:

$$g_{\Psi;F}X^T = Y^{-1}R^TP \quad (11)$$

Unfortunately, the decomposition of $X^T$ is not available, so it cannot be ported to the right side of the equation. If X can be decomposed such that the solution is nondegenerate, then the decomposition of $X^T$ will be degenerate. Instead, since via matrix multiplication the right side of this equation can be reduced to a single $$D \times \frac{S*(S-1)}{2}$$

matrix which we will call $Z^T$, the remaining task is to solve:

$$Xg_{\Psi;F} = Z \quad (12)$$

where both X and Z are $$\frac{S*(S-1)}{2} \times D$$

matrices. Eqn. 12 is a (probably overdetermined) system of linear equations which can be solved much more efficiently than Eqn. 9. Note that, if D>S, one should decompose $X^T$ and solve the dual problem. The solution is only guaranteed to be unique if X is of full rank. If X is not of full rank, Y is at risk of being degenerate (see FIG. 6).

Computations Specific to Complex Psychophysical Patterns

As shown in sections 1 and 2, metric tensors can apply different Jacobians at different parts of the input space. If the set of all possible (or likely) stimuli are known to form clusters within the input space F, the dataset can first be separated into subsets based on known or learned (e.g., k-means) clusters. If stimuli from different clusters need never be compared (there are real world scenarios where the comparison between unrelated types of data is undefined), we simply learn a single Jacobian for each subset of the data. When using unsupervised clustering, it may be beneficial first to learn a Jacobian for the entire dataset, then perform clustering in that "rough approximation" of the perceptual space before forming cluster-specific Jacobians.

If the stimuli are not known to form clusters, or one wishes to measure distances between far distant points, a plethora of alternatives exist. In method IIa, a partial set of all possible mappings from the feature space to the perceptual space are given. One way of computing the partial derivatives that make up the Jacobian, is to start with a Euclidean manifold and allow the mapping points to deform that flat manifold into a curvature based on known distances to each point's k nearest neighbors. This would ensure a smooth continuous manifold that interpolates new points. The opposite approach is also possible, where a Jacobian is learned for each miniscule sub-region of the feature space, then discontinuities between Jacobians in nearby regions are smoothed to optimize a balance of specificity and smoothness. These types of approaches may sometimes benefit from explicit regularization, such as the joint optimization of within-sub-region and between-sub-region error. If the Jacobian is parameterized as a parametric function of the input, optimization algorithms for identifying said parameters are plentiful. In the special case where each cell of the Jacobian is treated as a linear function of the input, the projection of a data point into perceptual space using said Jacobian becomes itself a sum of multiple linear equations and can be computed more efficiently if treated in this form. However, the sheer size of the D×D×D dimensional projection matrix may be discouraging, so it may at times be a superior choice to generate Jacobians as a function of a modified stimulus, such as said stimulus projected into principal-component space or into a custom-designed space.

Finally, this step of the procedure can be embodied as an algorithm which simultaneously optimizes cluster assignment or $\varepsilon(\vec{x})$ while optimizing cluster/region-specific Jacobians in an expectation-maximization process. Refer to FIG. 7 for a description of these embodiments and more.

How can the correct $\varepsilon$ be computed? If clustering, $\varepsilon(\vec{x})$ is implicitly the size of $\vec{x}$'s cluster and need never be computed. In all other cases, $\varepsilon(\vec{x})$ is determined by several local cost functions: (1) computational cost of using a smaller E and thus using more Jacobians, discrete steps when walking the geodesic, (2) error in using a larger E and thus applying a single non-specific Jacobian to a large region of the geodesic, and (3) error in defining a Jacobian over a region $\varepsilon$ so small that the Jacobian's definition is subject to sampling error. As can be inferred from these three sources of primary error, a larger dataset and more computational resources will enable a smaller across the board. These errors can be approximated prior to the construction of a tensor, or measured for each region of space as construction commences, enabling methods which adapt to minimize error in the region of $\vec{x}$ as a function of $\varepsilon(\vec{x})$. It may sometimes (but not always) be useful to approximate the slope of the geodesic about a point in order to predict how $\varepsilon$ will change as the geodesic is walked. For this, a Ricci curvature tensor or scalar, which model the deviation of slope of a manifold at a point from Euclidean space, or Laplacian can be useful. A measure of the curvature (second derivative) of the metric tensor within nearby regions may provide more useful information than a Ricci curvature tensor, but is more complex to compute.

It may be beneficial, especially when employing method IIb, to generate multiple metric tensors for a dataset. Using principles of bagging and bootstrapping, multiple metric tensors in various subspaces of F, and/or designed to account for multiple subsets of the data, transforms performed in a combination of metric spaces may together form a more desirable perceptual space than one alone.

An Illustration of the Psychophysical Method

As described in the previous illustration, nine distinct pairs of sounds were generated as in FIG. 16B. Subjects were presented with a "reference sound" $\vec{a}_A$ followed by a first test sound $\vec{b}_A$, then a pause, then the reference sound ($\vec{a}_A$) again, followed by a second test sound $\vec{c}_A$. They were asked which pair of sounds was more different from each other. For comparison, distances were first calculated among the sound pairs via method Ib using the hypothesized topographic projections in FIG. 1, as described in the previous section. Then, using subjects' pairwise rankings, predicted Riemannian distances were computed using method IIb. An ordering for features was obtained from subject responses to all possible pair combinations. The subjects' ordering for the individual feature vectors was then derived from the pair combinations. The ordered set of features were assigned the successive positions on the integer number line from [0,8], the zero position being the baseline feature and the eight position being the feature vector furthest from the baseline feature. Shown below are those distance measures and their ordinal rankings.

reference frame both yield ordinal rankings of the similarities of the images from most similar (identical images $\vec{a}_V$ and $\vec{a}_V$) to least similar (images $\vec{a}_V$ and $\vec{i}_V$). These computed ranks are identical to subjects' empirical rankings, and identical to those of experiment 1 (see Table 1).

TABLE 1

Auditory stimulus experiment findings, comparing Euclidean distance, perceptual distance predicted via assumed connectome (method Ib), perceptual distance predicted via behavioral mapping (method IIb), and subject distance rank, reported as mode across 18 subjects. Correlation between subject distance rankings and calculated distances: $R^2 = 0.96$; see section 11A for detail.

| Sound Pair | $\vec{a}, \vec{a}$ | $\vec{a}, \vec{b}$ | $\vec{a}, \vec{c}$ | $\vec{a}, \vec{d}$ | $\vec{a}, \vec{e}$ | $\vec{a}, \vec{f}$ | $\vec{a}, \vec{g}$ | $\vec{a}, \vec{h}$ | $\vec{a}, \vec{i}$ |
|---|---|---|---|---|---|---|---|---|---|
| Euclidean distance | 0 | 2.83 | 2.83 | 2.83 | 2.83 | 2.83 | 2.83 | 2.83 | 2.83 |
| Perceptual distance (method Ib) | 0.00 | 0.67 | 1.501 | 2.16 | 2.62 | 2.91 | 3.08 | 3.17 | 3.20 |
| Perceptual distance (method IIb) | 0.0 | 1.0 | 2.0 | 3.0 | 4.0 | 5.0 | 6.0 | 7.0 | 8.0 |
| Subjects' reported distance rank | 1 | 2 | 3 | 4 | 5 | 6 | 7 | 8 | 9 |

It can be seen that both method Ib, using presumed (idealized) topographic projections, and method IIb, just using subjects' reported difference rankings, both lead to an ordinal ranking of the sound pairs from most similar (two identical sounds) to most different (sounds $\vec{a}_A$ and $\vec{i}_A$); both ordinalities are identical to subjects' empirical rankings.

In experiment 2, simple visual dot-pattern stimuli were constructed corresponding to the stimuli in FIG. 16C. These stimuli were used to run a pairwise-distance judgment experiment that very closely corresponds to that of the sound experiment described in FIG. 16 and Table 1. As in that experiment, subjects (n=12) were presented with nine distinct pairs of dot pattern images (FIG. 16C), produced so as to directly correspond to the previously-used auditory stimuli (see section 11A). Subjects were presented with a reference image ($\vec{a}_V$), followed by a first test image (e.g., $\vec{b}_V$), then a pause, then the reference image $\vec{a}_V$ again, followed by a second test image $\vec{c}_V$. The first stimulus of each pair was constant throughout the experiment. This first stimulus served as a baseline from which to compare the distances of the other two other stimuli. As before, they were asked which pair of images was more different from each other.

Using exactly the methodology from experiment 1, distances first were calculated among the image pairs first via method Ib using the hypothesized topographic projections in FIG. 1A, then subjects' empirical pairwise rankings were used to generate a separate set of distance measures using method IIb. The experiments were designed such that the first three sets of measures would be identical, with only the empirical measure of subjects' reported distances as a dependent variable. The results were combined to construct a ranking of responses, where the baseline was assigned to position zero and the next stimulus was position one, etc. This ranking yields the subjects' subjective distance between stimuli. Newton's method is now employed to solve for the Jacobian that when turned into a metric tensor using Eqn. 6, yields the same distances for all the features as the subjects' rank ordering.

As was the case for the auditory stimuli, the two methods for computing a metric tensor mapping from the input feature space (dot patterns) to an observer's perceptual 4. Computation of Optimal Perceptual Tensors Computations for Task-Optimal Jacobians In situations where no biological entity is present to emulate, a perceptual apparatus can still be created using method IIIa. When the performance of the downstream operation in perceptual space can be defined or measured, the methods defined herein can create a perceptual mapping from input feature space to a non-Euclidean perceptual metric space on which downstream operations are optimal. Operations described for method II are usually applicable to this task.

Method IIIa is most applicable when certain conditions are met. If the stimuli are of low dimensionality, simpler or more manual methods may be equally applicable. Sometimes in machine learning, stimulus features are hand-chosen to be linearly independent with respect to the perceptual goals. Linear independence does not guarantee nonlinear independence, and thus does not guarantee that the features are independent at all positions in the feature space. Therefore, under conditions of linearly independent features, the method presented here may still be valuable. However, when features are truly nearly independent with respect to the perceptual goal, the correct perceptual space may be a Euclidean one. Finally, the computational complexity of the specific implementation may limit the maximum number of feature dimensions for which a metric tensor can be learned in reasonable time.

Unsupervised Learning of Metric Spaces

The methods so far presented construct mappings from perceptual space when (1) detailed synaptic projection patterns are known (methods Ia and Ib), (2) those anatomical details are lacking but behavioral perceptual distance judgments of known stimuli are available (methods IIa and IIb), or (3) mappings from inputs to perception contain a well-defined goal state (method IIIa). Lacking these anatomical or behavioral measures, transforms can nonetheless be computed via method IIIb based solely on the unsupervised structure of the data.

In natural perceptual apparatus such as exist in the human brain, every synaptic "learning rule" corresponds to a mechanism by which existing metric transforms are modified in response to stimuli. For instance, unsupervised learning rules can readily educe statistical cluster structure in data. Presented with distributions of objects, learners form prototypes. No external measures determine "correct" categorizations of the stimuli; typically, categorizations can be judged on the basis of their utility for inference, or on the basis of mathematical measures such as within-category vs. between-category distance.

A particularly challenging task of this kind is the unsupervised acquisition during development of the sounds comprising unsegmented speech in one's native language.

Intuitively, a corpus of data (such as speech sounds) will have sparser and denser regions within it. The density can be thought of as "gravitationally" distorting regions in a perceptual reference frame such that, in a neighborhood that is densely populated with observed data (e.g., "baa" sounds), then neighboring data will be perceived as even more similar to each other than they would be in a Euclidean reference frame.

FIG. 27 schematically illustrates hypothesized non-Euclidean metric transforms of two listeners, P and Q, corresponding to the distinctions made by native English and native Japanese speakers, respectively, along with a third hypothetical listener R who perceives the sounds roughly according to the sounds' physical distances. Each listener's perceptual apparatus transforms physical acoustic stimuli to internal Riemannian manifolds. Said manifolds each produce a set of distances among stimuli relative solely to that specific perceiver's reference frame. These individual metric transforms may constitute an explanatory account of some observed group differences and individual perceptual differences.

Nature provides existence proofs that unsupervised learning of metric spaces is both possible and useful. However, it does not specify the only possible invention, nor possibly the optimal one, for learning said metrics. In response to a given set of data, different rules may cause different changes to the Jacobian, and any specific learning rule may discover different structure depending on the data it experiences. In FIG. 9, we describe one particular architecture and learning rule, by which a ratio of conditional correlations indicates whether two regions of a high-dimensional nearly-Euclidean embedding space have similar curvature. Once curvature similarity has been established by approaches such as this, regions of similar curvature can be grouped, or a lower-dimensional embedding of the axes in embedding space can be formed. Benefits of this approach may be profound—unsupervised learning of similarity is thought to be a crucial advantage of brains over contemporary computer algorithms for perception. FIG. 10 describes three methods for utilizing unsupervisedly learned metric tensors.

In addition to perceptual phenomena, the method can in principle be applied to more complex abstract stimuli. Metrically-varied stimuli such as faces consisting of different features, or other abstract conceptual metric data, may be initially coded by early brain regions, and successively re-coded by downstream regions, each producing successive transforms of the stimuli into increasingly complex perceived (and learned) relations among complex inputs. We suggest that the method constitutes a general approach, applicable to a broad range of empirical behavioral data on decisions, on category boundaries, and on similarity judgments.

5. Hardware Implementation— Autonomous Modules

Computations on data in memory is ordinarily performed by standard processor cores that read the memory, operate upon it, and then write the result back to memory. These processor cores have instruction pointers and operations that hold the purpose to modify data in the context of an input value must go through this process of reading, modifying, and writing the data back to memory. Although caches are used to increase memory throughput and reduce latency, the principle remains that modification of data is kept under software control with local centralization. This process is inefficient when a performance bottleneck occurs wherein the processor can only update one value at a time and all of the data must be routed through the memory access port of the processor core. GPUs (and SIMD CPUs) operate on multiple data simultaneously however the memory that is operated on by GPUs must generally be adjacent in memory before operations can be performed on the data in parallel. Gather and Scatter algorithms are known to reduce performance on GPUs and standard processors relative to operations that can be processed in parallel once the data is organized in memory to be adjacent and in order.

Autonomous Modules (AM), in contrast, allow memory banks to be updated independent of processor core operation. A memory value may be updated in the context of an input by sending the input to an AM's autonomous memory operator (AMO). The autonomous memory operator may then fetch the relevant data from the memory bank, update it in the context of the input value, and send the result back to the memory bank. In addition, it may perform an update to other data held in the memory in response to the result of the calculation. In spiking neural networks, identifiers of synapses receiving input may be sent directly to the autonomous memory module and the resulting impact on the behavior of a given Autonomous Module's simulated neurons may be updated by the AMO without interaction with the multithreaded processor core (MPC). If the MPC's operations were required to perform the update, then the number of synapses receiving input that can be processed per second would be decreased due to the overhead of involving the multithreaded processor core. In other words, by allowing neuron contexts to update in parallel without involvement of the multithreaded processor core, many more updates (i.e., synapses receiving input) can be processed given the same amount of silicon resources, power and time. This applies to simulations above and below the abstraction level of neurons as well.

Autonomous modules implemented on FPGA can be programmed to carry out myriad different tasks and, unlike GPUs, perform well even when data is not already ordered in memory. For example, an Autonomous Memory Operator may implement a sorting algorithm as a precursor to determining the most active neurons in a patch; an operation commonly called K-winner-take-all. Autonomous modules are not limited to perform well only on tasks that GPUs do poorly on, they are flexible enough to also perform many GPU tasks well, such as vector-matrix multiplication. They perform especially well implementing receptive fields (RFs) wherein the RFs and a tensor are stored across the memory banks.

When an autonomous memory operator need access to data stored in other memory banks to which there is no direct connection, the data may be shifted between memory banks using memory queue units (MQUs). In this way, each autonomous memory will have access to a given subset of feature vectors or a given piece of a tensor data structure during a time window. Because the data can be shifted between the autonomous memories using local queues without arbitrary data routing, the resources required to perform the data transfers between modules is reduced while still meeting the need of allowing each autonomous memory a window of time in which it may access data that is initially stored non-locally. These data transfers can be performed in parallel without ongoing interaction of the multithreaded processor core or the network-on-chip.

Depending on the types of updates the autonomous modules typically perform, the interface of the network-on-chip to the autonomous memory operators may be optimized to allow data to flow into the autonomous memory operator from the network-on-chip, but not vice versa. This may save resources in the implementation of the autonomous memory operator and the network-on-chip, resulting in lower power and smaller silicon for a given level of algorithmic performance.

It is expressly contemplated that the processing structures/modules described above and referenced herein can be part of a specialized computing architecture and/or a general purpose computer of appropriate processing speed, memory capacity, number of core(s), etc. Such computing environment can include various network interconnections implementing appropriate protocols, such as TCI/IP, and can allow for user interaction through appropriate interface devices (e.g., keyboard, mouse, touchscreen).

6. Computational Complexity Cost

Two types of computational cost are often measured: time costs and space costs (equivalently referred to as time complexity and space complexity). Time cost describes the number of computational steps that must be computed in sequence. Space cost defines the quantity of storage required during compression computation. Calculations of these costs must be made for a specific embodiment, typically rendering cost as some function of the amount of data to be processed.

All method II approaches discussed herein are highly parallelizable, and all of them take days to run, so they are prime targets for parallelization across a cluster. Additionally, it can be shown that learning a non-uniform tensor using any of the above approaches is much faster (practically and in terms of formal complexity) than learning a single Jacobian on the same data. When the heat equation is an applicable error minimization objective, it can improve performance. Finally, the polar decomposition trick can yield results in a fraction of the time when it can be used.

While all algorithms suggested as implementations of methods Ia, Ib, IIa, IIb, IIIa, and IIIb can be embodied in the software of a (parallel) von Neumann architecture, computational efficiency can be greatly improved by embodying these approaches in the hardware described herein.

7. Riemannian Geometric Method for Lossy Image Compression (RGPEG)

Derivation of Riemannian Geometric JPEG (RGPEG)

JPEG modifies the image feature vector, introducing error (the distance between the original and modified vector) such that the modified vector has lower entropy, and thus can be stored with a smaller description. Correspondingly, embodiments described herein will also modify the feature vector, introducing error in order to lower entropy, but in this case using graph-based operations on non-Euclidean dimension distances (see Eqn. 14). We introduce the Riemannian geometric perceptual encoding graph (RGPEG) method.

JPEG uses a (hand-constructed) quantization matrix Q that specifies the amount by which each of the 64 DCT dimensions will be perturbed, such that when they are subjected to integer rounding, said quantization will exhibit lower entropy. We replace the JPEG quantization operations with a principled formula that computes perturbations of basis dimensions to achieve a desired entropy reduction and commensurate error—but said perturbations are performed in perceptual space rather than in feature space. Specifically, the surrogate quantization step moves the image in perceptual space along the gradient of the eigenvectors of the Hamiltonian of the basis space. We show that the resulting computation can outperform JPEG operations (or any operations that take place in feature space rather than in perceptual space).

A Multi-Tiered Metric Space

In the present section we proceed with method IIb, i.e., measuring (Euclidean) physical distances among pairs of inputs and positing a range of candidate factors by which the physical disparity among features may give rise to perceived feature interactions. We show a series of resulting findings corresponding to this range of different hypothesized factors (see section 11B).

Features $f_i \in F$ of a JPEG/RGPEG image are pixel values. We wish to estimate a psychophysical Jacobian which projects to perceptual space while accounting for the pairwise physical distances between pixels, as we have formed a perceptual hypothesis in terms of these pixel-pixel distances. Therefore, we define a new intermediate "physical" space, $\Phi$, and a Jacobian $J_{F\to\Phi}$ which accounts for the physical distance between pixels. Having obtained a second Jacobian $J_{\Phi\to\Psi}$ mapping physical space to perceptual by any of methods Ia, Ib, IIa, or IIb (in this case method IIb; see section 11B and FIG. 11 for details), we compute metric tensor $g_{\Psi;\Phi}$ as in Eqn. 6. Alternately, this tensor may be obtained using the covariance matrix $\Sigma$ from psychophysical experimental data: $g_{\Psi;\Phi} = \Sigma_{\Psi\Phi}^{-1}$. We may combine the projection $J_{F\to\Phi}$ from feature to physical space and metric $g_{\Psi;\Phi}$ which provides perceptual distance measures as a function of physical space, obtaining a new metric $g_{\Psi;F}$ that measures distances in the perceptual space with respect to the image's original feature space:

$$g_{\Psi;F} = J_{F\to\Phi}^T \cdot g_{\Psi;\Phi} \cdot J_{F\to\Phi} \tag{13}$$

This new metric in the feature space now computes the Riemannian distances among dimensions in the feature space. Said metric can be used to compute the matrix of all distances among all pairs of features $x_i$, $x_j$ in a vector $\vec{x}$ of dimensionality k, under an assumption that perceptual distances are a multivariate Gaussian function of $g_{\Psi;F}$:

$$dist(x_i, x_j) = \frac{1}{\sqrt{(2\pi)^k |g_{\Psi;F}|}} \exp\left(-\frac{1}{2}(x_i - x_j)^T g_{\Psi;F}(x_i - x_j)\right) \tag{14}$$

where $|g_{\Psi;F}|$ is the determinant of $g_{\Psi;F}$. The dimensions of a feature vector in (Euclidean) space F are orthogonal, but the dimensions of the corresponding vector in (Riemannian) perceptual space $\Psi$ are not orthogonal; rather, the pairwise distances among the dimensions are described by Eqn. 14. Sample distance matrices for selected specific measured visual parameters are shown in section 11B.

Derivation of Entropy Constraint Equation

A graph is defined whose nodes are the 64 basis dimensions of the feature space. For the special case of JPEG, said basis is the set of 64 2D discrete cosine transform coefficients. Refer to section 11B for a derivation of the generalization of said basis for perceptual space, showing the DCT to be a special case.

Activation patterns in said graph can be thought of as the state of the space, and operations on said graph are state transitions. $\Omega(x, s)$ is defined as the state describing the intensity of each of the pixels in the (8×8) image, such that $\Omega(x, \emptyset)$ is the original image, and any $\Omega(x, s)$ for alternate s values is an altered image, including the possible compressed versions of the image. Said s values are defined to be in units of bits×length; corresponding to the number of bits required to store a given image, and thus commensurate with entropy. Changes to the image with respect to entropy are expressed as:

$$\frac{\partial \Omega(x, s)}{\partial s} \quad (15)$$

We wish to know how to change the image such that the entropy will be reduced. The problem of such image alterations can be treated in terms of the heat equation. The second derivative of the image state with respect to distance can be equated with the derivative of the image with respect to entropy:

$$\frac{\partial \Omega(x, s)}{\partial s} = \frac{\partial^2 \Omega(x, s)}{\partial x^2} \quad (16)$$

Eqn. 16 shall be termed herein the entropy constraint equation. A desirable solution to the encoding problem is to identify a $\Omega(x, s)$ that satisfies this equation, such that modifications of an image can be generated to achieve a new image exhibiting a reduced entropy (and minimal corresponding increase in error).

Assume that a separation of variables exists of the form:

$$\Omega(x,s)=\omega(x)\phi(s) \quad (17)$$

where said function $\omega(x)$ is only in terms of position information x and said function $\phi(s)$ only in terms of entropy s. Under this assumption, the former connotes the "position" portion of the solution, i.e., values of image pixels regardless of entropy values, whereas $\phi(s)$ is the entropy portion of the solution.

Two ordinary differential equations can be formulated corresponding to the two sides of the partial differential equation in Eqn. 16:

$$\frac{\partial \Omega(x, s)}{\partial s} = \omega(x)\frac{d\phi(s)}{ds} \text{ and } \frac{\partial^2 \Omega(x, s)}{\partial x^2} = \frac{d^2\omega(x)}{dx^2}\phi(s) \quad (18)$$

which both equal the same value and can thus be equated:

$$\omega(x)\frac{d\phi(s)}{ds} = \frac{d^2\omega(x)}{dx^2}\phi(s) \quad (19)$$

which can be simplified (divide both sides by $\psi(x)\phi(s)$):

$$\frac{1}{\phi(s)}\frac{d\phi(s)}{ds} = \frac{1}{\omega(x)}\frac{d^2\omega(x)}{dx^2} \quad (20)$$

Since the two functions are equal, they are equal to some quantity (which cannot be a function of x or s, since the equality would then not consistently hold). We call that quantity $\lambda$. There can be a distinct $\lambda$ value, labeled $\lambda_k$, for each candidate solution k. For any said solution k, the entropy term is:

$$\frac{d\phi(s)}{ds} = \phi_k(s)\lambda_k \quad (21)$$

whose solution is:

$$\phi_k(s)=e^{\lambda_k s} \quad (22)$$

As mentioned, there will be k solutions for each value of $\lambda_k$. For the position term:

$$\frac{d^2\omega(x)}{dx^2} = \omega_k(x)\lambda_k \quad (23)$$

the solution is in the form of the Fourier decomposition:

$$\omega_k(x) = \sum_i c_i \vec{\gamma}_i(x) \quad (24)$$

where the $\vec{\gamma}_i$ terms are the eigenvectors of the Laplacian of the position term, Eqn. 23, and where the $c_i$ terms correspond to the coefficients of the eigenvector basis of the initial condition of the state $\Omega(x, s)$ corresponding to the initial image itself, $\Omega(x, \emptyset)$. (Precise formulation of the $c_i$ is shown in the next section). The 64 solutions of the Fourier decomposition form the basis space into which the image will be projected. (For JPEG, this is the discrete cosine transform or DCT set, as mentioned; we will see that this corresponds to one special case of the solution, for a specific set of values of the entropy constraint equation.)

Application of Entropy Constraint Equation to Image Feature Space

Consider the graph (see FIG. 25A) whose nodes are dimensions of feature space F and whose edges are the pairwise Riemannian distances between those dimensions as defined by the distance matrix of Eqn. 14. The distances computed via Eqn. 14 can be used to populate the adjacency matrix A of the graph; $A_{ij}=\text{dist}(x_i, x_j) \forall i,j$ (see FIG. 25A). The degree matrix D is computed via:

$$D_{ii} = \sum_{j=1}^{n} A_{ij} \quad (25)$$

for A with row indices i=1, ..., m and column indices j=1, ..., n. The graph Laplacian is:

$$L_g = D - A \quad (26)$$

and the normalized graph Laplacian is then:

$$L = D^{1/2} L_g D^{1/2} \quad (27)$$

The total energy of the system can be expressed in terms of the Hamiltonian $\hat{H}$, taking the form $\hat{H}=L+P$ where L is the Laplacian and P corresponds to potential energy. P is neglected as a constant in the present example; the Hamiltonian is thus equivalent for this purpose to the Laplacian:

$$\hat{H} = \frac{\partial^2 \Omega(x, s)}{\partial x^2} \quad (28)$$

Intuitively, the Hamiltonian expresses the tradeoffs among different possible states of the system. Applied to images, the Hamiltonian can be measured for its errors (distance from the original) on one hand, and its entropy or compactness on the other: a more compact state (lower entropy) will be less exact (higher error), and vice versa.

The aim is to identify an operator that begins with a point in feature space (an image) and moves it to another point such that the changes in error and entropy can be directly measured not in feature space but in perceptual space (see FIG. 24). Thus the desired instantiation of said operator will move the image from its initial state (with zero error since it is the original image, and an initial entropy value corresponding to the information in the original image) to a new state with a new tradeoff between the now-increased error and corresponding entropy decrease.

The Hamiltonian enables formulation of such an operator. The eigenvectors of the Hamiltonian (see FIG. 25C) constitute a candidate basis set for the image vector (see FIG. 25D), and since $\hat{H}\Omega=\lambda\Omega$, the eigenvalues $\lambda$ of the Hamiltonian can provide an operator $\hat{U}(s)$ corresponding to any given desired entropy s. As we will see, the $\vec{\phi}_k(s)$ function is the desired update operator, moving the point corresponding to the state (the image) to a higher-error location in perceptual space to achieve the decreased entropy level corresponding to s.

The separated components of the state Eqn. 17 $\Omega(x, s)=\omega(x)\phi(s)$ form the position solution and entropy solution to the equation, respectively. Said position portion, $\omega_k(x)$, was shown in Eqn. 24 to be $\omega_k(x)=\sum_i c_i \vec{\gamma}_i(x)$ and said entropy portion, $\vec{\phi}_k(s)$, was shown in Eqn. 22 to be $\vec{\phi}_k(s)=e^{\lambda_k s}$. The former expresses the set of positional configurations for each given solution and the latter provides the foundation for the update operator for states k, to achieve entropy level s, where the $\lambda$ values correspond to the eigenvalues of the Hamiltonian. Combining the terms, we obtain:

$$\Omega(x, s) = \omega_k(x)\vec{\phi}_k(s) = \sum_i c_i \vec{\gamma}_i(x)\vec{\phi}_k(s) \tag{29}$$

To put these operations in matrix form, the matrix $\Gamma$ is defined to be composed of the column vectors $\vec{\gamma}_i(x)$, i.e., the eigenvectors of Eqn. 24. We define the final form of the update operator, $\hat{U}(s)$, to be the matrix composed of column vectors $\vec{\phi}_k(s)$. Each $\vec{\phi}_k(s)$ has only a single non-zero entry, in the vector location indexed by k, and thus $\hat{U}(s)$ is a diagonal matrix.

The transformation steps for altering an image to a degraded image with lowered entropy and increased error, then, begins with the image vector $\vec{f}$, and projects that vector into the perceptual space defined by the eigenvector basis from Eqn. 24, such that:

$$\vec{f}' = \Gamma \cdot \vec{f} \tag{30}$$

The vector $\vec{f}'$ forms the initial conditions of the original image, transformed into perceptual space (by the $\Gamma$ matrix, composed of the $\vec{\gamma}_i$ eigenvectors from Eqn. 24 as the columns of $\Gamma$). The values $f_i$ of $\vec{f}'$ constitute the values of the $c_i$ coefficients that will be used in Eqn. 17.

Having transformed the vector into perceptual space, the update operator is then applied:

$$\vec{f}'' = \hat{U}(s) \cdot \vec{f}' = \hat{U}(s) \cdot \Gamma \cdot \vec{f} \tag{31}$$

The initial image now has been moved into perceptual space ($\vec{f} \to \vec{f}'$), and moved within that space to a point corresponding to entropy level s($\vec{f}' \to \vec{f}''$), with a corresponding increase in error (which will be measured).

The lower-entropy image, $\vec{f}''$, thus has been scaled such that it now can be encoded via rounding into a more compact version:

$$\vec{f}''' = \text{round}(\vec{f}'') = \text{round}(\hat{U}(s) \cdot \Gamma \cdot \vec{f}) \tag{32}$$

Any subsequent encoding step may then be applied, such as Huffman or arithmetic coding, operating on the rounded result. Said subsequent steps are equivalently applicable to any other method (JPEG, RGPEG, or other) of arriving at a transformed image, and are thus irrelevant to the present formulation.

Illustration with One Specific Embodiment of RGPEG: Update Operator Moves Image to Lower Entropy State while Minimizing Error Increase The image $\vec{f}$ now has been moved from feature space to the perceptual space defined by the eigenvector basis of Eqn. 24, as in FIG. 25C, selecting a quality level, applying the appropriate update operator, and rounding, resulting in Eqn. 32. This section focuses on the direct measures of error and of entropy of the method, directly compared with JPEG.

We carried out several instances of computed compression via an estimated synaptic Jacobian, composed by measuring distances between pixels on a screen image, measuring viewing distance from the screen, converting these to viewing angle, and measuring all pixels in terms of viewing angles and the distances among them (see section 11B). Examples of computed Hamiltonians and eigenvector bases are shown in FIG. 25E and FIG. 25G for a particular empirical pixel size and viewing distance; the formulae show how any empirically measured features give rise to a corresponding Hamiltonian. A set of several additional sample Hamiltonians and eigenvector bases are shown in FIG. 38.

Performing compression at multiple quality levels yielded empirical comparisons of the error and entropy measures for the JPEG method and the method derived from the Riemannian geometric principles described herein (RGPEG). It is important to note that, using simple estimations of geometric distance and log scale intensity differences, the generalized RGPEG method typically outperforms the JPEG special case, as expected. The method can most clearly be seen to produce fewer artifacts when compared at relatively high compression levels (high entropy and high error); these are clear to qualitative visual inspection. FIG. 26 shows one detailed side by side comparison (image from the prior art Caltech256 dataset), along with the measures of error and entropy for each image. The figure also shows quantitative plots of the tradeoffs of values among error and entropy for a set of selected quality levels. Across a range of quality settings, the error and entropy values for RGPEG outperform those for JPEG. Many other images and parameterizations have been evaluated. As section 11B indicates, the JPEG method occurs as a special case of the general RGPEG principles for specific assumptions of geometric distance and of perceived intensity difference.

It also is notable that the computational space and time costs for the RGPEG method are identical to those for JPEG.

The compression algorithm for image f described in the preceding sections can be summarized for JPEG as: Whereas for RGPEG it is:

$$\hat{f} = \text{round}((DCT \cdot Q) \cdot f) \tag{33}$$

$$\hat{f} = \text{round}(\hat{U}(s) \cdot \Gamma \cdot f) \tag{34}$$

Which can be simplified independently of a given image to:

$$\hat{f} = \text{round}(V \cdot f) \tag{35}$$

The compression algorithm operates with a linear operator parameterized by V, a 64×64 matrix that is similar to the DCT component matrix multiplied by the JPEG Q matrix, where each column is a basis vector in the discrete cosine basis multiplied by some q factor. Since this matrix may be pre-computed, we can see that a change of basis from the DCT basis to another DCT basis does not change the computational complexity in any way; the computational complexity cost of the RGPEG algorithm is equivalent to that of the JPEG algorithm.

In sum, the JPEG algorithm was designed assuming its basis vectors (discrete cosine transforms) to be orthogonal, which they are in feature (Euclidean) space, but not in perceptual (Riemannian) space. As shown, the perceptual non-zero distances among basis dimensions can be either empirically ascertained via psychophysical similarity experiments, as in the psychophysical-Jacobian method, or assumed on the basis of presumptive measures of anatomical distances (or approximations thereof) as in the synaptic-Jacobian method, or calculated on the basis of physically measured distances in the physical space, as in the physical-distance-Jacobian method (see section 11B). In the present embodiments, we have predominantly tested the estimated psychophysical Jacobian method (method IIb), which (perhaps surprisingly) is shown, by itself, to outperform JPEG. From these methods, we derived Hamiltonians from the image space, and eigenvector bases from the Hamiltonians, and showed that the JPEG DCT basis was a special case with particular settings shown in FIG. 38F.

8. Riemannian Model of Perceived Image Degradation

As described in the background of the present application, the prior art is replete with comparisons of estimates vs. human evaluations. Among the measures mentioned, SSIM tends to outperform RMS, and SSIM has often been used as a reference standard for new proposed metrics. Section 8 introduces a method by which any existing measure can be measurably improved by substituting a Riemannian metric in place of Euclidean measures.

A Metric Space Measure of Image Quality

Under the assumption that the neural connectivity involved in image perception is complex and unknown, method IIa can be used to approximate the tensor directly from features and perceptual distances. In order to more easily evaluate results, we make the limiting assumption that a single Jacobian is applicable across the set of all images. Because this Jacobian is nonspecific to a particular type of image, we will be extracting only those partial differential equations applicable to all images. The problem can be cast as a regression on the set of Jacobian cells with which measured distance best matches perceived distance across all N presented stimuli (see FIG. 12). Treating this as an optimization problem, we performed stochastic gradient descent on the error defined as 1— Pearson correlation between the tensor's measure of distance for all images and the DMOS ratings (FIG. 12). Because the Jacobian must be a symmetric matrix to guarantee that it will fulfill the pseudo-Riemannian metric tensor's property of symmetry, as this particular embodiment specifies, the upper diagonal of the Jacobian is dependent only on the lower diagonal and the regression is $$\frac{D*(D+1)}{2}$$

dimensional. Since images used are 256×256 pixels, a Jacobian representing the pairwise relations between pixels in the entire image would contain over four billion cells. This is an untenable dimensionality for an error space. Therefore, we constrained our task to learning local relations between nearby pixels by cutting each image into 8×8 pixel sub-images (same as was done for lossy image compression in section 7). This greatly increased the number of data points used for training while simplifying the task. Since the error for any candidate Jacobian must be calculated by first computing Eqn. 7, $<\vec{f}_m, \vec{f}'_m> = (\vec{f}_m - \vec{f}'_m) g_{\Psi;F} (\vec{f}_m - \vec{f}'_m)^T \forall m \in 1 \ldots N$, computational solutions on these stimuli can be slow, but completed in reasonable time on a single high-performance computer.

To evaluate the success of the enclosed method when compared with the state of the art, we used a public dataset of 2,080 images (subsetted to equalize N across categories), split into eight naturalistic scene categories: seacoast, forest, highway, inside city, mountain, open country, street, and tall building (examples from each category are in FIG. 28A). This dataset has many more images than most used in comparison of IQA algorithms (for example, popular datasets CSIQ, TID 2013, and Toyama each have less than 50), which is important to reduce regression over-fitting. Multiple human ratings must be gathered for each image, so million-image datasets such as ImageNet are untenable. Each image in the dataset was degraded into four JPEG (ISO-10918) quality levels: 5%, 10%, 20%, and 30% using ImageJ.

Human perceptual distances were collected on Amazon Mechanical Turk as degree of "difference from the original" on a continuous rating scale from 0 to 100 and converted into a variation of the industry-standard difference mean opinion score (DMOS), which is one minus the mean of subject ratings normalized to a range of (0, 1). After instruction and several training trials, subjects participated in 40 self-paced comparison trials, each containing one full-quality image and four degraded versions to be rated in randomized order. Subjects left-clicked a thumbnail of any image to magnify it on the left half of their screen, and right-clicked to magnify on the right half of the screen, giving them freedom to carefully consider all image-image pairs, adjusting ratings until appropriate (e.g., FIG. 28B). Subjects reset the current trial at any time. Five subjects were discarded as invalid. We desired a total of 4*2,080=8320 image ratings, averaged across multiple subjects. This posed a problem, because no single subject can rate this many images, so we split the subject pool into groups. Each subject was randomly assigned to a set of 40 images, without replacement, such that every image is seen exactly once within one group of 52 subjects (40*52=2,080). We collected enough data for 5 groups, or 260 subjects, so each image was seen by exactly 5 people.

The resultant metric tensor outperformed SSIM. To demonstrate this, we compare Spearman correlation with human ratings and cubic regression adjusted $R^2$ in both linear and log-log coordinates. The outcome of these analyses are apparent in Table 2, Table 3, and FIG. 29.

TABLE 2

Spearman correlation with DMOS for Euclidean distance between images, SSIM
distance, and our method. A single Jacobian was identified for the set of all images. Nonetheless,
it is the highest performing psychophysical predictor for most individual image categories. All
correlations were found to have $p \ll 0.001$ via permutation test.

| | Combined | Coast | Forest | Highway | Inside City | Mountain | Open Country | Street | Tall Building |
|---|---|---|---|---|---|---|---|---|---|
| Euclidean | 0.4691 | 0.6167 | 0.5369 | 0.6204 | 0.7134 | 0.5633 | 0.5112 | 0.7494 | 0.6715 |
| SSIM | 0.6946 | 0.7478 | 0.8548 | 0.7119 | 0.8110 | 0.8013 | 0.7613 | 0.8392 | 0.7640 |
| Method IIa | 0.8263 | 0.8644 | 0.8241 | 0.8601 | 0.8416 | 0.8532 | 0.8495 | 0.8412 | 0.8166 |

TABLE 3

Adjusted $R^2$ of cubic regression with DMOS for Euclidean distance between images,
SSIM distance, and our method. Again, a single Jacobian was identified for the set of all images.

| | Combined | Coast | Forest | Highway | Inside City | Mountain | Open Country | Street | Tall Building |
|---|---|---|---|---|---|---|---|---|---|
| Euclidean | 0.2024 | 0.3178 | 0.2878 | 0.2994 | 0.5065 | 0.2961 | 0.2537 | 0.5426 | 0.4460 |
| SSIM | 0.4094 | 0.4401 | 0.7221 | 0.4234 | 0.6429 | 0.6042 | 0.5598 | 0.7093 | 0.5713 |
| Method IIa | 0.6115 | 0.6352 | 0.7125 | 0.6020 | 0.6853 | 0.6868 | 0.7051 | 0.6936 | 0.6462 |

Intrinsic Image-Specific Degradation Tolerance Characteristics

Typical graphs published to illustrate the fit of a given estimation measure to empirical measures put the estimated measure on one axis and a MOS or DMOS measure on the other. We term these graphs EST-PER graphs; they plot estimated measures against empirical perceptual measures. FIG. 29 exemplifies such a graph, in which peak signal to noise ratio (PSNR) estimate measures are plotted against human perceptual DMOS judgments for a range of JPEG images. It can be seen that the fit between these estimated and empirical measures is nonlinear, and the goodness of fit (predictive power) of the PSNR measure can be estimated by computation of a correlation coefficient.

We also introduce a new category of graphs, termed STIM-MEAS graphs. In these graphs, the X-axis is a purely nominal scale, listing the stimuli, whose ordering will be determined by a selected metric, which will be specified in this section. For instance, the metric could be the order of increasing mean MOS or DMOS score of a given instance of degradation of each stimulus. The Y-axis is a selected empirical quality measure, such as MOS or DMOS. Plotted in these graphs are both the human evaluations and one or more estimation measures (e.g., RMS, SSIM), in terms of standard deviations from the mean of the measure. FIG. 30 shows an example of STIM-MEAS graph.

STIM-MEAS graphs illustrate an additional finding. FIG. 31 shows a set of four separate graphs, each of which share the same X-axis, but each have separately calculated Y-axes. The shared X-axis is the ordered list of stimulus images, in this case ordered by increasing value of empirical human DMOS scores of compressed versions the images at JPEG quality 10%. Each of the four separate Y-axes plot the empirical human DMOS scores of various degraded versions of the same stimulus images. Thus, by comparison, we can evaluate the correlations among different degradations of any given image. FIG. 32 renders correlations among the image orderings of multiple different pairs of degradation methods, including JPEG, JPEG-2000, addition of white noise, and Gaussian blur.

It can be seen that a given image illustrates a correlated tendency to be more "tolerant" or "intolerant" to degradation. That is, the position of a stimulus on the X-axis not only denotes the extent of human quality judgment of the specific chosen ordering (JPEG 10%), but also predicts the human quality judgments of other degradation methods (e.g., JPEG 30%, Gaussian blur, addition of white noise). It need not have been the case that a given human quality judgment would be consistent across different degradations of a given image. The graphs illustrate evidence for a specific hypothesis (which we term the intrinsic "image-specific degradation susceptibility", ISDS, hypothesis): that a given image has an intrinsic characteristic that determines how much the judged quality of the image will be diminished when it is degraded, by any of a number of different methods. FIG. 13 describes the methodology for computing ISDS scores.

We posit that intrinsic image-specific degradation susceptibility has implications for machine learning. In particular, unsupervised machine vision methods often are presented with large numbers of images to enable the algorithm to judge future images as being similar to previously seen images; or, in a corresponding supervised form, to enable a learning algorithm to place future images into one of several categories that have been defined in terms of examples previously given of members of those specified categories. If there are very large numbers of images to be learned, it may be advantageous to use information about image-specific intrinsic degradation susceptibility in selecting images to train on. In particular it may be possible to attain comparable levels of subsequent test performance by training on a much smaller set of data, if the selected subset of data is identified with reference to the image-specific degradation susceptibility measures of the images in the data.

These orderings constitute a method for identifying images or types of images which: a) can be compressed to a lower bitrate than other images for matching perceptual fidelity, b) may be grouped for processing in machine vision, or c) are predictive of other image properties.

9. Riemannian Collaborative Filtering

The disclosed methods can model interactions between features which are predictive of perceived similarity, even when those features are an unknown nonlinear function of the input. An important problem in science and industry is the prediction of perceived similarity as a function of other perceived similarities. This task is often called collaborative filtering (CF) because it involves predicting a perceiver's unknown distance measurements by comparing the perceiver's known responses with those of other perceivers. Put another way, CF aims to extract the interactions between hidden, uninspectable features of perceivers who have similar behavior, complicated by the fact that perceiver-perceiver similarity is a function of these uninspectable interactions. This formulation is the best approach for problems such as movie or product preferences where the specific features of a stimulus cannot be explicitly examined because they are plentiful or abstract.

Existing approaches to collaborative filtering, despite their task-specific implementations, lack the value of the flexible metric space models described herein. Matrix factorization or completion methods are plentiful, but most evaluate the data matrix in a linear fashion. Those which build nonlinear models lack the principled optimization-based approach described herein. Regression-based item embeddings for deep learning result in data structures that don't explicitly code item-item interactions. Previous studies have shown that extractable feature relations exist in the datasets we describe below and that they can be extracted using various techniques, so this type of challenge is a good fit for the present application. Section 10 for further discusses the types of data recommended for the present application.

One procedure through which method IIa can tackle CF is by first learning to group subjects by similar preferences, then identifying a Jacobian for each group which best enables linear regression on item ratings. In other words, learn the item-item interactions which best explain individual behavioral differences for each broad type of subject. Said mechanism provides a new, principled approach to collaborative filtering which extracts item-item interactions within each subtype of perceiver and uses them to form a perceptual space useful for predicting psychophysical responses (in this case, item ratings). First, spherical k-means is used to cluster the set of all subjects in the Euclidean space of their preferences. Spherical k-means uses cosine distance, which functions better in high dimensional space and evaluates the correlation among data points rather than their Euclidean distance. Furthermore, it provides a simple path for handling missing data (items which one or more subjects have not rated), since cosine distance is measured only along dimensions which are nonzero for both points. Next, stochastic gradient descent identifies a Jacobian which projects each subject into a perceptual space which minimizes the error of predicting subject responses using nearby subjects (see FIG. 33A). Local minima are a risk, so this gradient descent is repeated from numerous different random initializations and the most optimal solution is used. To further mitigate the effect of missing data, each cluster is projected into the subspace of only items rated by a minimum percentage of the cluster's members. Rarely rated items will be under-considered in the error calculations for stochastic gradient descent, but we deem this appropriate because the data provides less certainty about the correct use of these items (their N is lesser) and such items are less likely to appear in test subjects. It is clear from the assumptions on which this patent is built that the initial clustering solution in Euclidean space is potentially sub-ideal. Subjects' ratings are best compared in perceptual space, and that extends to the clustering of subjects by said ratings. As described in section 3, a single Jacobian is fit to the entire dataset (rather than to individual clusters), and perform clustering in the perceptual space modeled by that Jacobian. While that Jacobian will lack the detailed perceptual curvature modeled at the cluster level, it may still prove usefully superior to Euclidean space.

Many alternate embodiments for the CF problem exist. One example alternative approach to the problem is the pseudo-Riemannian autoencoder, wherein a simple shallow autoencoder is trained on the manifold while the function for projecting data onto the manifold is being learned using method Ma (see FIG. 14). One additional embodiment is the method IIIa-based Riemannian matrix decomposition disclosed briefly in section 10.

When subject ratings are projected into perceptual space using the acquired Jacobians, the dimensions form a population code which can be used as the input to a (deep) learning system designed to predict subject preferences.

To evaluate non-Euclidean CF, we suggest applying said method to the popular MovieLens dataset of online movie ratings or Amazon Reviews dataset. The popularity of these datasets enables direct comparison against a body of literature. Metadata provided for each movie or product enables the comparison of resultant Jacobians against topic models. Evaluation on held-out subjects should be performed by first identifying the cluster to which a subject in the test dataset should be assigned, then using the Jacobian for that cluster along with the training subjects within that cluster to predict missing values in the test subject's rating vector (FIG. 33B). This most directly tests the regression used during training. CF approaches are also often compared as recommender/search algorithms since this is often how they are used in practice, so traditional recommender/search scoring techniques such as recall analysis (thresholded recall, recall plots, etc.), and normalized discounted cumulative gain are excellent options.

10. Scope of Applications of the Method

This method is applicable to all attempts to model the perceptual space of a neural network, biological or artificial. In addition to the applications discussed herein, this method may see success with neuronal spike sorting, where electrodes and the components of a signal from a single electrode both contain neighbor relations. Neural local field potentials similarly contain neighbor relations between electrodes, and are used both for science and for brain machine interfaces. Similarly, neural neighbor relations cause relations between sensors in fMRI and ECOG, and our preliminary results indicate that these relations are informative. Neighbor relations may be acquired via psychophysics from social network graphs or from behaviors on a network (for network security).

When metric tensors are made to approximate neural networks, the structure of said tensors can be directly inspected for insights into the underlying neural circuitry or representations. Testable hypotheses are explicit to these Jacobians and represented in the stimulus feature space (as interactions between features), which makes confirmatory experiments unusually simple to devise. One example is to look for diffeomorphisms.

Matrix factorization is sometimes cast as a simultaneous optimization of two matrices, which when linearly combined (e.g., via the dot product) form cells of the original matrix. This process can also be performed in a metric space: search for two matrices which, when distanced using a metric tensor, form cells of the original matrix. This metric tensor may be pre-defined, or optimized simultaneously with the two result matrices during matrix factorization. Said matrix factorization has a number of uses. For example, nonlinear matrix decomposition is critical to kernel principal component analysis (kPCA), yet kPCA generally produces no definition of the principal components themselves. Metric tensor-based matrix factorization, in contrast, uses the metric tensor to link the input to the resultant matrices. Other matrix decomposition uses, for example in matrix completion tasks, may benefit strongly from the nonlinearity made available in non-Euclidean metric space by this approach.

Applications from generating superior perceptual systems in the absence of a perceiver to approximate (methods IIIa and IIIb) are broad. When predicting stock market trends, the feature space of all stocks contains neighbor relations which form a complicated manifold. We have evidence that modeling this manifold may improve stock market prediction. Other applications which are likely to benefit from this approach include: spectroscopy, geographic crime prediction, taxi fare prediction, hourly geolocated weather data, Higgs boson classification and other particle physics, word embeddings, super-EEG, EEG-within-fMRI, and event detection in video. Additional applications and embodiments are plentiful.

11. Illustrative Experiments and Description of RGPEG Formulation (Supplemental Material)

(A) DETAILS OF ILLUSTRATIVE EXPERIMENTS

Experiment 1—Audio Stimuli

Subjects

The participants were 18 undergraduates from Dartmouth College, who participated for course credit. All participants were tested individually.

Stimuli and Apparatus

Figure 34:
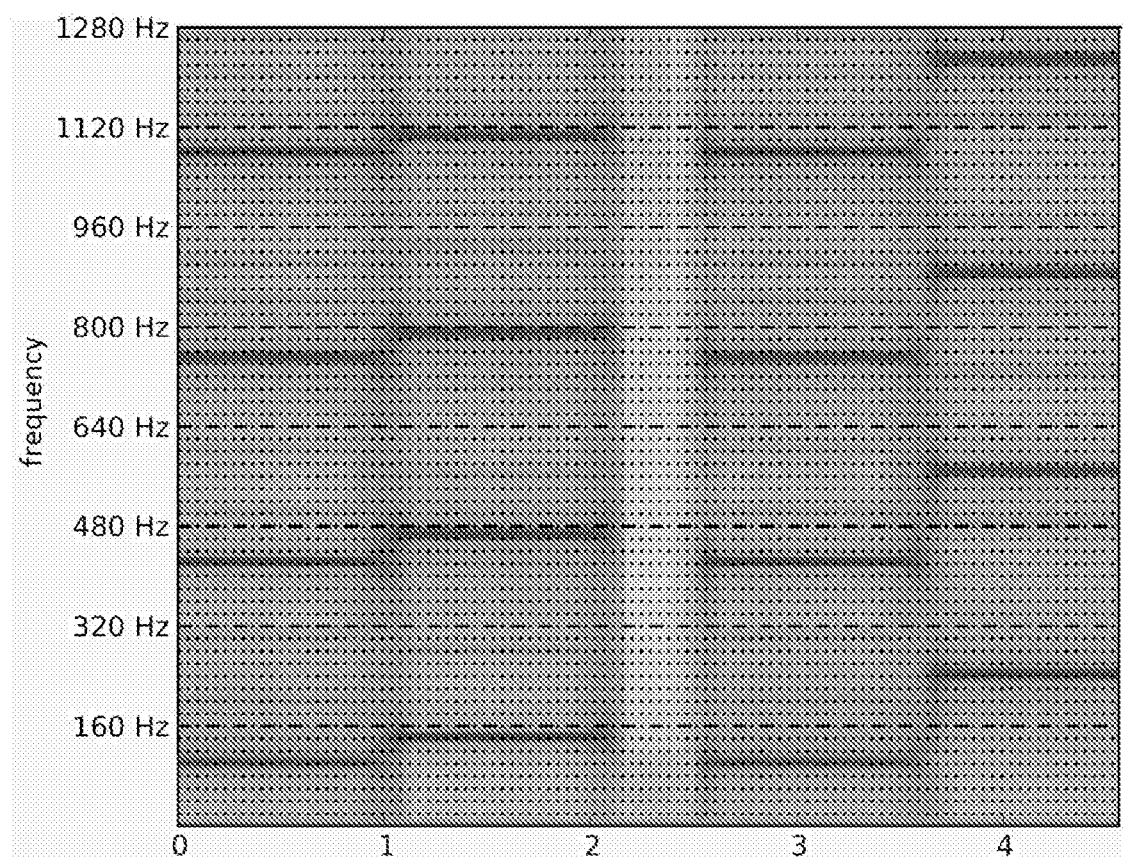
FIG. 34 shows vector components as frequency bands.

The stimuli were computer-generated sounds generated from the feature vectors. The feature vectors were created by shifting an initial feature vector (Feature 0 in Table 4) 8 times. This operation yields the features 1-8 in Table 4. These 9 feature vectors were combined to yield the stimuli for the experiment. A stimulus in the experiment consisted of two pairs of feature vectors. In both pairs, the first feature vector was always feature 0 from Table 4. The second features of both pairs were selected from all possible combinations of the remaining features 1-8 from Table 4. These possible feature combinations are shown in Table 5. The audio stimuli were generated from the features in Table 4 by assigning each of the features 64-bits to a range of frequencies. Starting at the left of the feature vector each bit is assigned to a 20 Hz frequency band. For example, the first bit is assigned to the 0-19 Hz frequency band, the second bit is assigned to the 20-39 Hz band, and the last bit is assigned to the 1260-1279 Hz band. An inverse Fourier transform is then applied to this feature vector to generate a complete sound stimulus. There are 28 different such sound stimuli that are generated for the audio portion of the experiment. They are enumerated in Table 6. To further illustrate how an audio stimuli is related to feature vectors, it useful to consider a sound stimuli from the audio experiment. If we take the Fourier transform of this stimuli, we obtain the spectrogram shown in FIG. 34. This spectrogram clearly shows the presence of the frequencies corresponding to the bits in the feature vectors.

Procedure

There were 4 blocks of 28 trials each. Each of the 28 stimuli were presented once in each block. The order of stimuli in each block was randomized. On each trial, a participant judged whether there was a greater difference between either the first, or second, pair of features. If the participant, judged that the first pair was the most different, they pressed the left arrow key. The right arrow key was pressed if the second pair appeared most different. Before the experiment began a single practice block of 10 trials was presented so the participant could become familiar with the task. The full 4 blocks of 28 trials experiment was run twice first with the audio stimuli and immediately afterward with the visual stimuli. The instructions for the experiment with the audio stimuli was the following:

You will hear two complex sounds in a row (pair 1), followed by two different complex sounds in a row (pair 2). Tell us which of these pairs of sounds are more DIFFERENT from each other. Press "←" if the sounds in pair 1 are most different, or press "→" if the sounds in pair 2 are most different. We will start with a few practice trials, and then the actual experimental trials will begin. To begin the trials, press the "space" key.

TABLE 4

Feature vectors used to generate both audio and visual features.

| Feature | Feature Vector |
|---|---|
| 0 | 0000100000000000000010000000000000001000000000000000100000000000 |
| 1 | 0000010000000000000001000000000000000100000000000000010000000000 |
| 2 | 0000001000000000000000100000000000000010000000000000001000000000 |
| 3 | 0000000100000000000000010000000000000001000000000000000100000000 |
| 4 | 0000000010000000000000001000000000000000100000000000000010000000 |
| 5 | 0000000001000000000000000100000000000000010000000000000001000000 |
| 6 | 0000000000100000000000000010000000000000001000000000000000100000 |
| 7 | 0000000000010000000000000001000000000000000100000000000000010000 |
| 8 | 0000000000001000000000000000100000000000000010000000000000001000 |

TABLE 5

All possible combinations for features.

| Feature 1 | Feature 2 |
|---|---|
| 1 | 2 |
| 1 | 3 |
| 1 | 4 |
| 1 | 5 |
| 1 | 6 |
| 1 | 7 |
| 1 | 8 |
| 2 | 3 |
| 2 | 4 |
| 2 | 5 |
| 2 | 6 |
| 2 | 7 |
| 2 | 8 |
| 3 | 4 |

TABLE 5-continued

All possible combinations for features.

| Feature 1 | Feature 2 |
|---|---|
| 3 | 5 |
| 3 | 6 |
| 3 | 7 |
| 3 | 8 |
| 4 | 5 |
| 4 | 6 |
| 4 | 7 |
| 4 | 8 |
| 5 | 6 |
| 5 | 7 |
| 5 | 8 |
| 6 | 7 |
| 6 | 8 |
| 7 | 8 |

Experiment 2—Visual Stimuli

Subjects

The participants were 12 undergraduates from Dartmouth College, who participated for course credit. All participants were tested individually.

Stimuli and Apparatus

Figure 35:
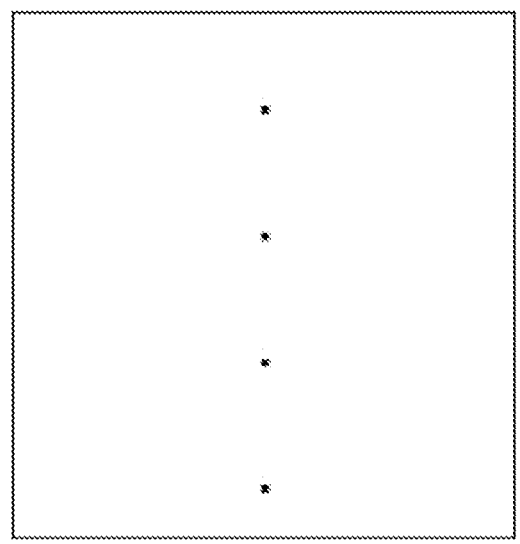
FIG. 35 is an example of a visual stimulus.

The same feature vectors from experiment 1 were used to generate the visual stimuli. The visual stimuli were generated from the features in Table 4 by laying out the feature's 64-bits vertically on the screen. In this layout, the right-most bit was assigned to the bottom of the screen. Each subsequent bit was assigned a position that corresponded to a higher position on the screen. If a bit contained a one, then a black square was drawn. If a bit contained a zero, then the region was left as the background color. A sample of a visual stimuli is shown in FIG. 35. Each feature vector then has a corresponding visual representation. These visual representations were then converted to image files and the images were presented in the experiment. The 28 different combinations of images are the same as the combination of sounds in the first experiment which are enumerated in Table 6.

Procedure

The procedure was identical to experiment 1, except for the instructions which were the following:

You will see two visual patterns in a row (pair 1), followed by two different visual patterns in a row (pair 2). Tell us which of these pairs appears more DIFFERENT from each other. Press "←" if the patterns in pair 1 are most different, or press "→" if the patterns in pair 2 are most different. We will start with a few practice trials, and then the actual experimental trials will begin. To begin the trials, press the "space" key.

Experimental Analysis

Statistics for Experiment 1 (Audio Stimuli):
  Method Ib R-squared: 0.96 (p=0.00)
  Method Ib sum squared error: 2.39
  Method IIb R-squared: 0.96 (p=0.00)
  Method IIb sum squared error: 2.39
Statistics for Experiment 2 (Visual Stimuli):
  Method Ib R-squared: 0.96 (p=0.00)
  Method Ib sum squared error: 1.59
  Method IIb R-squared: 0.96 (p=0.00)
  Method IIb sum squared error: 1.59

TABLE 6

Stimuli used in the experiment by presenting all possible combination of features and reversing the presentation order of every other feature combination.

| Stimulus | Pair 1 Baseline | Pair 1 Feature 1 | Pair 2 Baseline | Pair 2 Feature 2 |
|---|---|---|---|---|
| 0 | a | c | a | b |
| 1 | a | b | a | d |
| 2 | a | e | a | b |
| 3 | a | b | a | f |
| 4 | a | g | a | b |
| 5 | a | b | a | h |
| 6 | a | i | a | b |
| 7 | a | c | a | d |
| 8 | a | e | a | c |
| 9 | a | c | a | f |
| 10 | a | g | a | c |
| 11 | a | c | a | h |
| 12 | a | i | a | c |
| 13 | a | d | a | e |
| 14 | a | f | a | d |
| 15 | a | d | a | g |
| 16 | a | h | a | d |
| 17 | a | d | a | i |
| 18 | a | f | a | e |
| 19 | a | e | a | g |
| 20 | a | h | a | e |
| 21 | a | e | a | i |
| 22 | a | g | a | f |
| 23 | a | f | a | h |
| 24 | a | i | a | f |
| 25 | a | g | a | h |
| 26 | a | i | a | g |
| 27 | a | h | a | i |

TABLE 7

Riemannian distance from baseline feature vector to other feature vectors

| Stimulus | Mean Response | Std. Dev Response | Method Ib | Method IIb |
|---|---|---|---|---|
| 4 | −1.00 | 0.00 | −1.00 | −1.00 |
| 10 | −1.00 | 0.00 | −1.00 | −1.00 |
| 12 | −1.00 | 0.00 | −1.00 | −1.00 |
| 2 | −0.96 | 0.29 | −1.00 | −1.00 |
| 6 | −0.96 | 0.29 | −1.00 | −1.00 |
| 20 | −0.92 | 0.40 | −1.00 | −1.00 |
| 8 | −0.92 | 0.40 | −1.00 | −1.00 |
| 16 | −0.92 | 0.40 | −1.00 | −1.00 |
| 26 | −0.92 | 0.40 | −1.00 | −1.00 |
| 14 | −0.83 | 0.56 | −1.00 | −1.00 |
| 0 | −0.79 | 0.62 | −1.00 | −1.00 |
| 24 | −0.79 | 0.62 | −1.00 | −1.00 |
| 18 | −0.50 | 0.88 | −1.00 | −1.00 |
| 22 | −0.46 | 0.90 | −1.00 | −1.00 |
| 7 | 0.46 | 0.90 | 1.00 | 1.00 |
| 27 | 0.54 | 0.85 | 1.00 | 1.00 |
| 13 | 0.62 | 0.79 | 1.00 | 1.00 |
| 25 | 0.71 | 0.71 | 1.00 | 1.00 |
| 19 | 0.75 | 0.67 | 1.00 | 1.00 |
| 9 | 0.83 | 0.56 | 1.00 | 1.00 |
| 23 | 0.83 | 0.56 | 1.00 | 1.00 |
| 11 | 0.88 | 0.49 | 1.00 | 1.00 |
| 21 | 0.88 | 0.49 | 1.00 | 1.00 |
| 17 | 0.92 | 0.40 | 1.00 | 1.00 |
| 1 | 0.92 | 0.40 | 1.00 | 1.00 |
| 15 | 0.92 | 0.40 | 1.00 | 1.00 |
| 3 | 0.96 | 0.29 | 1.00 | 1.00 |
| 5 | 1.00 | 0.00 | 1.00 | 1.00 |

TABLE 8

Distances from baseline feature vector 0 for Subject based on ranking, Euclidean distance, and Riemannian distances using methods Ib and IIb.

| Subject | Euclidean | Method Ib | Method IIb |
|---|---|---|---|
| 0 | 2.82 | 0.00 | 0.00 |
| 1 | 2.82 | 0.67 | 1.00 |
| 2 | 2.82 | 1.50 | 2.00 |
| 3 | 2.82 | 2.16 | 3.00 |
| 4 | 2.82 | 2.62 | 4.00 |
| 5 | 2.82 | 2.91 | 5.00 |
| 6 | 2.82 | 3.08 | 6.00 |
| 7 | 2.82 | 3.17 | 7.00 |
| 8 | 2.82 | 3.20 | 8.00 |

(B) Specific Description of RGPEG Formulation

Step 1 Details: Determine Perceiver's Acuity Judgement with Respect to Each Experimental Dimension The goal of this step is to obtain a metric which allows us to determine how an observer views differences in the image block; the perceiver's acuity judgement with respect to the image dimensions. The three spaces under consideration are defined as: (1) a feature space F, e.g., the set of intensities in the image block being viewed; (2) a physical space $\Phi$, e.g., the display of the image on a computer monitor; and (3) a perceptual space $\Psi$, the internal representation resultant from an individual observing said image on said computer monitor.

Figure 36:
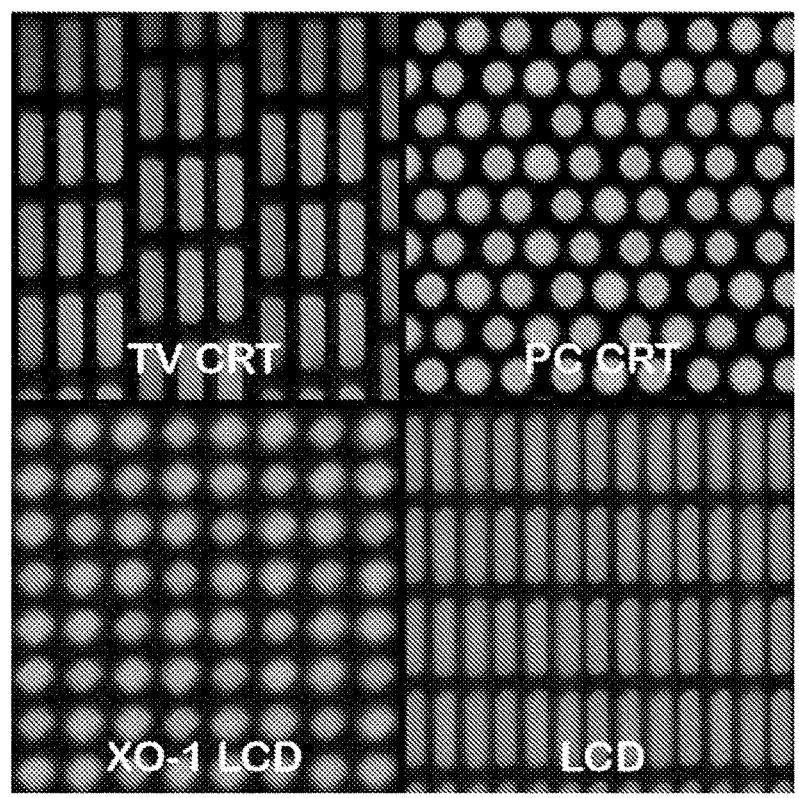
FIG. 36 shows examples of screen layouts of pixels in physical space.

We define said feature space $F \equiv \mathbb{R}^{64}$ to represent the space of all images. A given image I is defined as vector $f \in F$. The function $\mu_{F \to \Phi}: F \to \Phi$ maps a vector in said feature space F to the physically measurable space $\Phi \equiv \mathbb{R}^3$. Said physical space is composed of the Euclidean x and y dimensions of the plane plus one dimension to represent brightness at each such point. The map $\mu_{F \to \Phi}$ will map every element of the feature vector F to a brightness located on a Euclidean surface. The layout of the pixels need not form a grid on the plane. Indeed, many possible arrangements are used in the design of computer monitors, as illustrated in FIG. 36.

Although the values in all dimensions of $\Phi$ may be physically distinct, they may not be perceivably different. For instance, if the difference in brightness between two neighboring pixels is less than the human contrast sensitivity function then two mathematically distinct points will, with respect to a human observer, appear identical. For this (and related) reasons it is necessary to posit said perceptual space $\Psi \equiv \mathbb{R}^3$ which represents how the points in said physically measurable space $\Phi$ appear to a human observer. These spaces and their maps are shown in FIG. 24.

Jacobians may be created to represent each of these maps. These Jacobians then will move a displacement in one space to a displacement in the other space. The following Jacobian then indicates how each dimension in $\Phi$ changes when we make a change in one of the dimensions of F. Thus the Jacobian of the map $\mu_{F \to \Phi}$ (Eqn. 4) will be of dimensions 3×64:

$$J_{F \to \Phi} = \begin{bmatrix} \frac{\partial \phi_0}{\partial f_0} & \frac{\partial \phi_0}{\partial f_1} & \cdots & \frac{\partial \phi_0}{\partial f_{63}} \\ \frac{\partial \phi_1}{\partial f_0} & \frac{\partial \phi_1}{\partial f_1} & \cdots & \frac{\partial \phi_1}{\partial f_{63}} \\ \frac{\partial \phi_2}{\partial f_0} & \frac{\partial \phi_2}{\partial f_1} & \cdots & \frac{\partial \phi_2}{\partial f_{63}} \end{bmatrix} \quad (36)$$

Given this Jacobian, Eqn. 6 can now be used to obtain a metric for the feature space with respect to its embedding in physical space. Moreover, from the mapping of the physical space to the perceptual space we obtain a mapping that defines how dimensions in the physical space appear to an observer. The Jacobian of this mapping $J_{\Phi \to \Psi}$ determines how changes in the physical space appear to human perception. Said Jacobian may be obtained via any of the general methods described herein (Ia, Ib, IIa, IIb).

The mapping from the feature space F to the physical space $\Phi$ is accomplished with the following parameters:

TABLE 9

Summary of model parameters.

| Parameter | Description | Value | Units |
|---|---|---|---|
| $\Delta_{pixel}$ | screen pixel size | 0.282 | mm |
| $d_v$ | viewing distance | 24.0 | in |
| $\Delta_x$ | spread in x direction | 1000.0 | pixels per in |
| $\Delta_y$ | spread in y direction | 100.0 | pixels per in |

Recalling the unit conversions 1.0 inch=25.4 mm and 180°=$\pi$ radians, the size of an individual pixel in terms of visual angle $\theta_{pixel}$ in degrees per pixel is given by:

$$\theta_{pixel} = \arctan\left(\frac{\Delta_{pixel} \cdot \frac{1.0 \text{ inch}}{25.4 \text{ mm}}}{d_v}\right) \cdot \frac{180}{\pi} \approx 0.0265° \quad (37)$$

Borrowing a procedure from JPEG, images are divided into 8×8 grid squares. Coordinates may be computed of all pixels relative to the upper right pixel, in units of multiples of visual angle. If only the x axis is considered, said assumptions yield:

$$J_x = \begin{bmatrix} 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \\ 0.000 & 0.027 & 0.053 & 0.080 & 0.106 & 0.133 & 0.159 & 0.186 \end{bmatrix} \quad (38)$$

If only the u axis is considered, we get:

$$J_y = \begin{bmatrix} 0.000 & 0.000 & 0.000 & 0.000 & 0.000 & 0.000 & 0.000 & 0.000 \\ 0.027 & 0.027 & 0.027 & 0.027 & 0.027 & 0.027 & 0.027 & 0.027 \\ 0.053 & 0.053 & 0.053 & 0.053 & 0.053 & 0.053 & 0.053 & 0.053 \\ 0.080 & 0.080 & 0.080 & 0.080 & 0.080 & 0.080 & 0.080 & 0.080 \\ 0.106 & 0.106 & 0.106 & 0.106 & 0.106 & 0.106 & 0.106 & 0.106 \\ 0.133 & 0.133 & 0.133 & 0.133 & 0.133 & 0.133 & 0.133 & 0.133 \\ 0.159 & 0.159 & 0.159 & 0.159 & 0.159 & 0.159 & 0.159 & 0.159 \\ 0.186 & 0.186 & 0.186 & 0.186 & 0.186 & 0.186 & 0.186 & 0.186 \end{bmatrix} \quad (39)$$

$J_x$ and $J_y$ are now reordered so that they are each 1-dimensional and correspond to the layout of our feature vector f in physical space. The indices from the 2-dimensional coordinate to the 1-dimensional layout is the following:

$$J_x[n] = J_x\left[i \bmod 8, \text{integer}\left(\frac{j}{8}\right)\right] \quad (40)$$

We the construct the $J_{F\rightarrow\Phi}$, mapping by combining the $J_x$ and $J_y$ which yields the following 2×64 matrix:

$$J_{F\rightarrow\Phi} = \begin{bmatrix} J_x \\ J_y \end{bmatrix} \quad (41)$$

To compute the metric, $J_{F\rightarrow\Phi}$ is used to compute the difference in coordinates between any two basis vectors in the feature space. For the sake of illustration, the distance formula used herein between each feature basis vector is based on the multivariate normal distribution.

Method Ia for RGPEG

Use a priori assumptions about how an observer views the physical space by setting the elements of the Jacobian $J_{\Phi\rightarrow\Psi}$ explicitly based on assumed topology of the corresponding brain circuitry, e.g., projections from retina to LGN; projections from LGN to V1. These projections will not actually be known in any detail, so use of this method is based on general data from anatomical measures. Surprisingly, it is found that these estimated measures perform well; this is a topic of ongoing study.

Method Ib for RGPEG

Use a priori assumptions about how an observer views the physical space by setting the elements of the covariance matrix $\Sigma_{\Psi:\Phi}^{-1}$ based on straightforward assumptions. It is then possible to compute the metric $g_{\Psi:\Phi}$ based on the following:

$$g_{\Psi:\Phi} = \Sigma_{\Psi:\Phi}^{-1} \quad (42)$$

Method IIa for RGPEG

Once the Jacobian has been determined by either of the above two methods, a metric may be obtained that a human observer is assumed to be using to judge distances in the physical space with respect to the Jacobian defined by their perceptual capacity. A matrix representation of said metric, $g_{\Psi:\Phi}$, is obtained using Eqn. 6.

Method IIb for RGPEG

A more direct method is to use the data from a psychophysical experiment to compute the covariance matrix $\Sigma_{\Psi:\Phi}^{-1}$. The metric is then acquired using Eqn. 42.

Values for DCT as a Special Case

If, for instance, we set $\Delta x=50{,}000$ and $\Delta x=25{,}000$, we obtain a set of eigenvectors very similar in appearance to the DCT basis vectors of the standard JPEG. These eigenvectors are shown in FIG. 38F.

Evaluating the RGPEG Encoding Error from the Quantization Function

In addition to said entropy, the error of the encoded image must be computed. The optimal encoding minimizes both said entropy and said error since this will ensure minimal compressed size along with fewest detectable errors once the image is decompressed.

Given that the quantization function at the mid points of each energy level is the identity mapping, the only error in encoding is due to the displacement away from the nearest midpoint. Since points will occur on either side of the mid points, some displacements will be positive and some will be negative. In this case, summing all displacements could negate the result; thus the square of the displacement is commonly used. For each feature vector f, the error is measured according to the metric determined by $g_{\Psi:\Phi}$ which is moved to the feature basis using the transformation in Eqn. 13. Thus the error for a given uncompressed feature vector from the original feature vector is given by the following formula:

$$err(\Delta f) = \Delta f \cdot g_{\Psi:F} \cdot \Delta f \quad (43)$$

12. General Framework (Supplemental Material)

Definitions

Let a feature space F be composed of an ordered collection of m features each consisting of n-dimensional contravariant vectors $f \in \mathbb{R}^n$, where each dimension f corresponds to the independent variable of an experiment and the m feature vectors represent different presentations of the independent variables during an experiment. In addition, let a physical space consist of a graph $\Phi$ where each node $\phi$ represents a physical location in a p-dimensional Euclidean metric space. Each node of $\Phi$ is identified by p indices corresponding to the number of dimensions of the physical space. Here, $\Phi$ represents the physical presentation of the independent variables of an experiment. Lastly, let a perceptual space $\Psi$ represent the dependent variables of an experiment defined as a collection of q observations, each consisting of an r-dimensional contravariant vector $\psi \in \mathbb{R}^n$.

Mapping

For clarity, the following notation is used in this section to denote a map $\mu$, a Jacobian J, and a metric tensor g:

$$\mu_{\{FROM\}\rightarrow\{TO\}}$$

$$J_{\{FROM\}\rightarrow\{TO\}}$$

$$g_{\{W.R.T.\}:\{IN\}},$$

where the map $\mu_{\{FROM\}\to\{TO\}}$ moves a point from the {FROM} space to the {TO} space, the Jacobian $J_{\{FROM\}\to\{TO\}}$ moves a contravariant tensor from the {FROM} space to the {TO} space, and the metric tensor $g_{\{W.R.T\}:\{IN\}}$ exists in the {IN} space and measures distance with respect to the embedding in the {W.R.T} space.

There are two principal maps between the above-defined spaces: (1) the map $\mu_{F\to\Phi}$: $F\to\Phi$ that takes an element of the feature space F to an element of the physical space $\Phi$, denoting how an index of a feature dimension maps to a location in physical space (see FIG. 45A); and (2) the map $\mu_{\Psi\to\Phi}$: $\Psi\to\Phi$ that takes an element of the perceptual space $\Psi$ to a node on the physical space $\Phi$, effectively capturing the change of an experiment variable due to a physical presentation of a stimuli (see FIG. 45B). FIG. 46 shows these maps with the feature, physical and perceptual spaces. The maps $\mu_{F\to\Phi}$ and $\mu_{\Psi\to\Phi}$ are bijective (i.e., both surjective and injective), and thus have corresponding inverses $\mu_{F\to\Phi}^{-1}$: $\Phi\to F$ and $\mu_{\Psi\to\Phi}^{-1}$: $\Phi\to\Psi$.

Calculating a Metric

The map $\mu_{\Psi\to\Phi}$: $\Psi\to\Phi$ defines an embedding of the perceptual space $\Psi$ in the Euclidean physical space $\Phi$. Thus, the natural metric in the perceptual space $\Psi$ induced from the embedding is given as:

$$g_{\Phi;\Psi} = J_{\Psi\to\Phi}^T J_{\Psi\to\Phi} \tag{44}$$

The Jacobian $J_{\Psi\to\Phi}$ is given in full form as:

$$J_{\Psi\to\Phi} = \begin{pmatrix} \frac{\partial \phi_0}{\partial \psi_0} & \frac{\partial \phi_0}{\partial \psi_1} & \frac{\partial \phi_0}{\partial \psi_2} & \cdots & \frac{\partial \phi_0}{\partial \psi_n} \\ \frac{\partial \phi_1}{\partial \psi_0} & \frac{\partial \phi_1}{\partial \psi_1} & \frac{\partial \phi_1}{\partial \psi_2} & \cdots & \frac{\partial \phi_1}{\partial \psi_n} \\ \frac{\partial \phi_2}{\partial \psi_0} & \frac{\partial \phi_2}{\partial \psi_1} & \frac{\partial \phi_2}{\partial \psi_2} & \cdots & \frac{\partial \phi_2}{\partial \psi_n} \\ \vdots & \vdots & \vdots & \ddots & \vdots \\ \frac{\partial \phi_m}{\partial \psi_0} & \frac{\partial \phi_m}{\partial \psi_1} & \frac{\partial \phi_m}{\partial \psi_2} & \cdots & \frac{\partial \phi_m}{\partial \psi_n} \end{pmatrix} \tag{45}$$

Eqn. 44 may be used to obtain the metric tensor in the feature space, with respect to the perceptual space, by constructing a Jacobian between feature and perceptual spaces from a product of the Jacobians $J_{\Phi\to\Psi}$ and $J_{F\to\Phi}$:

$$g_{\Psi;F} = (J_{\Phi\to\Psi} J_{F\to\Phi})^T (J_{\Phi\to\Psi} J_{F\to\Phi}) = J_{F\to\Phi}^T J_{\Phi\to\Psi}^T J_{\Phi\to\Psi} J_{F\to\Phi} \tag{46}$$

Symbolic Form

As an example of computing a distance with a metric, consider the metric tensor for a two-dimensional physical space $\Phi$ and perceptual space $\Psi$, where the map is given as the polar coordinate transformation:

$$x = r \cos \theta \tag{47}$$

$$y = r \sin \theta$$

The Jacobian of this map is given by:

$$J_{\Psi\to\Phi} = \begin{pmatrix} \frac{\partial x}{\partial r} & \frac{\partial x}{\partial \theta} \\ \frac{\partial y}{\partial r} & \frac{\partial y}{\partial \theta} \end{pmatrix} = \begin{pmatrix} \cos \theta & -r \sin \theta \\ \sin \theta & r \cos \theta \end{pmatrix} \tag{48}$$

A metric tensor in the perceptual space $\Psi$ is thus given by:

$$g_{\Phi;\Psi} = J_{\Psi\to\Phi}^T J_{\Psi\to\Phi} = \begin{pmatrix} \cos \theta & \sin \theta \\ -r \sin \theta & r \cos \theta \end{pmatrix} \begin{pmatrix} \cos \theta & -r \sin \theta \\ \sin \theta & r \cos \theta \end{pmatrix} = \tag{49}$$

$$\begin{pmatrix} \cos^2 \theta + \sin^2 \theta & -r \sin \theta \cos \theta + r \sin \theta \cos \theta \\ -r \sin \theta \cos \theta + r \sin \theta \cos \theta & r^2 \cos^2 \theta + r^2 \sin^2 \theta \end{pmatrix} =$$

$$\begin{pmatrix} 1 & 0 \\ 0 & r^2 \end{pmatrix}$$

Numeric Form

The map $\mu_{\Psi\to\Phi}$: $\Psi\to\Phi$ need not be described by a formula, instead consisting of numerical values. In this case, the partial derivatives of the Jacobian may be computed using the finite difference method. For clarity, only four data points in the r and $\theta$ directions are considered in the following example, wherein the map $\mu_{\Psi\to\Phi}$ is computed over the four data points to generate a matrix defining the map $\mu_{\Psi\to\Phi}$.

The four points (r, $\theta$) are chosen as:

$$r = (0, 1, 2, 3) \tag{50}$$

$$\theta = \left(-\frac{\pi}{100}, -\frac{\pi}{3}, \frac{\pi}{3}, \frac{\pi}{100}\right)$$

from which a mesh of grid points covering the perceptual space may be constructed via Eqn. 47:

$$X = \begin{pmatrix} 0 \cdot \cos\left(-\frac{\pi}{100}\right) & 0 \cdot \cos\left(-\frac{\pi}{3}\right) & 0 \cdot \cos\left(\frac{\pi}{3}\right) & 0 \cdot \cos\left(\frac{\pi}{100}\right) \\ 1 \cdot \cos\left(-\frac{\pi}{100}\right) & 1 \cdot \cos\left(-\frac{\pi}{3}\right) & 1 \cdot \cos\left(\frac{\pi}{3}\right) & 1 \cdot \cos\left(\frac{\pi}{100}\right) \\ 2 \cdot \cos\left(-\frac{\pi}{100}\right) & 2 \cdot \cos\left(-\frac{\pi}{3}\right) & 2 \cdot \cos\left(\frac{\pi}{3}\right) & 2 \cdot \cos\left(\frac{\pi}{100}\right) \\ 3 \cdot \cos\left(-\frac{\pi}{100}\right) & 3 \cdot \cos\left(-\frac{\pi}{3}\right) & 3 \cdot \cos\left(\frac{\pi}{3}\right) & 3 \cdot \cos\left(\frac{\pi}{100}\right) \end{pmatrix} \tag{51}$$

$$Y = \begin{pmatrix} 0 \cdot \sin\left(-\frac{\pi}{100}\right) & 0 \cdot \sin\left(-\frac{\pi}{3}\right) & 0 \cdot \sin\left(\frac{\pi}{3}\right) & 0 \cdot \sin\left(\frac{\pi}{100}\right) \\ 1 \cdot \sin\left(-\frac{\pi}{100}\right) & 1 \cdot \sin\left(-\frac{\pi}{3}\right) & 1 \cdot \sin\left(\frac{\pi}{3}\right) & 1 \cdot \sin\left(\frac{\pi}{100}\right) \\ 2 \cdot \sin\left(-\frac{\pi}{100}\right) & 2 \cdot \sin\left(-\frac{\pi}{3}\right) & 2 \cdot \sin\left(\frac{\pi}{3}\right) & 2 \cdot \sin\left(\frac{\pi}{100}\right) \\ 3 \cdot \sin\left(-\frac{\pi}{100}\right) & 3 \cdot \sin\left(-\frac{\pi}{3}\right) & 3 \cdot \sin\left(\frac{\pi}{3}\right) & 3 \cdot \sin\left(\frac{\pi}{100}\right) \end{pmatrix}$$

Taking the derivatives for each array X and Y of Eqn. 51 using forward differences for the beginning of the array (Eqn. 52), central differences for the middle of the array (Eqn. 53), and backward differences for the end of the array (Eqn. 54), yields:

$$\frac{\partial X(r, \theta)}{\partial r} = \frac{X(r, \theta) - X(r+1, \theta)}{\Delta r} \tag{52}$$

$$\frac{\partial X(r, \theta)}{\partial r} = \frac{1}{2}\left(\frac{X(r+1, \theta) - X(r-1, \theta)}{\Delta r}\right) \tag{53}$$

$$\frac{\partial X(r, \theta)}{\partial r} = \frac{X(r-1, \theta) - X(r, \theta)}{\Delta r} \tag{54}$$

Applying the finite-difference method to the θ dimension as well as the Y array results in the following four derivative arrays:

$$\frac{\partial X(r,\theta)}{\partial r} = \begin{pmatrix} \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \end{pmatrix}$$

$$\frac{\partial Y(r,\theta)}{\partial r} = \begin{pmatrix} \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \end{pmatrix}$$

$$\frac{\partial X(r,\theta)}{\partial \theta} = \begin{pmatrix} -0\cdot\sin\left(-\frac{\pi}{100}\right) & -0\cdot\sin\left(-\frac{\pi}{3}\right) & -0\cdot\sin\left(\frac{\pi}{3}\right) & -0\cdot\sin\left(\frac{\pi}{100}\right) \\ -1\cdot\sin\left(-\frac{\pi}{100}\right) & -1\cdot\sin\left(-\frac{\pi}{3}\right) & -1\cdot\sin\left(\frac{\pi}{3}\right) & -1\cdot\sin\left(\frac{\pi}{100}\right) \\ -2\cdot\sin\left(-\frac{\pi}{100}\right) & -2\cdot\sin\left(-\frac{\pi}{3}\right) & -2\cdot\sin\left(\frac{\pi}{3}\right) & -2\cdot\sin\left(\frac{\pi}{100}\right) \\ -3\cdot\sin\left(-\frac{\pi}{100}\right) & -3\cdot\sin\left(-\frac{\pi}{3}\right) & -3\cdot\sin\left(\frac{\pi}{3}\right) & -3\cdot\sin\left(\frac{\pi}{100}\right) \end{pmatrix}$$

$$\frac{\partial Y(r,\theta)}{\partial \theta} = \begin{pmatrix} 0\cdot\cos\left(-\frac{\pi}{100}\right) & 0\cdot\cos\left(-\frac{\pi}{3}\right) & 0\cdot\cos\left(\frac{\pi}{3}\right) & 0\cdot\cos\left(\frac{\pi}{100}\right) \\ 1\cdot\cos\left(-\frac{\pi}{100}\right) & 1\cdot\cos\left(-\frac{\pi}{3}\right) & 1\cdot\cos\left(\frac{\pi}{3}\right) & 1\cdot\cos\left(\frac{\pi}{100}\right) \\ 2\cdot\cos\left(-\frac{\pi}{100}\right) & 2\cdot\cos\left(-\frac{\pi}{3}\right) & 2\cdot\cos\left(\frac{\pi}{3}\right) & 2\cdot\cos\left(\frac{\pi}{100}\right) \\ 3\cdot\cos\left(-\frac{\pi}{100}\right) & 3\cdot\cos\left(-\frac{\pi}{3}\right) & 3\cdot\cos\left(\frac{\pi}{3}\right) & 3\cdot\cos\left(\frac{\pi}{100}\right) \end{pmatrix}$$

The derivative arrays of Eqn. 50 may be used to obtain the Jacobian:

$$J_{\Psi\to\Phi} = \begin{pmatrix} \begin{pmatrix} \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \\ \cos\left(-\frac{\pi}{100}\right) & \cos\left(-\frac{\pi}{3}\right) & \cos\left(\frac{\pi}{3}\right) & \cos\left(\frac{\pi}{100}\right) \end{pmatrix} & \begin{pmatrix} -0\cdot\sin\left(-\frac{\pi}{100}\right) & -0\cdot\sin\left(-\frac{\pi}{3}\right) & -0\cdot\sin\left(\frac{\pi}{3}\right) & -0\cdot\sin\left(\frac{\pi}{100}\right) \\ -1\cdot\sin\left(-\frac{\pi}{100}\right) & -1\cdot\sin\left(-\frac{\pi}{3}\right) & -1\cdot\sin\left(\frac{\pi}{3}\right) & -1\cdot\sin\left(\frac{\pi}{100}\right) \\ -2\cdot\sin\left(-\frac{\pi}{100}\right) & -2\cdot\sin\left(-\frac{\pi}{3}\right) & -2\cdot\sin\left(\frac{\pi}{3}\right) & -2\cdot\sin\left(\frac{\pi}{100}\right) \\ -3\cdot\sin\left(-\frac{\pi}{100}\right) & -3\cdot\sin\left(-\frac{\pi}{3}\right) & -3\cdot\sin\left(\frac{\pi}{3}\right) & -3\cdot\sin\left(\frac{\pi}{100}\right) \end{pmatrix} \\ \begin{pmatrix} \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \\ \sin\left(-\frac{\pi}{100}\right) & \sin\left(-\frac{\pi}{3}\right) & \sin\left(\frac{\pi}{3}\right) & \sin\left(\frac{\pi}{100}\right) \end{pmatrix} & \begin{pmatrix} 0\cdot\cos\left(-\frac{\pi}{100}\right) & 0\cdot\cos\left(-\frac{\pi}{3}\right) & 0\cdot\cos\left(\frac{\pi}{3}\right) & 0\cdot\cos\left(\frac{\pi}{100}\right) \\ 1\cdot\cos\left(-\frac{\pi}{100}\right) & 1\cdot\cos\left(-\frac{\pi}{3}\right) & 1\cdot\cos\left(\frac{\pi}{3}\right) & 1\cdot\cos\left(\frac{\pi}{100}\right) \\ 2\cdot\cos\left(-\frac{\pi}{100}\right) & 2\cdot\cos\left(-\frac{\pi}{3}\right) & 2\cdot\cos\left(\frac{\pi}{3}\right) & 2\cdot\cos\left(\frac{\pi}{100}\right) \\ 3\cdot\cos\left(-\frac{\pi}{100}\right) & 3\cdot\cos\left(-\frac{\pi}{3}\right) & 3\cdot\cos\left(\frac{\pi}{3}\right) & 3\cdot\cos\left(\frac{\pi}{100}\right) \end{pmatrix} \end{pmatrix} \quad (56)$$

The metric tensor may be obtained from $J^T J$, that is, the product the Jacobian and its transpose. However, since the matrix J contains arrays, instead of numbers, element-wise multiplication is used where ordinarily two numbers are multiplied. Likewise for addition, the arrays are added element-wise where ordinarily two numbers are added. Specifically, if $$J_{\Psi\to\Phi} = \begin{pmatrix} A & B \\ C & D \end{pmatrix} \text{ then} \quad (57)$$

$$g_{\Phi:\Psi} = J_{\Psi\to\Phi}^T J_{\Psi\to\Phi} = \begin{pmatrix} A & B \\ C & D \end{pmatrix}\begin{pmatrix} A & B \\ C & D \end{pmatrix} = \begin{pmatrix} A\circ A + C\circ C & A\circ B + C\circ D \\ B\circ A + D\circ C & B\circ B + D\circ D \end{pmatrix}$$

where ∘ indicates a Hadamard product, or element-wise multiplication. This yields the following metric tensor:

$$g_{\Phi:\Psi} = \begin{pmatrix} \begin{pmatrix} 1 & 1 & 1 & 1 \\ 1 & 1 & 1 & 1 \\ 1 & 1 & 1 & 1 \\ 1 & 1 & 1 & 1 \end{pmatrix} & \begin{pmatrix} 0 & 0 & 0 & 0 \\ 0 & 0 & 0 & 0 \\ 0 & 0 & 0 & 0 \\ 0 & 0 & 0 & 0 \end{pmatrix} \\ \begin{pmatrix} 0 & 0 & 0 & 0 \\ 0 & 0 & 0 & 0 \\ 0 & 0 & 0 & 0 \\ 0 & 0 & 0 & 0 \end{pmatrix} & \begin{pmatrix} 0 & 0 & 0 & 0 \\ 1 & 1 & 1 & 1 \\ 4 & 4 & 4 & 4 \\ 9 & 9 & 9 & 9 \end{pmatrix} \end{pmatrix} \quad (58)$$

Algorithm 1 is Python code that calculates the above metric tensor $g_{\Phi:\Psi}$:

| Algorithm 1: Python code for computing the metric tensor |
| --- |
| 1     import numpy as np |
| 2 |
| 3     # create a range of 4 values for each dimension |
| 4     ndim = 4 |
| 5     r = np.linspace(0,3,ndim) |
| 6     th = np.linspace(−0.01*np.pi,0.01*np.pi,ndim) |
| 7 |
| 8     # compute the delta for one unit in each dimension |
| 9     dr = np.abs(np.abs(r[0])−np.abs(r[1])) |
| 10     dth = np.abs(np.abs(th[0])−np.abs(th[1])) |
| 11 |
| 12     # compute map from Perceptual Space to Physical Space |
| 13     # in each array, r is row and theta is column |
| 14     x = np.outer(r,np.cos(th)) # equiv to x = r*np.cos(th) |
| 15     y = np.outer(r,np.sin(th)) # equiv to y = r*np.sin(th) |
| 16 |
| 17     # compute derivatives for each dimension r and theta |

-continued

| Algorithm 1: Python code for computing the metric tensor |
| --- |
| 18     dx_dr , dx_dth = np.gradient(x,dr,dth) |
| 19     dy_dr , dy_dth = np.gradient(y,dr,dth) |

Algorithm 1: Python code for computing the metric tensor

```
20
21      # compute Jacobians
22      J = np.array([[dx_dr,dx_dth], [dy_dr,dy_dth]])
23      J_T = np.swapaxes(J,1,0)
24
25      # compute metric tensor
26      g = np.einsum(' i j . . . , jk ...-> ik . . . ',J_T, J)
```

Figure 47:
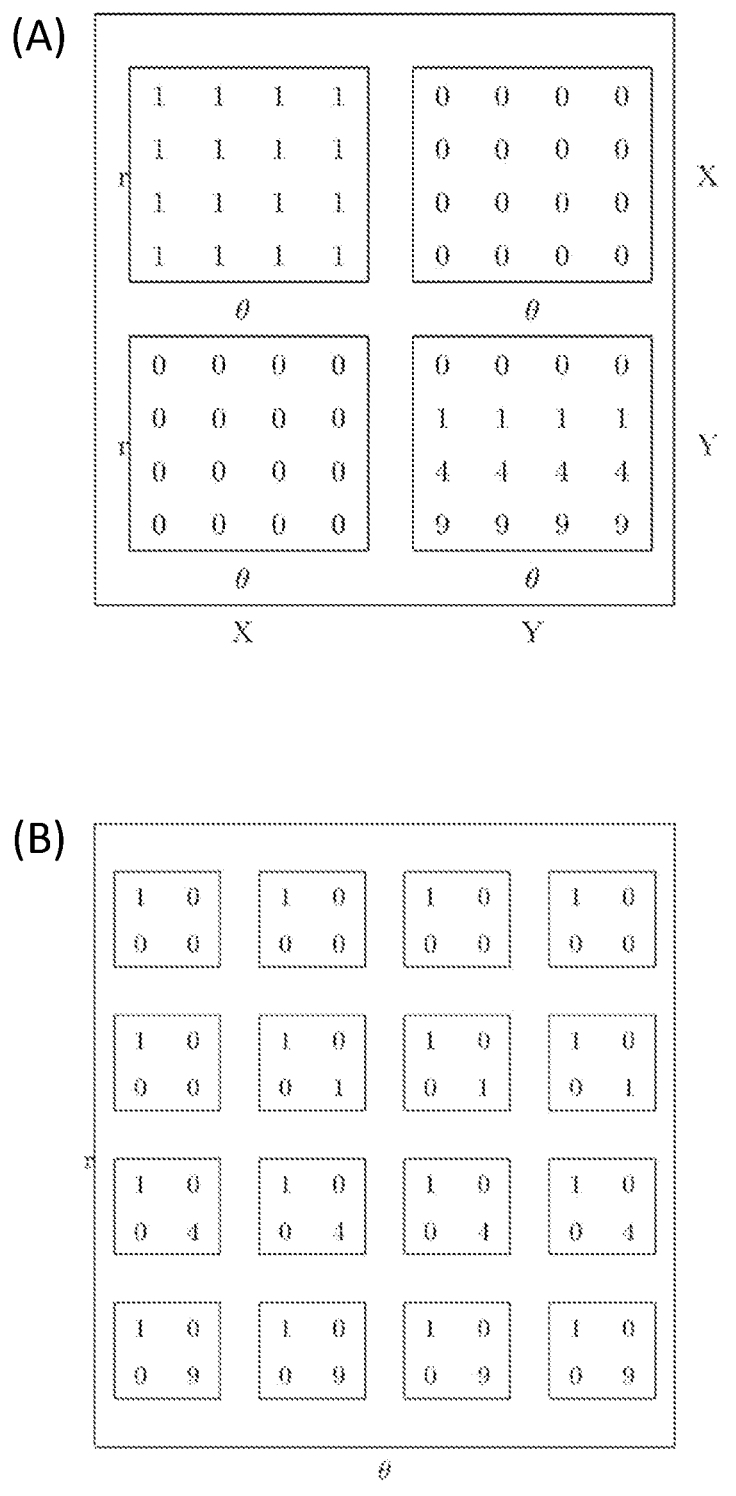

FIG. 47A shows the metric for this case. FIG. 47B shows this same metric, after being reshaped such that $g_{\Phi,\Psi}$ has a 2×2 metric tensor for each grid point in the perceptual space. In this case, the metric tensor may now be considered as parameterized by r and θ.

Calculating a Geodesic

At this point, a multidimensional array provides a metric for each grid point in the perceptual space. Given two points in the perceptual space, a geodesic path between them may be calculated by a nearest-neighbor shortest-distance method. With this technique, the distance between a grid point and its immediate neighbor on the perceptual space grid is calculated. The geodesic path may be computed by starting at the first point and selecting its nearest neighbor. Once the endpoint is reached, a complete set of points on the geodesic path is obtained. This technique provides a reasonable approximation to the actual geodesic when the curvature of the space is relatively smooth and continuous. Any one of several alternative methods may be employed to determine the geodesic path. In any case, once the geodesic path is determined, it is necessary to decompose that path at each point (r, θ) into its component vectors.

To illustrate this procedure, assume for example that a grid divides the perceptual space into four points per dimension. We may the describe the path of a geodesic by decomposing the geodesic at each point into component vectors. To do this, we will begin by obtaining a list of all the nonzero entries in the perceptual space grid. This geodesic on the perceptual space grid is represented as:

$$\begin{pmatrix} 1 & 0 & 0 & 0 \\ 1 & 0 & 0 & 0 \\ 0 & 1 & 1 & 0 \\ 0 & 0 & 0 & 0 \end{pmatrix}$$

To compute the component vectors of this geodesic line, we create a list from the coordinates of nonzero elements. In this example, the list consists of the points {(0, 0), (1, 0), (2,1), (2, 2)}. We then compute the difference between two coordinates pairs in the list, yielding the following differences for each coordinate pair: {(1, 0), (1, 1), (0, 1)}. The component vector we wish to obtain is a column vector with a row for each dimension of the coordinate system, or two rows in this example. However, instead of a single number, each row in the column vector is occupied by an array. This array corresponds to the displacement from each coordinate needed to construct a segment of the geodesic line. The component vector for this example is given by:

$$\begin{pmatrix} \Delta r \\ \Delta \theta \end{pmatrix} = \begin{pmatrix} \begin{pmatrix} 1 & 0 & 0 & 0 \\ 1 & 0 & 0 & 0 \\ 0 & 0 & 0 & 0 \\ 0 & 0 & 0 & 0 \end{pmatrix} \\ \begin{pmatrix} 0 & 0 & 0 & 0 \\ 1 & 0 & 0 & 0 \\ 0 & 1 & 0 & 0 \\ 0 & 0 & 0 & 0 \end{pmatrix} \end{pmatrix}.$$

Computing the Arc Length of a Geodesic

Once the component vector is computed, the geodesic distance may be computed by:

$$d^2 = \int_{r,\theta} g_{\Phi,\Psi}(r,\theta) \Delta r \, \Delta \theta \, dr \, d\theta, \tag{59}$$

or in matrix form by:

$$d^2 = \sum_{r,\theta} \left( [\Delta r \; \Delta \theta] \begin{bmatrix} 1 & 0 \\ 0 & r^2 \end{bmatrix} \begin{bmatrix} \Delta r \\ \Delta \theta \end{bmatrix} \right). \tag{60}$$

Figures 48, 49:
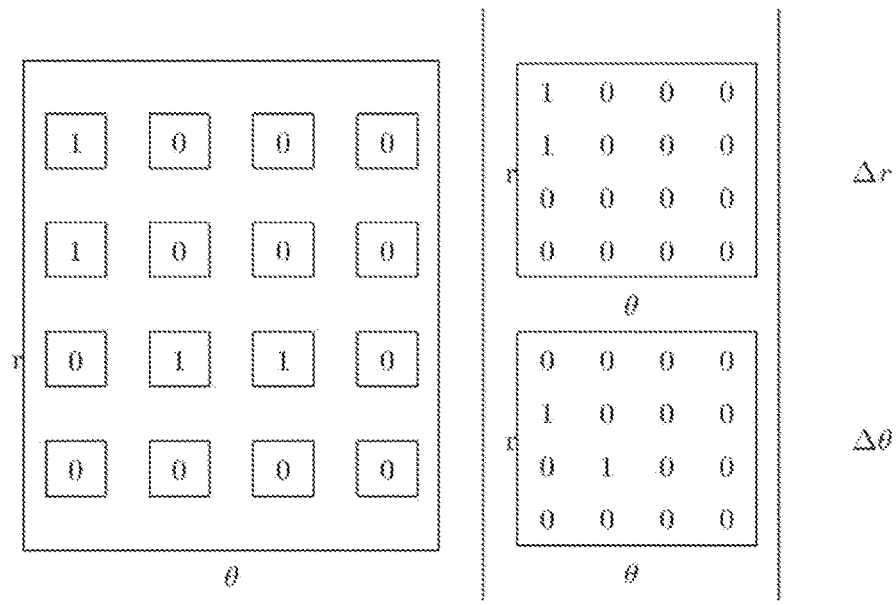
FIG. 48 shows how each point in a geodesic path is decomposed into $\Delta r$ and $\Delta\theta$ components.
FIG. 49 shows an example computation of the distance from the metric tensor spanning the entire perceptual space grid.

In Eqn. 60, r and θ are usually considered as single numbers. However, in our representation these variables form an array representing all the values of the grid in the perceptual space. By performing the element-wise multiplications and element-wise additions of these arrays, we obtain a distance-squared $d^2$ for each grid point in the perceptual space. We then only need to sum over all the points of the geodesic. FIG. 49 illustrates this form of calculating the distance-squared.

13. Computer Implementations

Figure 50:
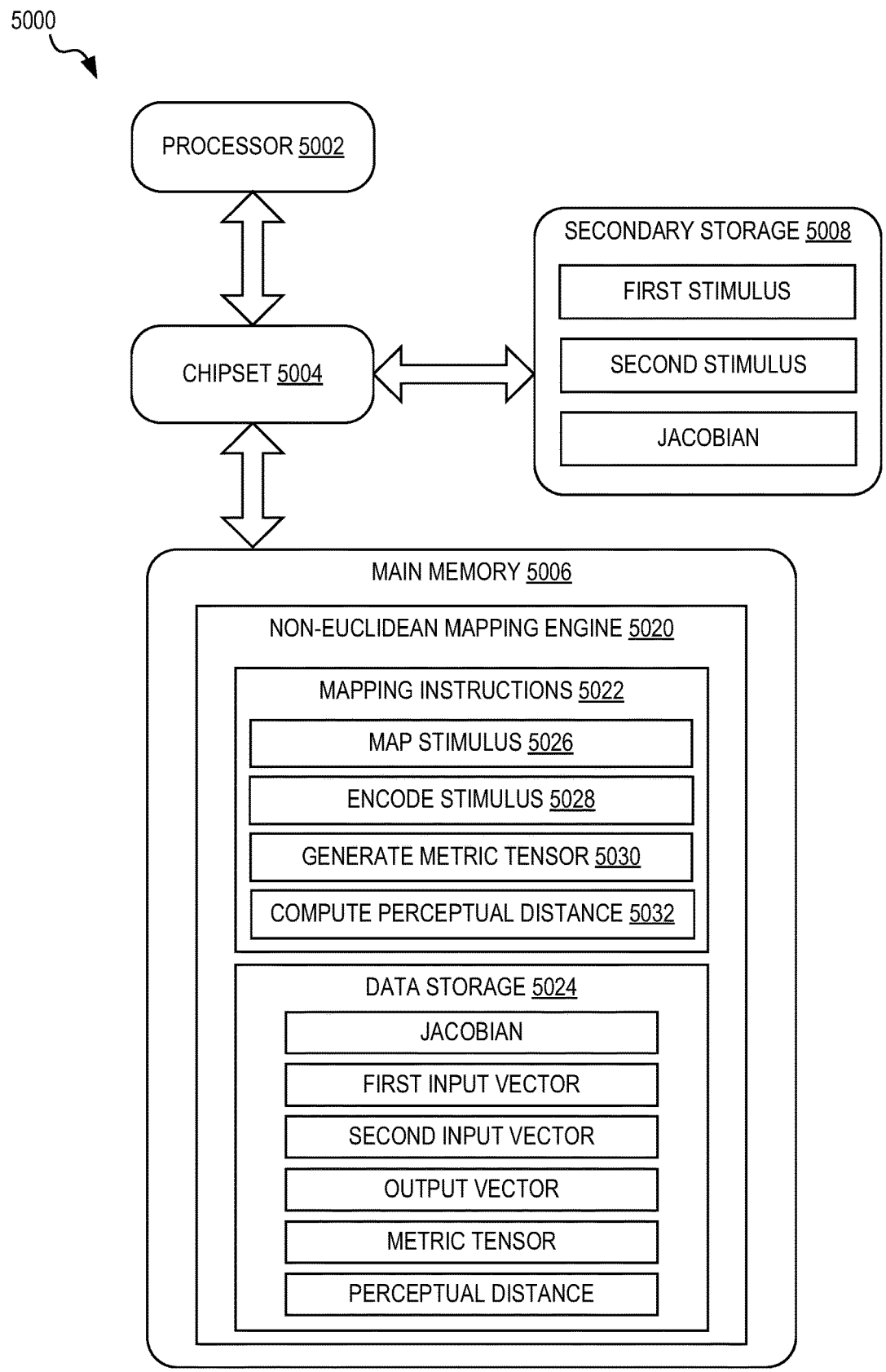
FIG. 50 shows one example of a computing device on which embodiments described herein may be implemented.

FIG. 50 shows one example of a computing device 5000 on which embodiments described herein may be implemented. Computing device 5000 includes a processor 5002, chipset 5004, main memory 5006, and secondary storage 5008. Main memory 5006 is faster and has a smaller capacity than secondary storage 5008. For example, main memory 5006 may be RAM located proximate to processor 5002, and secondary storage 5008 may be a hard disk drive or solid-state drive. Other forms of main memory 5006 and/or secondary storage 5008 may be used without departing from the scope hereof.

Processor 5002 may include one or more cores, cache memory, a memory management unit, and/or other components for assisting processor 5002 with carrying out machine-readable instructions. For example, processor 5002 may be a central processing unit (CPU), graphics processing unit (GPU), field-programmable gate array (FPGA), or system-on-chip (SoC). Chipset 5004 manages data flow between processor 5002, main memory 5006, and secondary storage 5008, and may be a single chip or multiple chips (e.g., northbridge and southbridge chips). Chipset 5004 may also be integrated onto the same chip as processor 5002, wherein processor 5002 connects directly to main memory 5006 and/or secondary storage 5008.

Main memory 5006 stores machine-readable instructions to be executed by processor 5002, and data needed by processor 5002 for executing the machine-readable instructions. For example, main memory 5006 is shown in FIG. 50 storing a non-Euclidean mapping engine 5020 having machine-readable mapping instructions 5022 executable by processor 5002. Non-Euclidean mapping engine 5020 also includes data storage 5024 that stores a Jacobian, a first input vector, a second input vector, an output vector, a metric tensor, and a perceptual distance. While secondary storage 5008 is shown in FIG. 50 storing a first stimulus, a second stimulus, and the Jacobian, secondary storage 5008 may additionally store any of the data and/or instructions stored in non-Euclidean mapping engine 5020 without departing from the scope hereof.

In one embodiment, the Jacobian maps a feature space to a non-Euclidean perceptual space according to a perceptual system; mapping instructions 5022 include instructions 5026 that direct processor 5002 to use the Jacobian to map the first stimulus from the feature space to a target point of the non-Euclidean perceptual space such that the target point represents a perception of the first stimulus by a perceptual system. The target point may be represented as the output vector stored in data storage 5024. In another embodiment, mapping instructions 5022 include instructions 5028 that further direct processor 5002 to encode the first stimulus as the first input vector according to a coordinate representation of the feature space, wherein mapping instructions 5022 to use the Jacobian include instructions to multiply the Jacobian and the first input vector to generate the output vector. In another embodiment, mapping instructions 5022 include instructions 5030 that further direct processor 5002 to generate a metric tensor from the Jacobian.

In some embodiments, mapping instructions 5022 further: (i) use instructions 5028 to direct processor 5002 to encode the second stimulus as the second input vector according to the coordinate representation of the feature space, and (ii) include instructions 5032 that direct processor 5002 to use the metric tensor to compute a perceptual distance between the first and second input vectors, when mapped into the non-Euclidean perceptual space. In one of these embodiments, the Jacobian represents a multilinear mapping between the feature and non-Euclidean perceptual spaces, wherein instructions 5032 to use the metric tensor include machine-readable instructions to multiply the metric tensor and a difference of the first and second input vectors.

Figure 51:
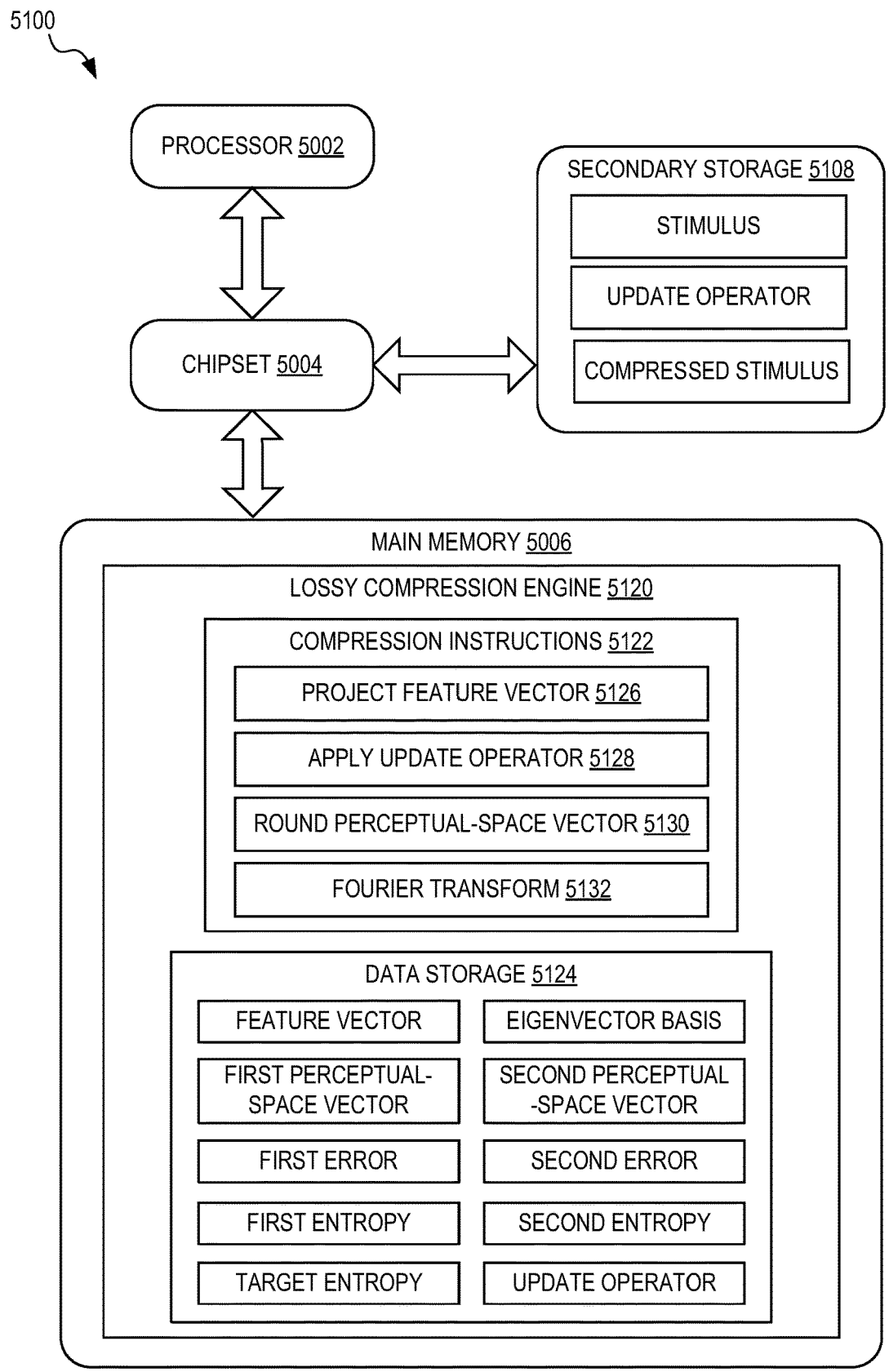
FIG. 51 shows a second computing device on which embodiments described herein may be implemented.

FIG. 51 shows a second computing device 5100 on which embodiments described herein may be implemented. Computing device 5100 is similar to computing device 5000 of FIG. 50, but with main memory 5006 storing a lossy compression engine 5120 instead of non-Euclidean mapping engine 5020. Lossy compression engine 5120 includes machine-readable compression instructions 5122 executable by processor 5002, and data storage 5124 that stores a feature vector, an eigenvector basis, first and second perceptual-space vectors, first and second errors of the respective first and second perceptual-space vectors, first and second entropies of the respective first and second perceptual-space vectors, a target entropy, and an update operator. While secondary storage 5108 is shown in FIG. 51 storing a stimulus, the update operator, and a compressed stimulus, secondary storage 5108 may additionally store any of the data and/or instructions stored in lossy compression engine 5120 without departing from the scope hereof.

In one embodiment, the feature vector stored in data storage 5124 represents the stimulus in a feature space. Compression instructions 5122 may include instructions 5126 that direct processor 5002 to project the feature vector from the feature space to the first perceptual-space vector using the eigenvector basis, as obtained from a heat equation. Compression instructions 5122 may also include instructions 5128 that direct processor 5002 to apply the update operator to move the first perceptual-space vector to the second perceptual-space vector such that the second entropy is less than the first entropy, and the second error is greater than the first error. Compression instructions 5122 may also include instructions 5130 that direct processor 5002 to round the second perceptual-space vector (e.g., see Eqn. 32 and the accompanying description). Compression instructions 5122 may further direct processor 5002 to store the second perceptual-space vector, after rounding, as the compressed stimulus.

In another embodiment, compression instructions 5122 further direct processor 5002 to form the update operator according to the target entropy such that the second entropy equals the target entropy. A user of computing device 5100 may enter a value of the target entropy (e.g., via a graphical user interface of computing device 5100) that determines a trade-off between second error and the second entropy. In other embodiments, compression instructions 5122 include instructions 5132 that direct processor 5002 to Fourier transform the stimulus to generate the feature vector, wherein the feature vector includes a sequence of Fourier coefficients. In one such embodiment, instructions 5132 to Fourier transform the stimulus include instructions to apply a discrete cosine transform (DCT) to the stimulus.

Figure 52:
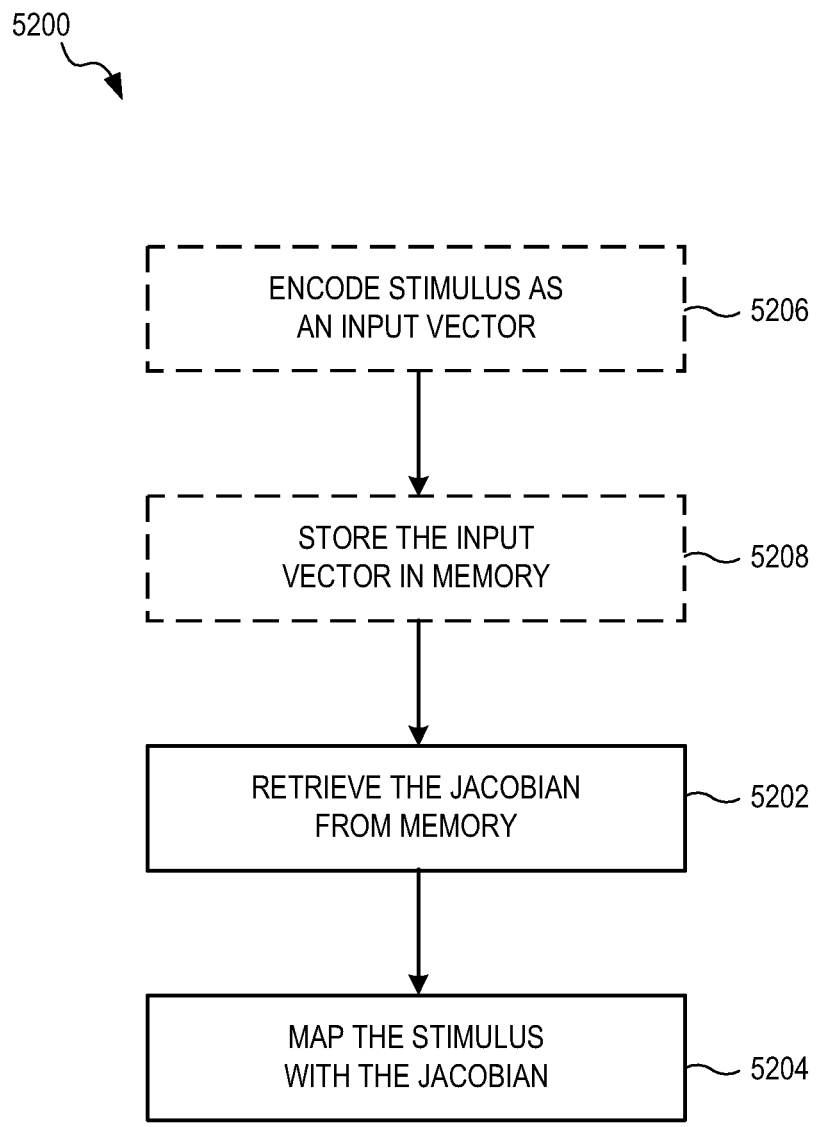
FIG. 52 shows a method, performed by a computing device, that processes a stimulus, in embodiments.

FIG. 52 shows a method 5200, performed by a computing device, that processes a stimulus. Computing device 5000 of FIG. 50 is one example of a computing device that may perform method 5200. Method 5200 includes a step 5202 that retrieves, from a memory of the computing device, a Jacobian that maps a feature space to a non-Euclidean perceptual space according to a perceptual system. In one example of step 5202, non-Euclidean mapping engine 5020 stores the Jacobian in data storage 5024 so as to be retrieved by processor 5002. Method 5200 also includes a step 5204 that maps, with the Jacobian, the stimulus from the feature space to a target point of the perceptual space using a processor of the computing device, the target point representing a perception of the stimulus by the perceptual system. Instructions 5026 of non-Euclidean mapping engine 5020 (see FIG. 50) is one example of step 5204.

In one embodiment, method 5200 includes a step 5206 that encodes an stimulus as a first input vector according to a coordinate representation of the feature space, and a step 5208 that stores the first input vector in the memory. Instructions 5028 of non-Euclidean mapping engine 5020 (see FIG. 50) is one example of step 5206. In another example of step 5206, instructions 5028 Fourier transform the stimulus, wherein the first input vector includes a sequence of Fourier coefficients. In one example of step 5208, non-Euclidean mapping engine 5020 stores the first input vector in data storage 5024. In this embodiment, step 5204 that maps the stimulus with the Jacobian includes a step that multiplies the Jacobian and the first input vector to generate an output vector encoding the target point in a coordinate representation of the non-Euclidean perceptual space.

In certain embodiments, method 5200 includes a first step that generates a metric tensor of the perceptual space with the Jacobian, a second step that encodes a second stimulus as a second input vector according to the coordinate representation of the feature space, a third step that stores the second input vector, and a fourth step that uses the metric tensor to compute a perceptual distance between the first and second input vectors when mapped into the non-Euclidean perceptual space. Instructions 5030 of non-Euclidean mapping engine 5020 (see FIG. 50) is one example of the first step. Instructions 5028 of non-Euclidean mapping engine 5020 is one example of the second step. In one example of the third step, non-Euclidean mapping engine 5020 stores the second input vector in data storage 5024. Instructions 5032 of non-Euclidean mapping engine 5020 is one example of the fourth step. In one of these embodiments, the Jacobian represents a multilinear function between the feature and perceptual spaces, wherein the fourth step that uses the metric tensor includes a step that multiplies the metric tensor and a difference of the first and second input vectors.

Figure 53:
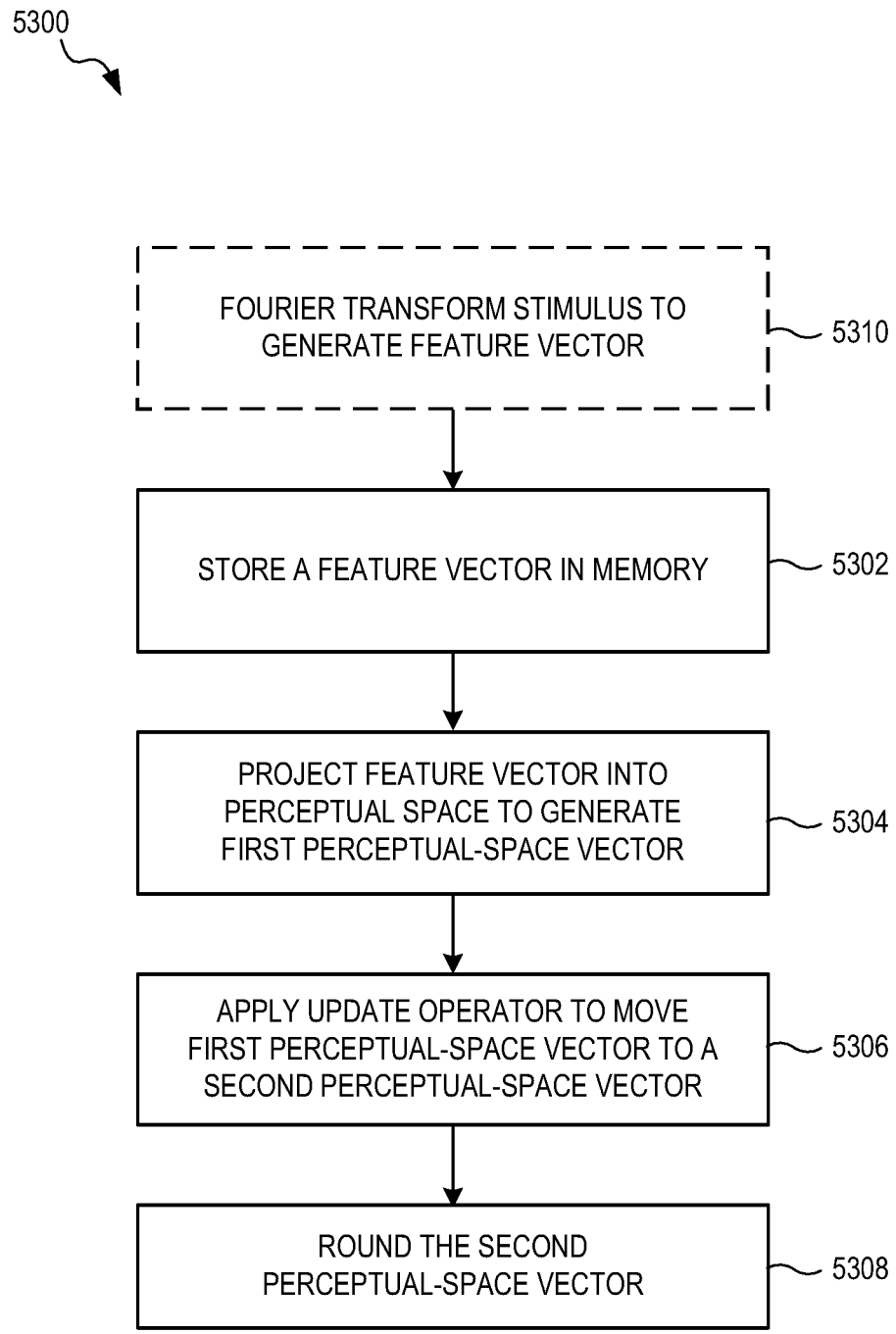
FIG. 53 shows a method, performed by a computing device, that compresses a stimulus, in embodiments.

FIG. 53 shows a method 5300, performed by a computing device, that compresses an stimulus. Computing device 5100 of FIG. 51 is one example of a computing device that may perform method 5300. Method 5300 includes a step 5302 that stores a feature vector representative of the stimulus in a memory of the computing device. In one example of step 5302, lossy compression engine 5120 stores the feature vector in data storage 5124 so as to be retrieved by processor 5002. Method 5300 also includes a step 5304 that projects the feature vector, using a processor of the computing device, into a first perceptual-space vector of a non-Euclidean perceptual space with an eigenvector basis obtained from a heat equation, the first perceptual-space vector having a first error and a first entropy. Instructions 5126 of lossy compression engine 5120 (see FIG. 51) is one example of step 5304. Method 5300 also includes a step 5306 that applies an update operator, using the processor, to move the first perceptual-space vector to a second perceptual-space vector such that a second entropy of the second perceptual-space vector is less than the first entropy, and a second error of the second perceptual-space vector is greater than the first error. Instructions 5128 of lossy compression engine 5120 (see FIG. 51) is one example of step 5306. Method 5300 also includes a step 5308 that rounds the second perceptual-space vector (e.g., see Eqn. 32 and the accompanying description). Instructions 5130 of lossy compression engine 5120 (see FIG. 51) is one example of step 5308.

In one embodiment, method 5300 also includes a step 5310 that Fourier transforms the stimulus to generate the feature vector, wherein the feature vector includes a sequence of Fourier coefficients. Instructions 5132 of lossy compression engine 5120 (see FIG. 51) is one example of step 5310. Step 5310 may apply a discrete cosine transform or a discrete sine transform to the stimulus.

In certain embodiments, step 5306 includes a step that forms the update operator according to a selected target entropy such that the second entropy equals the target entropy. Method 5300 may also include a step that receives a value of the target entropy at the computing device (e.g., via a graphical user interface of the computing device). In one such embodiment, step 5306 includes a step that constructs a diagonal update matrix from a plurality of column vectors, each column vector being a solution of an entropy term of the heat equation.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An autonomous module for processing stored data, comprising:
    a multithreaded processor core (MPC); and
    a plurality of autonomous memories, each autonomous memory having:
        a memory bank;
        a data operator (DO) configured to implement a plurality of selectable memory behaviors;
        an autonomous memory operator (AMO) configured to implement a state machine to control the memory bank independently of the MPC; and
        at least one memory input/output (IO) port communicatively coupled with the memory bank, the AMO, and the DO, the at least one memory IO port being configured to receive a read instruction from the AMO, retrieve data from the memory bank, and send the data to the DO;
        wherein the DO is configured to implement one of the plurality of selectable memory behaviors to update the data and send the updated data to the AMO via the at least one memory IO port.

2. The autonomous module of claim 1, the data being defined by an address range corresponding to the memory bank.

3. The autonomous module of claim 1, the AMO being configured to write the updated data to the memory bank via one of the at least one memory IO port.

4. The autonomous module of claim 1,
    further comprising a network-on-chip;
    the plurality of autonomous memories being configured to communicate via the network-on-chip.

5. The autonomous module of claim 1, further comprising a plurality of memory queue units, each of the plurality of memory queue units being configured to provide a data input to one of the plurality of autonomous memories.

6. The autonomous module of claim 5, a first autonomous memory of the plurality of autonomous memories being configured to send the updated data to a second autonomous memory of the plurality of autonomous memories via one of the plurality of memory queue units providing input to the second autonomous memory.

7. The autonomous module of claim 6, the first autonomous memory and the second autonomous memory being configured to operate concurrently and independently of the MPC.

8. The autonomous module of claim 6, the second autonomous memory being further configured to send updated data to a third autonomous memory of the plurality of autonomous memories via one of the plurality of memory queue units providing input to the third autonomous memory.

9. The autonomous module of claim 1, the plurality of selectable memory behaviors comprising at least two memory behaviors selected from the group consisting of: pass-through, k-winners-take-all, differential geometry proximity, and k-nearest algorithm.

10. The autonomous module of claim 1, the MPC being configured to offload at least one algorithmic component to the AMO, whereby the AMO is configured to select one or more of the plurality of selectable memory behaviors to perform the at least one algorithm component.

11. The autonomous module of claim 10, the MPC being configured to select the at least one algorithm component to operate for a defined period.

12. The autonomous module of claim 1, the data comprising a digital representation of an input stimulus.

13. The autonomous module of claim 1, the autonomous module comprising a field-programmable-gate-array (FPGA).

* * * * *